(12) United States Patent
Takizawa et al.

(10) Patent No.: US 11,229,102 B2
(45) Date of Patent: *Jan. 18, 2022

(54) LIGHTING DEVICE

(71) Applicant: Rohm Co., Ltd., Kyoto (JP)

(72) Inventors: Noboru Takizawa, Kyoto (JP); Masaaki Nakayama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,570

(22) Filed: Apr. 22, 2020

(65) Prior Publication Data

US 2020/0253019 A1 Aug. 6, 2020

Related U.S. Application Data

(63) Continuation of application No. 16/218,738, filed on Dec. 13, 2018, now Pat. No. 10,660,168, which is a
(Continued)

(30) Foreign Application Priority Data

Dec. 12, 2014 (JP) ................................ 2014-251770
Dec. 14, 2014 (JP) ................................ 2014-251776

(51) Int. Cl.
*H05B 45/46* (2020.01)
*H05B 45/10* (2020.01)
(Continued)

(52) U.S. Cl.
CPC ............ *H05B 45/46* (2020.01); *H05B 45/10* (2020.01); *H05B 45/3725* (2020.01); *H02M 1/0067* (2021.05); *Y02B 20/40* (2013.01)

(58) Field of Classification Search
CPC ........ Y02B 20/40; H05B 45/46; H05B 45/10; H05B 45/37; H05B 45/3725; H02M 2001/0067
See application file for complete search history.

(56) References Cited

U.S. PATENT DOCUMENTS 9,900,944 B2 2/2018 Takizawa
10,194,499 B2 * 1/2019 Takizawa ............... H05B 45/10
(Continued)

FOREIGN PATENT DOCUMENTS

CN 101681974 A 3/2010
CN 102077373 A 5/2011
(Continued)

OTHER PUBLICATIONS

Japanese Patent Office, International Search Report for corresponding International Patent Application PCT/JP2015/081072, dated Jan. 19, 2016 (with translation), 2 pages.
(Continued)

*Primary Examiner* — Minh D A
(74) *Attorney, Agent, or Firm* — Fish & Richardson P.C.

(57) ABSTRACT

A lighting device includes light emitting element groups (HSB) including a light emitting element group (HS2) that emits light when being applied with a voltage at a light emission reference voltage (VH2), and a light emitting element group (HS12) that emits light when being applied with a light emission reference voltage (VH12) higher than the light emission reference voltage (VH2), the light emitting element groups (HSB) emitting light when being applied with a voltage equal to or higher than a light emission reference voltage (VHa); a semiconductor chip (IC1) including a light emission control unit (HC1) arranged to perform light emission control to cause light emission of a light emitting element group (HS) if a drive voltage (Vk) is higher than the light emission reference voltage (VHa), and to perform light emission stop control to stop the light emission if the drive voltage (Vk) is lower than the same; and a semiconductor chip (IC2) including a light emission control unit (HC2) arranged to perform light emission control to cause light emission of a light emitting element
(Continued)

group (HSa) if the drive voltage (Vk) is higher than the light emission reference voltage (VHa), and to perform light emission stop control to turn off the emitting element group (HSa) if the drive voltage (Vk) is lower than the same.

39 Claims, 30 Drawing Sheets

Related U.S. Application Data continuation of application No. 15/864,999, filed on Jan. 8, 2018, now Pat. No. 10,194,499, which is a continuation of application No. 15/535,114, filed as application No. PCT/JP2015/081072 on Nov. 4, 2015, now Pat. No. 9,900,944.

(51) Int. Cl.
*H05B 45/3725* (2020.01)
*H02M 1/00* (2006.01)

(56) References Cited

U.S. PATENT DOCUMENTS

| | | | |
|---|---|---|---|
| 10,660,168 B2 * | 5/2020 | Takizawa | H05B 45/10 |
| 2005/0104542 A1 | 5/2005 | Ito et al. | |
| 2011/0018914 A1 | 1/2011 | Ishikawa et al. | |
| 2011/0080432 A1 | 4/2011 | Nakazawa et al. | |
| 2011/0175530 A1 | 7/2011 | Inoko et al. | |
| 2011/0199003 A1 | 8/2011 | Muguruma | |
| 2012/0098456 A1 | 4/2012 | Tseng | |
| 2012/0146515 A1 | 6/2012 | Chuang | |
| 2013/0278154 A1 | 10/2013 | Kim | |
| 2014/0320786 A1 | 10/2014 | Zhang | |
| 2015/0097484 A1 * | 4/2015 | Lee | H05B 45/50 315/85 |
| 2015/0156841 A1 | 6/2015 | Musch | |
| 2015/0257216 A1 * | 9/2015 | Lys | H05B 45/37 315/201 |
| 2016/0143107 A1 | 5/2016 | Kim | |

FOREIGN PATENT DOCUMENTS

| | | |
|---|---|---|
| JP | 2004-273267 A | 9/2004 |
| JP | 2006-202855 A | 8/2006 |
| JP | 2008-077944 A | 4/2008 |
| JP | 2010-225413 A | 10/2010 |
| JP | 2014-050112 A | 3/2014 |
| WO | 2010/050096 | 5/2010 |
| WO | 2012/144178 | 10/2012 |

OTHER PUBLICATIONS

European Patent Office, Extended EP Search report for European Patent Application No. 15866579,4, dated Jul. 12, 2018.

Japanese Patent Office; Office Action mailed in corresponding Japanese Patent Application No. 2018-145100 (dated Apr. 16, 2019), with English Translation,.

* cited by examiner

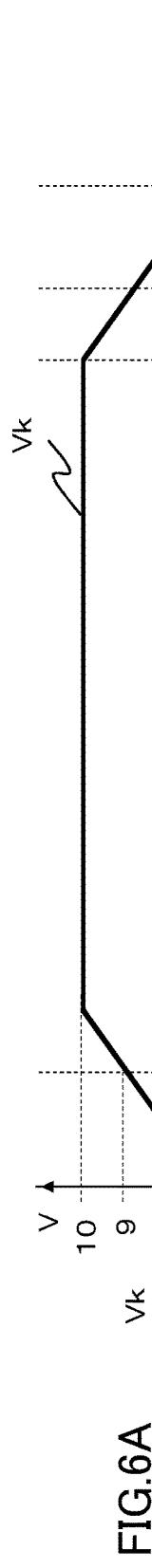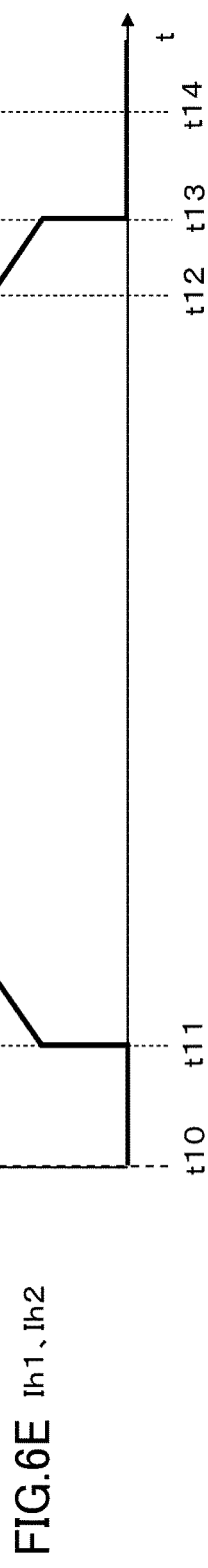

LIGHTING DEVICE

TECHNICAL FIELD

The present invention relates to a lighting device constituted of a plurality of light emitting elements.

BACKGROUND ART

Recent years, along with diversification of design of lighting devices, as disclosed in Patent Document 1 or Patent Document 2, there is known a lighting device in which a plurality of light emitting element groups connected in parallel to each other with respect to a power supply circuit include different numbers of light emitting elements.

LIST OF CITATIONS

Patent Literature

Patent Document 1: JP-A-2010-225413
Patent Document 2: JP-A-2008-77944

SUMMARY OF THE INVENTION

Technical Problem

In the conventional lighting device as described above, the light emitting element groups may have different light emission reference voltages necessary for light emission. For example, at rising or falling of the power supply to drive the lighting device, if a voltage supplied from the power supply circuit does not have a sufficient level, turn-on and turn-off timings of the light emitting elements in the light emitting element groups may be varied. If turn-on and turn-off timings of the light emitting elements in the light emitting element groups of the lighting device are varied, fine view may be impaired. In addition, when the lighting device is used as an in-vehicle exterior lamp, for example, it may be woolly lighting and may cause an accident, which is a problem.

It is an object of the present invention to provide a lighting device that prevents a variation in turn-on and turn-off timings of a plurality of light emitting element groups connected in parallel to each other with respect to a power supply circuit.

Means for Solving the Problem

A lighting device according to the present invention includes a power supply circuit arranged to supply a drive voltage; light emitting element groups including a first light emitting element group having a plurality of first light emitting elements connected in series, arranged to emit light by a first light emission current flowing when being applied with a first light emission voltage based on the drive voltage, at a first light emission reference voltage or higher, and a second light emitting element group having a plurality of a second light emitting elements connected in series, arranged to emit light by a second light emission current flowing when being applied with a second light emission voltage based on the drive voltage, at a second light emission reference voltage higher than the first light emission reference voltage, the light emitting element groups emitting light when being applied with a light emission voltage equal to or higher than a light emission reference voltage based on the second light emission reference voltage; a first semiconductor chip including a first light emission control unit arranged to detect a magnitude relationship between the drive voltage and the light emission reference voltage, to perform light emission control to cause light emission of the light emitting element group if the drive voltage is higher than the light emission reference voltage, and to perform light emission stop control to stop light emission of the light emitting element group if the drive voltage is lower than the light emission reference voltage, the first semiconductor chip being connected to the first light emitting element group; and a second semiconductor chip including a second light emission control unit arranged to detect a magnitude relationship between the drive voltage and the light emission reference voltage, to perform light emission control to cause light emission of the light emitting element group if the drive voltage is higher than the light emission reference voltage, and to perform light emission stop control to stop light emission of the light emitting element group if the drive voltage is lower than the light emission reference voltage, the second semiconductor chip being connected to the first semiconductor chip and the second light emitting element group.

In addition, a lighting device according to the present invention includes light emitting element groups including a first light emitting element group having a plurality of first light emitting elements connected in series, arranged to emit light by a first light emission current flowing when being applied with a first light emission voltage based on the drive voltage, at a first light emission reference voltage or higher, and a second light emitting element group having a plurality of a second light emitting elements connected in series, arranged to emit light by a second light emission current flowing when being applied with a second light emission voltage based on the drive voltage, at a second light emission reference voltage higher than the first light emission reference voltage, the light emitting element groups emitting light when being applied with a light emission voltage equal to or higher than a light emission reference voltage based on the second light emission reference voltage; and a light emission control unit arranged to detect a magnitude relationship between the drive voltage and the light emission reference voltage, to perform light emission control to cause light emission of the light emitting element group if the drive voltage is higher than the light emission reference voltage, and to perform light emission stop control to stop light emission of the light emitting element group if the drive voltage is lower than the light emission reference voltage.

Advantageous Effects of the Invention

With the lighting device according to the present invention, it is possible to prevent a variation in turn-on and turn-off timings in a plurality of light emitting element groups connected in parallel to each other with respect to a power supply circuit.

BRIEF DESCRIPTION OF DRAWINGS

FIGS. 6A to 6E are diagrams illustrating transitions of signal waveforms from rising to falling of a power supply to drive the lighting device 20.

DESCRIPTION OF EMBODIMENTS

Hereinafter, with reference to the drawings, embodiments of the present invention are described. Note that numeric values, circuits, and the like can be appropriately selected within the scope of the present invention without deviating from the spirit thereof.

First Embodiment

Figure 1:
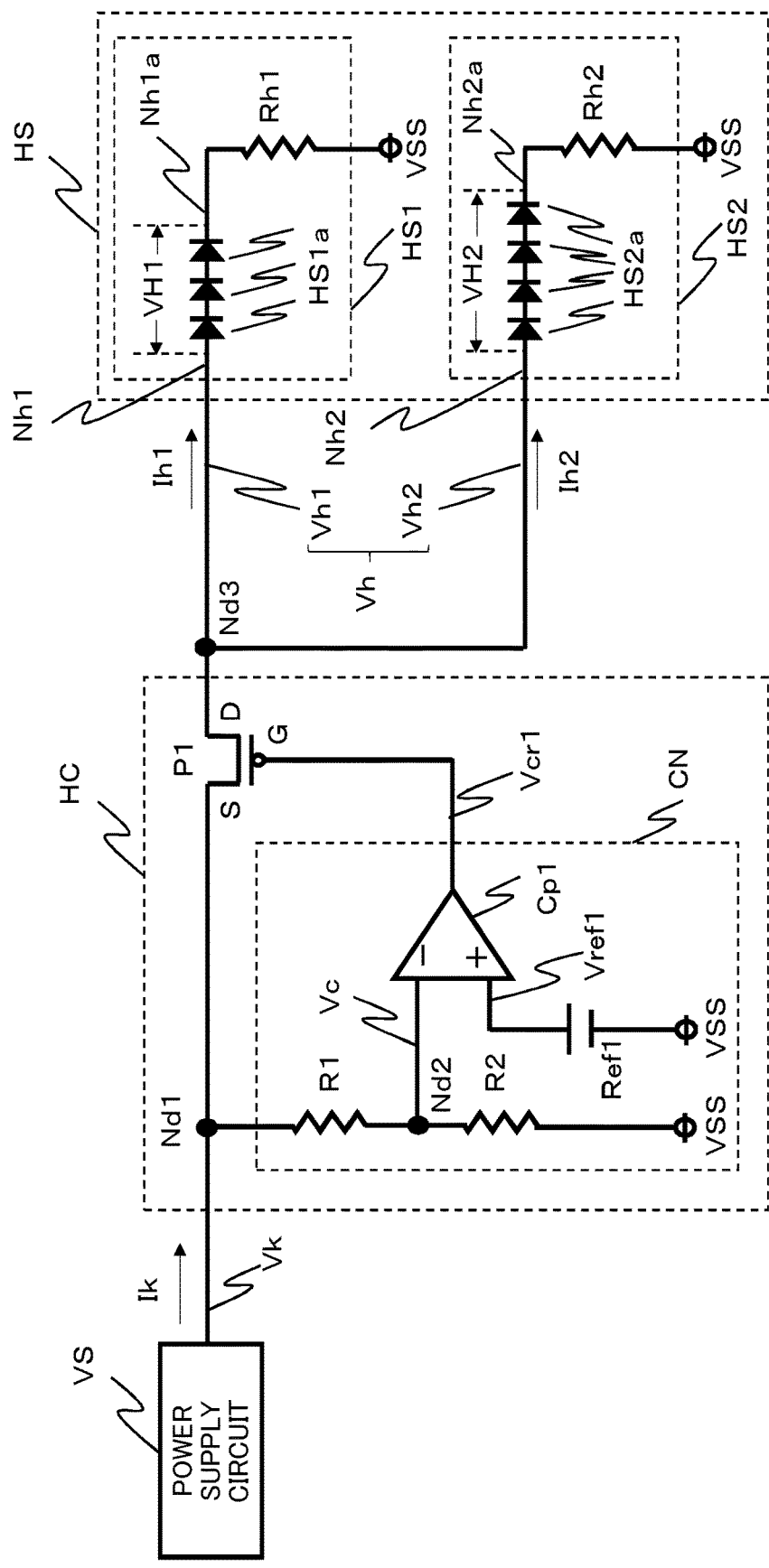
FIG. 1 is a diagram illustrating a lighting device 10 according to a first embodiment of the present invention.

FIG. 1 is a diagram illustrating a lighting device 10 according to a first embodiment of the present invention. The lighting device 10 includes a power supply circuit VS, light emitting element groups HS, and a light emission control unit HC. The lighting device 10 is used as an in-vehicle exterior lamp such as a head lamp, a winker, a hazard lamp, or a brake lamp, but this is not a limitation.

The power supply circuit VS outputs a drive voltage Vk of 12 V, for example. In addition, the power supply circuit VS can supply a drive current Ik having a current value corresponding to a load to which the drive voltage Vk is supplied.

The light emitting element groups HS include a light emitting element group HS1, and a light emitting element group HS2. The light emitting element groups HS are the load to which the drive voltage Vk is supplied.

The light emitting element group HS1 includes a plurality of light emitting elements HS1a connected in series, and a resistor element Rh1. The light emitting element HS1a is a light emitting diode (LED) and is a self light emitting element. The cathode of the light emitting element HS1a as one terminal of the light emitting element group HS1 is connected to one terminal of the resistor element Rh1. The other terminal of the resistor element Rh1 is connected to a power supply VSS as a first power supply having a potential such as 0 V lower than the drive voltage Vk. Note that the light emitting element HS1a is not limited to an LED but may be a general organic electro luminescence (EL) element such as a light emitting polymer as a self light emitting element.

The light emitting element group HS1 emits light by alight emission current Ih1 flowing in each of the light emitting elements HS1a, when a light emission voltage Vh1 equal to or higher than a light emission reference voltage VH1 based on the drive voltage Vk is applied to the anode of the light emitting element HS1a as the other terminal of itself. Note that a current value of the light emission current Ih1 is determined based on a resistance value of the resistor element Rh1. In addition, each of the light emitting elements HS1a has an internal resistance, and a forward voltage of one light emitting element HS a is supposed to be 2 V, for example.

Here, the light emission reference voltage VH1 for the light emitting element group HS1 to emit light in this embodiment is 6 V, for example, because the light emitting element group HS1 includes three light emitting elements HS1a connected in series, each of which has a forward voltage of 2 V. In other words, in order that the light emitting element group HS1 emits light, the light emission voltage Vh1 applied to the anode of the light emitting element HS1a on the other terminal must be 6 V or higher.

Here, "the anode of the light emitting element HS1a as the other terminal of the light emitting element group HS1" is referred to as a node Nh1, and "the cathode of the light emitting element HS1a as the one terminal of the light emitting element group HS1" is referred to as a node Nh1a. In addition, "the light emission current Ih1 flowing in each of the light emitting elements HS1a" is referred to as "the light emission current Ih1 flowing in the light emitting element group HS1".

The light emitting element group HS2 includes a plurality of light emitting elements HS2a connected in series, and a resistor element Rh2. The light emitting element HS2a is a light emitting diode (LED) and is a self light emitting element. The cathode of the light emitting element HS2a as one terminal of the light emitting element group HS2 is connected to one terminal of the resistor element Rh2. The other terminal of the resistor element Rh2 is connected to the power supply VSS. Note that the light emitting element HS2a is not limited to an LED but may be a general organic electro luminescence (EL) element as a self light emitting element, though this is not a limitation.

The light emitting element group HS2 emits light by alight emission current Ih2 flowing in each of the light emitting elements HS2a, when a light emission voltage Vh2 equal to or higher than a light emission reference voltage VH2 higher than the light emission reference voltage VH1 based on the drive voltage Vk is applied to the anode of the light emitting element HS2a as the other terminal of itself. Note that a current value of the light emission current Ih2 is determined based on a resistance value of the resistor element Rh2. In addition, each of the light emitting elements HS2a has an internal resistance, and a forward voltage of one light emitting element HS2a is supposed to be 2 V, for example.

Here, the light emission reference voltage VH2 for the light emitting element group HS2 to emit light in this embodiment is 8 V, for example, because the light emitting element group HS2 includes four light emitting elements HS2a connected in series, each of which has a forward voltage of 2 V. In other words, in order that the light emitting element group HS2 emits light, the light emission voltage Vh2 applied to the anode of the light emitting element HS2a on the other terminal must be 8 V or higher.

Here, "the anode of the light emitting element HS2a as the other terminal of the light emitting element group HS2" is referred to as a node Nh2, and "the cathode of the light emitting element HS2a as the one terminal of the light emitting element group HS2" is referred to as a node Nh2a. In addition, "the light emission current Ih2 flowing in each of the light emitting elements HS2a" is referred to as "the light emission current Ih2 flowing in the light emitting element group HS2".

Here, in order that the light emitting element groups HS emits light without an internal variation in this embodiment, i.e. in order that the light emitting element group HS1 and the light emitting element group 2 emit light simultaneously, a voltage higher than 8 V as the light emission reference voltage VH2 must be applied to the light emitting element groups HS as light emission voltage Vh, because the light emission reference voltage VH2 is 8 V and is higher than the light emission reference voltage VH1 that is 6 V. Here, the voltage for the light emitting element groups HS to emit light without an internal variation is referred to as light emission reference voltage VH. The light emitting element groups HS emits light when being applied with the light emission voltage Vh higher than the light emission reference voltage VH based on the light emission reference voltage VH2. Note that, in this embodiment, the light emission reference voltage VH is 8 V that is the same as the light emission reference voltage VH2.

Note that this embodiment describes the example where the light emitting element group HS2 includes more number of light emitting elements HS2a than the number of the light emitting elements HS1a disposed in the light emitting element group HS1, but this is not a limitation. In other words, the lighting device 10 according to the present invention achieves outstanding effects in cases where the light emission reference voltage VH1 necessary for the light emitting element group HS1 to emit light is different from the light emission reference voltage VH2 necessary for the light emitting element group HS2 to emit light, and a case where the light emitting element group HS1 and the light emitting element group HS2 have the same number of light emitting elements is not excluded. In addition, in the same manner, each of the light emitting elements group HS1 and the light emitting element group HS2 may have a single LED.

Here, if the light emitting element groups HS are applied with the light emission voltage Vh, which is equal to or higher than the light emission reference voltage VH1 and lower than or equal to the light emission reference voltage VH2 without any control, the light emitting element group HS1 emits light while the light emitting element group HS2 does not emit light. In addition, after that, when the light emission voltage Vh becomes equal to or higher than the light emission reference voltage VH2 and is applied to the light emitting element groups HS, not only the light emitting element group HS1 but also the light emitting element group HS2 emits light. In other words, if the light emitting element groups HS are applied with the light emission voltage Vh lower than the reference voltage VH2, light emission timing is varied between the light emitting element group HS1 and the light emitting element group HS2, and hence light emission of the entire light emitting element groups HS may be fluctuated. In particular, when being used as an in-vehicle exterior lamp, the fluctuation in light emission of the light emitting element groups may cause an accident. The lighting device 10 according to the present invention is aimed to prevent occurrence of such a problem.

The light emission control unit HC includes a comparing circuit CN and a transistor P1.

The comparing circuit CN includes a resistor element R1, a resistor element R2, a reference power supply Ref1, and a comparator Cp1.

The resistor element R1 has one terminal connected to the power supply circuit VS and has a resistance value of 400 ohms, for example. Here, connection node between the resistor element R1, i.e. the comparing circuit CN and the power supply circuit VS is referred to as a node Nd1. The resistor element R2 has one terminal connected to the other terminal of the resistor element R1, and the other terminal connected to the power supply VSS, and has a resistance value of 200 ohms, for example. Here, a connection node between the other terminal of the resistor element R1 and the one terminal of the resistor element R2 is referred to as a node Nd2, and a potential at the node Nd2 is referred to as a comparison voltage Vc. The potential at the node Nd2 is a potential obtained by dividing the drive voltage Vk by the resistor element R1 and the resistor element R2.

The reference power supply Ref1 has one terminal connected to the power supply VSS and generates a reference voltage Vref1 as a first reference voltage. The reference voltage Vref1 is set to be equal to or higher than a voltage value obtained by dividing the light emission reference voltage VH by the resistor element R1 and the resistor element R2. In other words, the reference voltage Vref1 is set based on the light emission reference voltage VH. In this embodiment, the reference voltage Vref1 is set to 3 V, for example, which is higher than 2.6 V obtained by dividing 8 V as the light emission reference voltage VH by 400 ohms of the resistor element R1 and 200 ohms of the resistor element R2.

The comparator Cp1 has an inverting terminal connected to the node Nd2, to which the comparison voltage Vc is input, and a noninverting terminal connected to the other terminal of the reference power supply Ref1, to which the reference voltage Vref1 is input. The comparator Cp1 compares the comparison voltage Vc with the reference voltage Vref1, and outputs a comparison result signal Vcr1 as the comparison result from an output terminal. If the comparison voltage Vc is lower than the reference voltage Vref1, the comparator Cp1 outputs the comparison result signal Vcr1 of high level that is substantially the same voltage level as the drive voltage Vk, for example. If the comparison voltage Vc is higher than the reference voltage Vref1, the comparator Cp1 outputs the comparison result signal Vcr1 of low level that is 0 V, for example.

As described above, the comparing circuit CN is connected to the power supply circuit VS, determines whether the drive voltage Vk is higher or lower than a voltage based on the light emission reference voltage VH, and outputs the result as the comparison result signal Vcr1.

The transistor P1 is a PMOS transistor having a source terminal S connected to the power supply circuit VS, a drain terminal D connected to the node Nh1 and the node Nh2, and a gate terminal G as a control terminal connected to the output terminal of the comparator Cp1, i.e. to the comparing circuit CN. The transistor P1 is on-off controlled by the comparison result signal Vcr1, which is output from the comparing circuit CN and input to the gate terminal G. In this way, light emission control and light emission stop control of the light emitting element groups HS are performed.

Note that the connection node among the drain terminal D of the transistor P1, the node Nh1, and the node Nh2 is referred to as a node Nd3. The light emitting element group HS1 and the light emitting element group HS2 are connected in parallel to each other at the node Nd3 that is the connection node to the drain terminal D of the transistor P1.

The transistor P1 is turned off when the comparison result signal Vcr1 at high level output from the comparing circuit CN is input to the gate terminal G. In this case, the potential at the node Nd3 becomes 0 V, and thus the light emission voltage Vh becomes 0 V. Therefore, the light emission voltage Vh1 applied to the light emitting element group HS1 is 0 V, and the light emission current Ih1 flowing in the light emitting element group HS1 is stopped to be 0 A, so that the light emitting element group HS1 does not emit light. In addition, the light emission voltage Vh2 applied to the light emitting element group HS2 is 0 V, and the light emission current Ih2 flowing in the light emitting element group HS2 becomes 0 A, so that the light emitting element group HS2 does not emit light.

In addition, the transistor P1 is turned on when the low level comparison result signal Vcr1 output from the comparing circuit CN is input to the gate terminal G. In this case, the potential at the node Nd3 becomes 9 V or higher, for example, and the light emission voltage Vh becomes 9 V or higher. Therefore, the light emitting element group HS1 is applied with the light emission voltage Vh1 higher than 6 V as the light emission reference voltage VH1, and the light emission current Ih1 flows so that the light emitting element group HS1 emits light. In addition, the light emitting element group HS2 is applied with the light emission voltage Vh2 higher than 8 V as the light emission reference voltage VH2, and the light emission current Ih2 flows so that the light emitting element group HS2 emits light.

As described above, the light emission control unit HC detects a magnitude relationship between the drive voltage Vk and the light emission reference voltage VH. If the drive voltage Vk is higher than the light emission reference voltage VH, the light emission control unit HC performs the light emission control to cause light emission of the light emitting element groups HS by turning on the transistor P1 so that the light emission current Ih1 can be supplied to the light emitting element group HS1 and the light emission current Ih2 can be supplied to the light emitting element group HS2. If the drive voltage Vk is lower than the light emission reference voltage VH, the light emission control unit HC performs the light emission stop control to stop light emission of the light emitting element groups HS by turning off the transistor P1 so that the light emission current Ih1 cannot be supplied to the light emitting element group HS1 and the light emission current Ih2 cannot be supplied to the light emitting element group HS2. Therefore, the lighting device 10 according to this embodiment can cause as well as stop the light emission of the light emitting element group HS1 and the light emitting element group HS2 at the same time.

Figure 2:
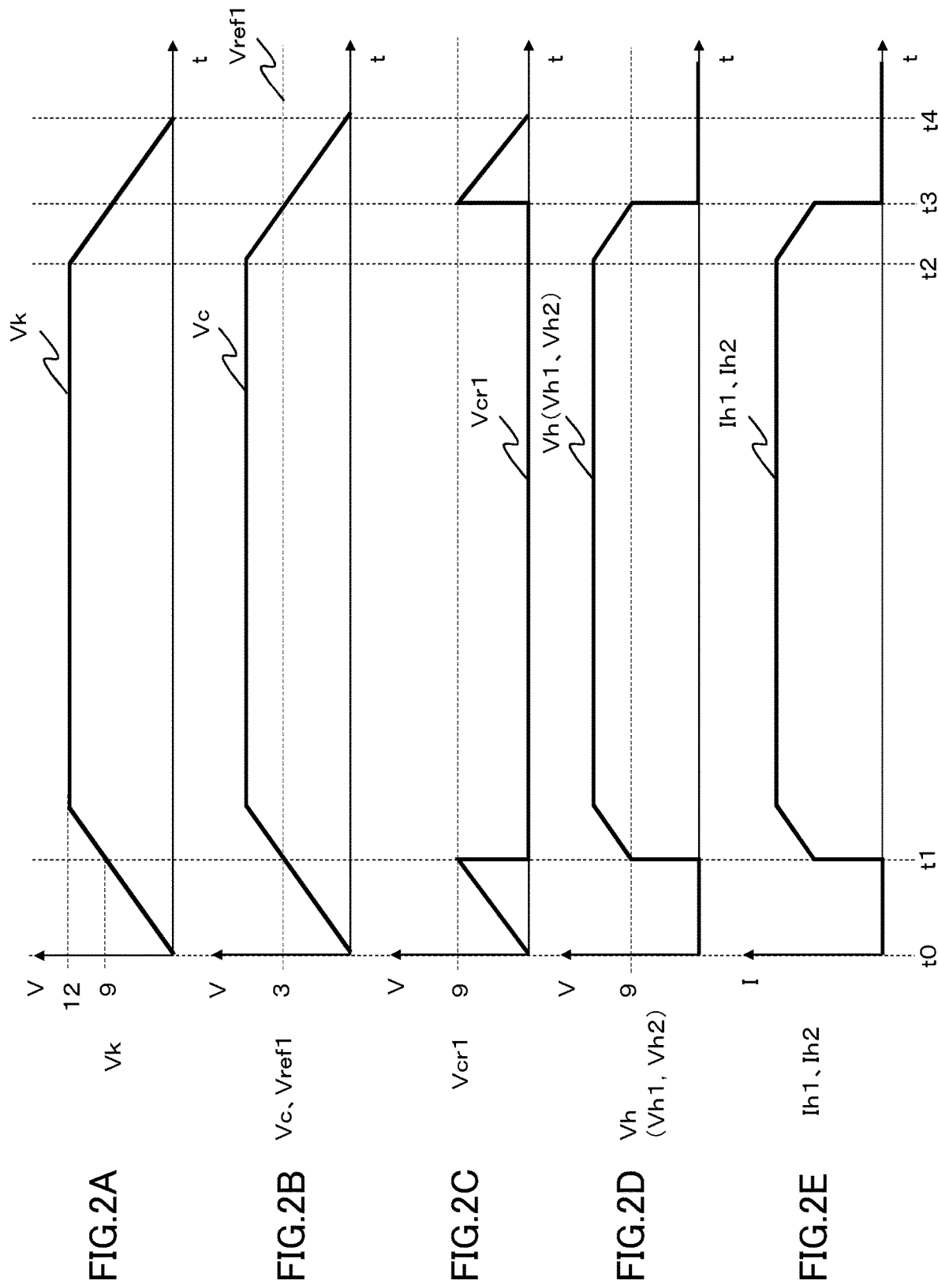
FIGS. 2A to 2E are diagrams illustrating transitions of signal waveforms from rising to falling of a power supply to drive the lighting device 10.

FIGS. 2A to 2E are diagrams illustrating transitions of signal waveforms from rising to falling of a power supply to drive the lighting device 10. FIG. 2A indicates the transition of the drive voltage Vk in temporal change. FIG. 2B indicates a relationship between the transition of the comparison voltage Vc and the reference voltage Vref1 in temporal change. FIG. 2C indicates the transition of the comparison result signal Vcr1 in temporal change. FIG. 2D indicates the transition of the light emission voltage Vh in temporal change. FIG. 2E indicates the transitions of the light emission current Ih1 and the light emission current Ih2 in temporal change. Note that, in each of FIGS. 2A to 2D, the vertical axis represents voltage V, and the horizontal axis represents time t. Further, in FIG. 2E, the vertical axis represents current I, and the horizontal axis represents time t. Further, time points t0 to t4 are common among FIGS. 2A to 2E.

At time point t0, drive of the power supply to drive the lighting device 10 is started, and then a voltage level of the drive voltage Vk output from the power supply circuit VS starts to increase. In this case, the comparison voltage Vc obtained by dividing the drive voltage Vk is equal to or lower than 3 V as the reference voltage Vref1, and hence the comparison result signal Vcr1 has substantially the same level as the drive voltage Vk, so that the transistor P1 is in off state. Therefore, the light emission voltage Vh output from the transistor P1 is 0 V, so that the light emission current Ih1 does not flow in the light emitting element group HS1, and the light emission current Ih2 does not flow in the light emitting element group HS2. In other words, at time point t0, the light emitting element groups HS are in off state.

At time point t1, when the drive voltage Vk becomes 9 V, the comparison voltage Vc becomes 3 V, and then becomes higher than 3 V as the reference voltage Vref1. Thus, the comparison result signal Vcr1 is changed to low level. In this way, the transistor P1 is turned on so that the light emission voltage Vh of approximately 9 V is output. In this case, because the light emission voltage Vh1 of approximately 9 V applied to the light emitting element group HS1 is higher than 6 V as the light emission reference voltage VH1, the light emission current Ih1 flows in the light emitting element group HS1 so that the light emitting element group HS1 emits light. In addition, because the light emission voltage Vh2 of approximately 9 V applied to the light emitting element group HS2 is higher than 8 V as the light emission reference voltage VH2, the light emission current Ih2 flows in the light emitting element group HS2 so that the light emitting element group HS2 emits light. In other words, the light emitting element group HS1 and the light emitting element group HS2 emit light at the same timing without a variation.

At time point t2, when the drive of the power supply to drive the lighting device 10 is stopped, the drive voltage Vk starts to decrease. In this case, the light emission voltage Vh, the light emission current Ih1, and the light emission current Ih2, which are output from the transistor P1 based on the comparison voltage Vc obtained by dividing the drive voltage Vk, the light emission voltage Vh, and the drive voltage Vk, also start to decrease.

At time point t3, when the decreasing drive voltage Vk becomes lower than 9 V, the comparison voltage Vc becomes lower than 3 V. In this way, the comparison result signal Vcr1 is changed to substantially the same level as the drive voltage Vk, the transistor P1 is turned off, and output of the light emission voltage Vh, the light emission current Ih1, and the light emission current Ih2 from the transistor P1 is stopped. In this way, supply of the light emission current Ih1 to the light emitting element group HS1 and supply of the light emission current Ih2 to the light emitting element group HS2 are stopped, and hence the light emitting element group HS1 and the light emitting element group HS2 are turned off simultaneously. In this case, the transistor P1 is turned off at a time point when the light emission voltage Vh is higher than 8 V as the light emission reference voltage VH2, it is avoided that the light emitting element group HS1 and the light emitting element group HS2 are turned off at different timings with a variation.

At time point t4, the drive voltage Vk is decreased to 0 V. In this way, drive of the lighting device 10 is stopped.

As described above, in the lighting device 10 according to the first embodiment of the present invention, the light emission control unit HC detects a magnitude relationship between the drive voltage Vk and the light emission reference voltage VH, performs light emission control to cause light emission of the light emitting element groups HS if the drive voltage Vk is higher than the light emission reference voltage VH, and performs light emission stop control to stop light emission of the light emitting element groups HS if the drive voltage Vk is lower than the light emission reference voltage VH. Therefore, it is possible to prevent a variation in timing of causing as well as stopping light emission of the light emitting element group HS1 and the light emitting element group HS2.

[First Variation of First Embodiment]

Figure 3:
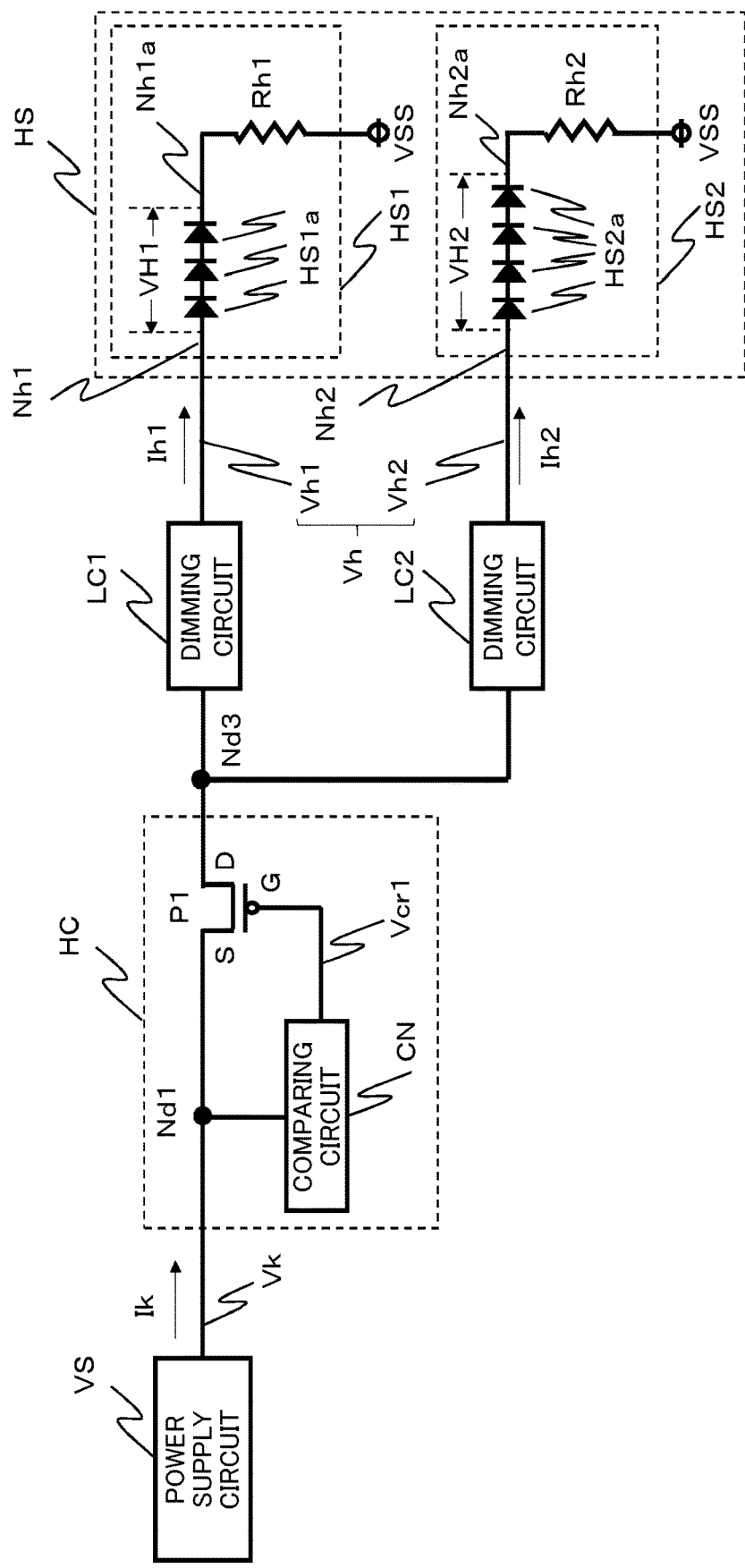
FIG. 3 is a diagram illustrating a lighting device 10a according to a first variation of the first embodiment of the present invention.

FIG. 3 is a diagram illustrating a lighting device 10a according to a first variation of the first embodiment of the present invention. The lighting device 10a includes the power supply circuit VS, the light emitting element groups HS, the light emission control unit HC, a dimming circuit LC1, and a dimming circuit LC2. The lighting device 10a according to this variation is substantially different from the lighting device 10 illustrated in FIG. 1 in that the dimming circuit LC1 and the dimming circuit LC2 are further provided. Note that in the lighting device 10a illustrated in FIG. 3, the same structure as in the lighting device 10 illustrated in FIG. 1 is denoted by the same numeral or symbol, and description thereof is appropriately omitted.

The dimming circuit LC1 has one terminal connected to the node Nd3, i.e. the drain terminal D of the transistor P1 and the other terminal connected to the node Nh1. In other words, the node Nh1 is connected to the node Nd3 via the dimming circuit LC1. The dimming circuit LC1 adjusts the light emission current Ih1 flowing in the light emitting element group HS1 to have a predetermined current value, and thus adjusts light emission luminance of the light emitting element group HS1. Here, when the transistor P1 is turned on, the drive voltage Vk is supplied to the dimming circuit LC1, and when the transistor P1 is turned off, supply of the drive voltage Vk to the dimming circuit LC1 is stopped.

Note that the dimming circuit LC1 may have a structure for adjusting amount of current to flow in the light emitting element group HS1 based on a current value flowing in the light emitting element group HS1, or may have a structure for causing a predetermined amount of current to flow in the light emitting element group HS1 by a PWM control, or other various structures can be adopted without limiting to these structures. In addition, because the lighting device 10a is equipped with the dimming circuit LC1, it is possible to determine the current value of the light emission current Ih1 flowing in the light emitting element group HS1 by the dimming circuit LC1, without the resistor element Rh1, or together with the resistor element Rh1. In addition, this embodiment describes the lighting device 10a having the structure in which the dimming circuit LC1 is connected between the node Nd3 and the node Nh1 as described above, but this is not the limitation, and the dimming circuit LC1 may be connected between the node Nh1a and the power supply VSS.

The dimming circuit LC2 has one terminal connected to the node Nd3, i.e. the drain terminal D of the transistor P1 and the other terminal connected to the node Nh2. In other words, the node Nh2 is connected to the node Nd3 via the dimming circuit LC2. In this way, the series connection of the dimming circuit LC2 and the light emitting element group HS2 is connected in parallel to the series connection of the dimming circuit LC1 and the light emitting element group HS1 at the node Nd3. The dimming circuit LC2 adjusts the light emission current Ih2 flowing in the light emitting element group HS2 to have a predetermined current value, and thus adjusts light emission luminance of the light emitting element group HS2. Here, the drive voltage Vk is supplied to the dimming circuit LC2 when the transistor P1 is turned on, and the supply of the drive voltage Vk to the dimming circuit LC2 is stopped when the transistor P1 is turned off.

Note that the dimming circuit LC2 may have a structure for adjusting amount of current to flow in the light emitting element group HS2 based on a current value flowing in the light emitting element group HS2, or may have a structure for causing a predetermined amount of current to flow in the light emitting element group HS2 by a PWM control, or other various structures can be adopted without limiting to these structures. In addition, because the lighting device 10a is equipped with the dimming circuit LC2, it is possible to determine the current value of the light emission current Ih2 flowing in the light emitting element group HS2 by the dimming circuit LC2, without the resistor element Rh2, or together with the resistor element Rh2. In addition, although this embodiment describes the lighting device 10a having the structure in which the dimming circuit LC2 is connected between the node Nd3 and the node Nh2, this is not the limitation. The dimming circuit LC2 may be connected between the node Nh2a and the power supply VSS.

[Second Variation of First Embodiment]

Figure 4:
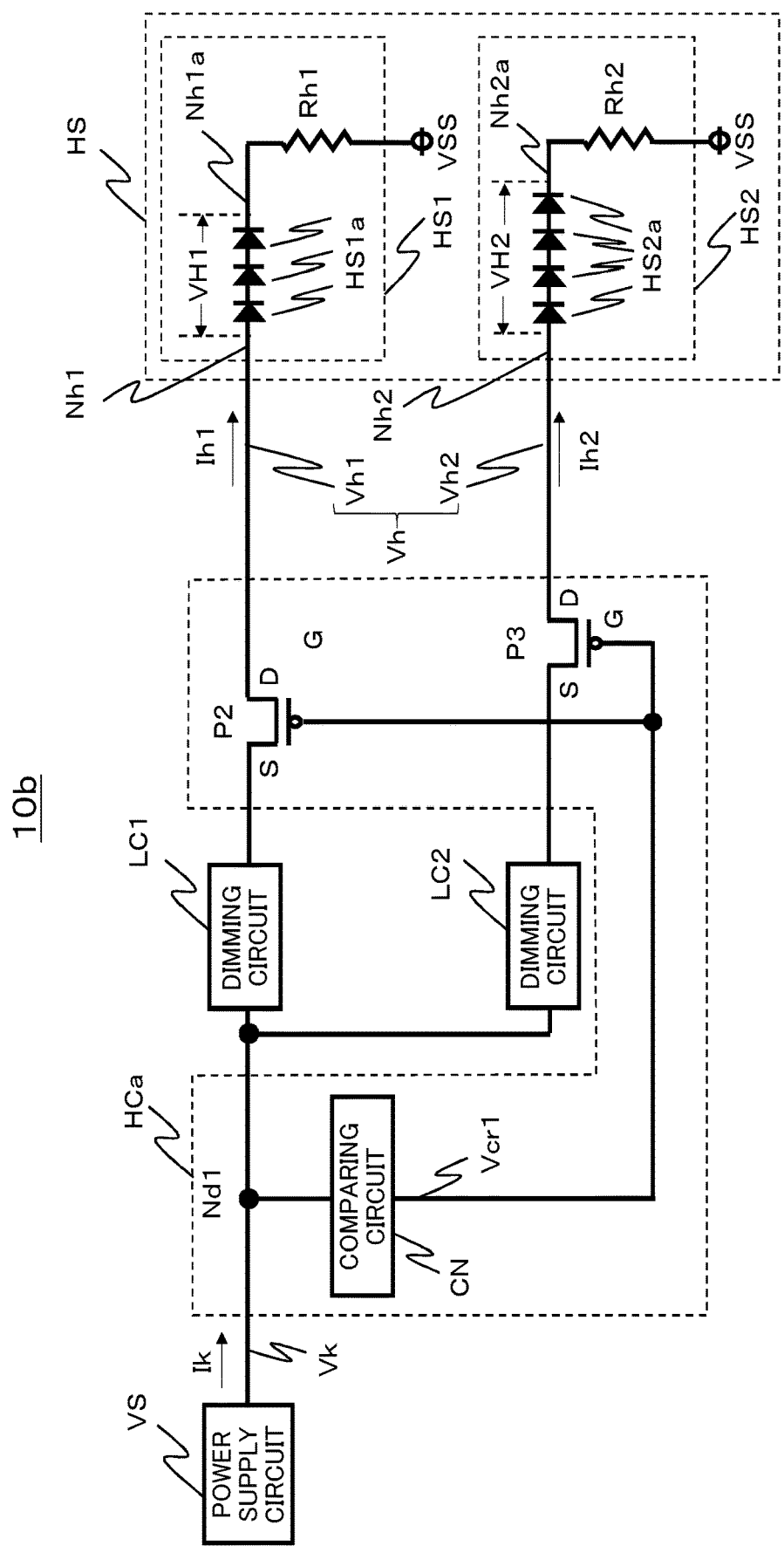
FIG. 4 is a diagram illustrating a lighting device 10b according to a second variation of the first embodiment of the present invention.

FIG. 4 is a diagram illustrating a lighting device 10b according to a second variation of the first embodiment of the present invention. The lighting device 10b includes the power supply circuit VS, the light emitting element groups HS, the dimming circuit LC1, the dimming circuit LC2, and a light emission control unit HCa. The lighting device 10b according to this variation is substantially different from the lighting device 10a illustrated in FIG. 3 in that the light emission control unit HCa is disposed instead of the light emission control unit HC. Note that in the lighting device 10b illustrated in FIG. 4, the same structure as in the lighting device 10 illustrated in FIG. 1 or the lighting device 10a illustrated in FIG. 3 is denoted by the same reference numeral or symbol, and description thereof is appropriately omitted.

The dimming circuit LC1 has one terminal connected to the node Nd1, and thus is connected to the power supply circuit VS. The dimming circuit LC1 adjusts the light emission current Ih1 flowing in the light emitting element group HS1 to have a predetermined current value.

The dimming circuit LC2 has one terminal connected to the node Nd1, and thus is connected to the power supply circuit VS. The dimming circuit LC2 adjusts the light emission current Ih2 flowing in the light emitting element group HS2 to have a predetermined current value.

The light emission control unit HCa includes the comparing circuit CN, a transistor P2, and a transistor P3.

The transistor P2 is a PMOS transistor, which has the source terminal S connected to the other terminal of the dimming circuit LC1, the drain terminal D connected to the node Nh1, and the gate terminal G as a control terminal connected to the comparing circuit CN. The transistor P2 is on-off controlled by the comparison result signal Vcr1, which is output from the comparing circuit CN and is input to the gate terminal G. In this way, light emission control and light emission stop control of the light emitting element groups HS are performed. When the transistor P2 is turned on, the drive voltage Vk, which is supplied from the power supply circuit VS to the source terminal S via the dimming circuit LC1, is output as the light emission voltage Vh1 from the drain terminal D.

When the comparison result signal Vcr1 having high level output from the comparing circuit CN is input to the gate terminal G, the transistor P2 is turned off. In this case, the light emission voltage Vh1 applied to the light emitting element group HS1 becomes 0 V and the light emission current Ih1 supplied to the light emitting element group HS1 to flow becomes 0 A. In other words, supply of the light emission current Ih1 to the light emitting element group HS1 is stopped, and hence the light emitting element group HS1 does not emit light. In addition, when the comparison result signal Vcr1 having low level output from the comparing circuit CN is input to the gate terminal G, the transistor P2 is turned on. In this case, the light emission voltage Vh1 applied to the light emitting element group HS1 becomes equal to or higher than 9 V, which is higher than the light emission reference voltage VH1. Therefore, the light emission voltage Vh1 higher than 6 V as the light emission reference voltage VH1 is applied to the light emitting element group HS1 so that the light emission current Ih1 is supplied to flow. In this way, the light emitting element group HS1 emits light.

The transistor P3 is a PMOS transistor, which has the source terminal S connected to the other terminal of the dimming circuit LC2, the drain terminal D connected to the node Nh2, and the gate terminal G as a control terminal connected to the comparing circuit CN. The transistor P3 is on-off controlled by the comparison result signal Vcr1, which is output from the comparing circuit CN and is input to the gate terminal G. In this way, light emission control and light emission stop control of the light emitting element groups HS are performed. When the transistor P3 is turned on, the drive voltage Vk supplied from the power supply circuit VS to the source terminal S via the dimming circuit LC2 is output as the light emission voltage Vh2 from the drain terminal D.

When the comparison result signal Vcr1 having high level output from the comparing circuit CN is input to the gate terminal G, the transistor P3 is turned off. In this case, the light emission voltage Vh2 applied to the light emitting element group HS1 is 0 V, and the light emission current Ih2 supplied to the light emitting element group HS2 to flow becomes 0 A. In other words, the supply of the light emission current Ih2 to the light emitting element group HS2 is stopped, and hence the light emitting element group HS2 does not emit light. In addition, when the comparison result signal Vcr1 having low level output from the comparing circuit CN is input to the gate terminal G, the transistor P3 is turned on. In this case, the light emission voltage Vh2 applied to the light emitting element group HS2 becomes 9 V or higher, which is higher than the light emission reference voltage VH2. Therefore, the light emission voltage Vh2 higher than 8 V as the light emission reference voltage VH2 is applied to the light emitting element group HS2, and hence the light emission current Ih2 is supplied to flow. In this way, the light emitting element group HS2 emits light.

Here, the series connection of the dimming circuit LC1 and the light emitting element group HS1 is connected in parallel to the series connection of the dimming circuit LC2 and the light emitting element group HS2 with respect to the power supply circuit VS.

As described above, the light emission control unit HCa detects a magnitude relationship between the drive voltage Vk and the light emission reference voltage VH. If the drive voltage Vk is higher than the light emission reference voltage VH, the light emission control unit HCa performs light emission control to cause light emission of the light emitting element groups HS, by turning on the transistor P2 so that the light emission current Ih1 can be supplied to the light emitting element group HS1, and by turning on the transistor P3 so that the light emission current Ih2 can be supplied to the light emitting element group HS2. If the drive voltage Vk is lower than the light emission reference voltage VH, the light emission control unit HCa performs light emission stop control to stop light emission of the light emitting element groups HS, by turning off the transistor P2 so that the light emission current Ih1 cannot be supplied to the light emitting element group HS1, and by turning off the transistor P3 so that the light emission current Ih2 cannot be supplied to the light emitting element group HS2. Therefore, the lighting device 10b according to this embodiment can cause as well as stop the light emission of the light emitting element group HS1 and the light emitting element group HS2 at the same time.

Note that the lighting device 10b according to the second variation of the first embodiment of the present invention includes the transistor P2 and the transistor P3 instead of the transistor P1 in the lighting device 10, and hence the light emission current Ih1 to flow in the light emitting element group HS1 to cause light emission of the light emitting element group HS1 and the light emission current Ih2 to flow in the light emitting element group HS2 to cause light emission of the light emitting element group HS2 can be supplied from the power supply circuit VS to the light emitting element group HS1 and the light emitting element group HS2 through different transistors. Therefore, the current concentrated in the transistor P1 in the lighting device 10 can be distributed between the transistor P2 and the transistor P3, and thus local heat concentration inside the lighting device can be prevented. It is needless to say that this effect is enhanced in proportion to an increase in the number of light emitting elements included in the light emitting element groups HS or the number of light emitting element groups connected in parallel to each other.

Second Embodiment

Figure 5:
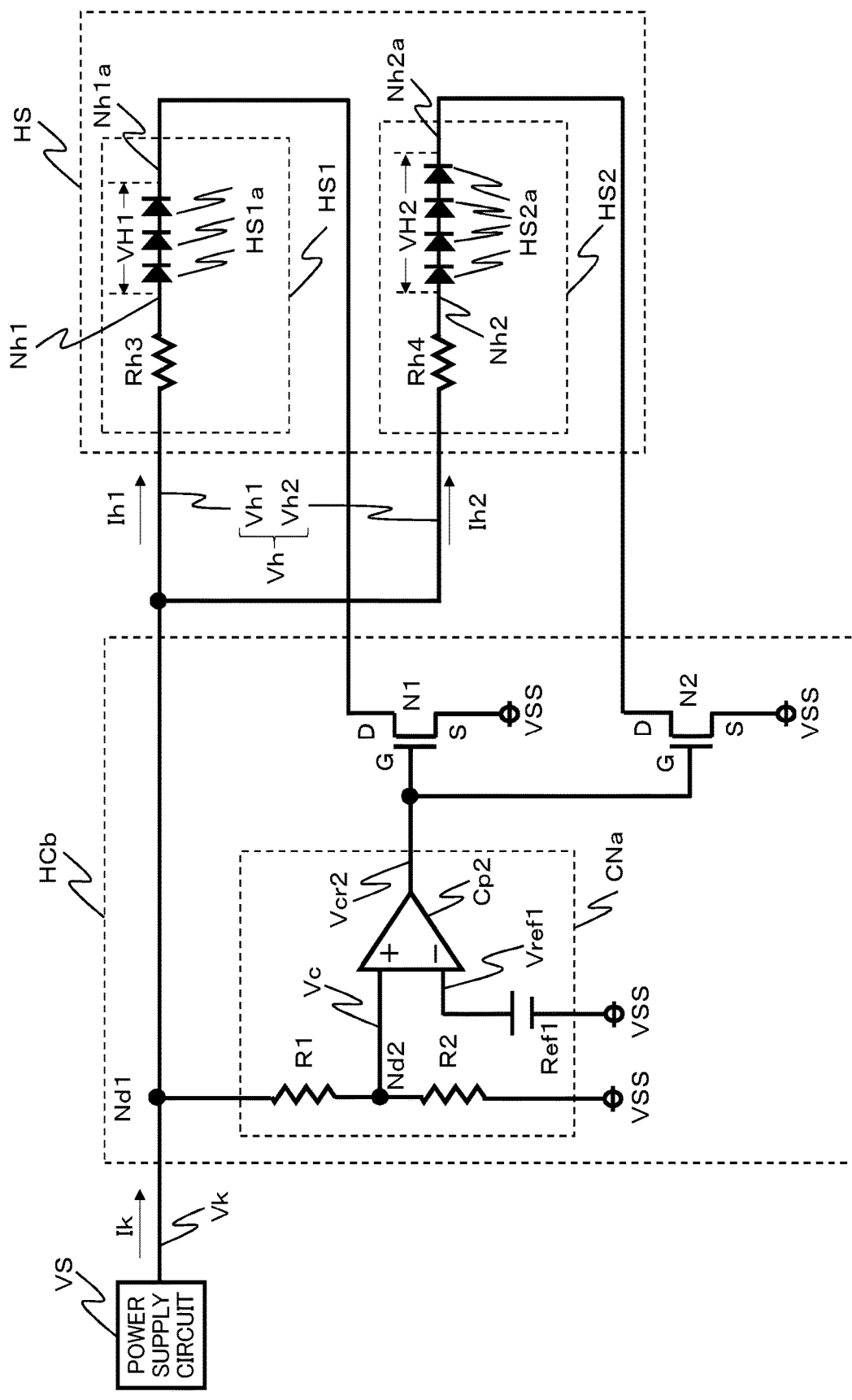
FIG. 5 is a diagram illustrating a lighting device 20 according to a second embodiment of the present invention.

FIG. 5 is a diagram illustrating a lighting device 20 according to a second embodiment of the present invention. The lighting device 20 includes the power supply circuit VS, the light emitting element groups HS, and a light emission control unit HCb. The lighting device 20 according to this embodiment is substantially different from the lighting device 10 illustrated in FIG. 1 in that the light emission control unit HCb is disposed instead of the light emission control unit HC. Note that in the lighting device 20 illustrated in FIG. 5, the same structure as in the lighting device 10 illustrated in FIG. 1 is denoted by the same numeral or symbol, and description thereof is appropriately omitted.

The light emitting element group HS1 has the other terminal connected to the power supply circuit VS. In addition, the light emitting element group HS2 has the other terminal connected to the power supply circuit VS. In this way, the light emitting elements HS1a of the light emitting element group HS1 and the light emitting elements HS2a of the light emitting element group HS2 are connected in parallel to each other with respect to the power supply circuit VS. Note that the light emitting element group HS1 in the lighting device 20 includes a resistor element Rh3 instead of the resistor element Rh1 in the lighting device 10, which has one terminal connected to the power supply circuit VS and the other terminal connected to the node Nh1. The light emission current Ih1 is determined based on resistance values of the light emitting elements HS1a and the resistor element Rh3. In addition, the light emitting element group HS2 in the lighting device 20 includes a resistor element Rh4 instead of the resistor element Rh2 in the lighting device 10, which has one terminal connected to the power supply circuit VS and the other terminal connected to the node Nh2. The light emission current Ih2 is determined based on resistance values of the light emitting elements HS2a and the resistor element Rh4. In addition, the resistance value of the resistor element Rh3 is larger than the resistance value of the resistor element Rh4, and is formed so that a voltage determined by a series resistance value of an internal resistance of the light emitting element HS a and the resistor element Rh3 and the light emission current Ih1 is the same as a voltage determined by a series resistance value of an internal resistance of the light emitting element HS2a and the resistor element Rh4 and the light emission current Ih2. In this way, the light emission current Ih1 flowing in the light emitting element group HS1 and the light emission current Ih2 flowing in the light emitting element group HS2 have the same current value, and hence the light emitting element group HS1 and the light emitting element group HS2 have the same light emission luminance. However, if it is not necessary that the light emitting element group HS1 and the light emitting element group HS2 have the same light emission luminance, it is not necessary to set the resistance value of the resistor element Rh3 to be larger than the resistance value of the resistor element Rh4.

The light emission control unit HCb includes a comparing circuit CNa, a transistor N1, and a transistor N2.

The comparing circuit CNa includes the resistor element R1, the resistor element R2, the reference power supply Ref1, and a comparator Cp2. Note that the connection node between the resistor element R1 and the power supply circuit VS is Nd1, and hence in this embodiment, the node Nd1 is a connection node between the comparing circuit CNa and the power supply circuit VS, in other words.

The comparator Cp2 has a noninverting terminal connected to the node Nd2 so as to receive the comparison voltage Vc, and an inverting terminal connected to the other terminal of the reference power supply Ref1 so as to receive the reference voltage Vref1. The comparator Cp2 compares the comparison voltage Vc with the reference voltage Vref1 and outputs a comparison result signal Vcr2 as a result of the comparison from an output terminal. If the comparison voltage Vc is lower than the reference voltage Vref1, the comparator Cp2 outputs the comparison result signal Vcr2 of low level that is 0 V, for example. If the comparison voltage Vc is higher than the reference voltage Vref1, the comparator Cp2 outputs the comparison result signal Vcr2 of high level that is substantially the same as the drive voltage Vk, for example.

As described above, the comparing circuit CNa is connected to the power supply circuit VS and determines whether the drive voltage Vk is higher or lower than a voltage based on the light emission reference voltage VH, and outputs the comparison result signal Vcr2 as a result.

The transistor N1 is an NMOS transistor and has the gate terminal G as a control terminal connected to the output terminal of the comparator Cp2, i.e. to the comparing circuit CNa, the drain terminal D connected to the node Nh1a, and the source terminal S connected to the power supply VSS. In other words, the node Nh1a is connected to the power supply VSS via the transistor N1. The transistor N1 is on-off controlled by the comparison result signal Vcr2 that is output from the comparing circuit CNa and is input to the gate terminal G. In this way, light emission control and light emission stop control of the light emitting element group HS1 are performed.

The transistor N1 is turned off when the low level comparison result signal Vcr2 output from the comparing circuit CNa is input to the gate terminal G. In this case, the light emission current Ih1 flowing in the light emitting element group HS1 is stopped to be 0 A. In other words, supply of the light emission current Ih1 to the light emitting element group HS1 is stopped, and hence the light emitting element group HS1 does not emit light. In addition, the transistor N1 is turned on when the high level comparison result signal Vcr2 output from the comparator Cp2 is input to the gate terminal G. In this case, because the light emitting element group HS1 is applied with the light emission voltage Vh1 higher than the reference voltage VH1, the light emission current Ih1 flows in the light emitting element group HS1. In this way, the light emitting element group HS1 emits light.

The transistor N2 is an NMOS transistor and has the gate terminal G as a control terminal connected to the output terminal of the comparator Cp2, i.e., to the comparing circuit CNa, the drain terminal D connected to the node Nh2a, and the source terminal S connected to the power supply VSS. In other words, the node Nh2a is connected to the power supply VSS via the transistor N2. The transistor N2 is on-off controlled by the comparison result signal Vcr2 that is output from the comparing circuit CNa and is input to the gate terminal G. In this way, light emission control and light emission stop control of the light emitting element group HS2 are performed.

When the low level comparison result signal Vcr2 output from the comparing circuit CNa is input to the gate terminal G, the transistor N2 is turned off. In this case, the light emission current Ih2 flowing in the light emitting element group HS2 is stopped to be 0 A. In other words, the supply of the light emission current Ih2 to the light emitting element group HS2 is stopped, and hence the light emitting element group HS2 does not emit light. In addition, when the high level comparison result signal Vcr2 output from the comparator Cp2 is input to the gate terminal G, the transistor N2 is turned on. In this case, because the light emission voltage Vh2 higher than the reference voltage VH1 is applied to the light emitting element group HS2, the light emission current Ih2 flows in the light emitting element group HS2. In this way, the light emitting element group HS2 emits light.

As described above, the light emission control unit HCb detects a magnitude relationship between the drive voltage Vk and the light emission reference voltage VH. If the drive voltage Vk is higher than the light emission reference voltage VH, the light emission control unit HCb performs light emission control to cause light emission of the light emitting element groups HS by turning on the transistor N1 so that the light emission current Ih1 can be supplied to the light emitting element group HS1, and by turning on the transistor N2 so that the light emission current Ih2 can be supplied to the light emitting element group HS2. If the drive voltage Vk is lower than the light emission reference voltage VH, the light emission control unit HCb performs light emission stop control to stop light emission of the light emitting element groups HS by turning off the transistor N1 so that the light emission current Ih1 cannot be supplied to the light emitting element group HS1, and by turning off the transistor N2 so that the light emission current Ih2 cannot be supplied to the light emitting element group HS2. Therefore, the lighting device 20 according to this embodiment can cause as well as stop the light emission of the light emitting element group HS1 and the light emitting element group HS2 at the same time.

Note that the lighting device 20 performs the light emission control and the light emission stop control by controlling on and off of the transistor N1 connected between the node Nh1a and the power supply VSS, and by controlling on and off of the transistor N2 connected between the node Nh2a and the power supply VSS, and hence it is not necessary to connect the PMOS transistors between the power supply circuit VS and the light emitting element group HS1 as well as the light emitting element group HS2, for performing the light emission control and the light emission stop control, like the lighting devices 10, 10a, and 10b in the first embodiment. Therefore, the light emission voltage Vh1 based on the drive voltage Vk output from the power supply circuit VS can be supplied to the light emitting element group HS1 without causing a voltage drop, and the light emission voltage Vh2 can be supplied to the light emitting element group HS2 without causing a voltage drop. Therefore, the light emitting element group HS1 and the light emitting element group HS2 can emit light by a lower voltage as the drive voltage Vk.

In addition, the lighting device 20 performs the light emission control and the light emission stop control by controlling on and off of the transistor N1 connected between the node Nh1a and the power supply VSS, and by controlling on and off of the transistor N2 connected between the node Nh2a and the power supply VSS, and hence it is not necessary to use the PMOS transistors for performing the light emission control and the light emission stop control, like the lighting devices 10, 10a, and 10b in the first embodiment. In other words, the light emission control and the light emission stop control can be performed by the NMOS transistors that requires a smaller size than the PMOS transistors for achieving the same drive ability, and hence it is possible to reduce the area of the lighting devices compared with the lighting devices 10, 10a, and 10b in the first embodiment.

FIGS. 6A to 6E are diagrams illustrating transitions of signal waveforms from rising to falling of the power supply to drive the lighting device 20. FIG. 6A indicates the transition of the drive voltage Vk in temporal change. FIG. 6B indicates a relationship between the transition of the comparison voltage Vc and the reference voltage Vref1 in temporal change. FIG. 6C indicates the transition of the comparison result signal Vcr2 in temporal change. FIG. 6D indicates the transitions of the light emission voltage Vh1 and the light emission voltage Vh2 in temporal change. FIG. 6E indicates the transitions of the light emission current Ih1 and the light emission current Ih2 in temporal change. Note that in each of FIGS. 6A to 6D, the vertical axis represents voltage V, and the horizontal axis represents time t. Further, in FIG. 6E, the vertical axis represents current I, and the horizontal axis represents time t. Further, time points t10 to t14 are common among FIGS. 6A to 6E. In addition, in FIG. 6E, the light emission current Ih1 and the light emission current Ih2 are shown to have the same current value, but this is not a limitation in reality. In addition, in FIGS. 6A to 6E, the signal waveform described in the first embodiment with reference to FIGS. 2A to 2E is denoted by the same numeral or symbol, and description thereof is appropriately omitted.

At time point t10, drive of the power supply to drive the lighting device 20 is started so that the drive voltage Vk starts to increase. In this case, the comparison voltage Vc is equal to or lower than 3 V as the reference voltage Vref1, and hence the comparison result signal Vcr2 is low level. In addition, because the comparison result signal Vcr2 is low level, the transistor N1 and the transistor N2 is turned off, the light emission current Ih1 does not flow in the light emitting element group HS1, and the light emission current Ih2 does not flow in the light emitting element group HS2. In other words, at time point t10, the light emitting element groups HS are in off state.

At time point t11, the comparison voltage Vc becomes equal to or higher than the reference voltage Vref1, and the comparison result signal Vcr2 becomes high level so that the transistor N1 and the transistor N2 are turned on. In this case, the light emission voltage Vh1 and the light emission voltage Vh2 are approximately 9 V, and hence the light emission current Ih1 flows in the light emitting element group HS1 so that the light emitting element group HS1 emits light. In addition, the light emission current Ih2 flows in the light emitting element group HS2 so that the light emitting element group HS2 emits light. In other words, all the light emitting elements HS1a of the light emitting element group HS1 and all the light emitting elements HS2a of the light emitting element group HS2 emit light at the same timing without a variation.

At time point t12, when the drive of the power supply to drive the lighting device 20 is stopped, the drive voltage Vk starts to decrease. In this case, the comparison voltage Vc, the light emission voltage Vh1, the light emission current Ih1, the light emission voltage Vh2, and the light emission current Ih2 also start to decrease.

At time point t13, the decreased drive voltage Vk becomes lower than 9 V, and the comparison voltage Vc becomes lower than 3 V. In this way, the comparison result signal Vcr2 becomes low level, and hence the transistor N1 and the transistor N2 are turned off. Then, the light emission current Ih1 flowing in the light emitting element group HS1 and the light emission current Ih2 flowing in the light emitting element group HS2 are stopped so that the light emitting element group HS1 and the light emitting element group HS2 are turned off at the same time. In this case, the transistor N1 and the transistor N2 are turned off at a time point when the light emission voltage Vh1 and the light emission voltage Vh2 are higher than 8 V as the reference voltage VH2. Therefore, it is avoided that the light emitting element group HS1 and the light emitting element group HS2 are turned off at different timings with a variation.

At time point t14, the drive voltage Vk is decreased to 0 V. In this way, drive of the lighting device 20 is stopped.

As described above, in the lighting device 20 according to the second embodiment of the present invention, the light emission control unit HCb detects a magnitude relationship between the drive voltage Vk and the light emission reference voltage VH. If the drive voltage Vk is higher than the light emission reference voltage VH, the lighting device 20 performs light emission control to cause light emission of the light emitting element groups HS. If the drive voltage Vk is lower than the light emission reference voltage VH, the lighting device 20 performs light emission stop control to stop light emission of the light emitting element groups HS. Therefore, it is possible to prevent a variation in timing of causing as well as stopping light emission of the light emitting element group HS1 and the light emitting element group HS2.

[First Variation of Second Embodiment]

Figure 7:
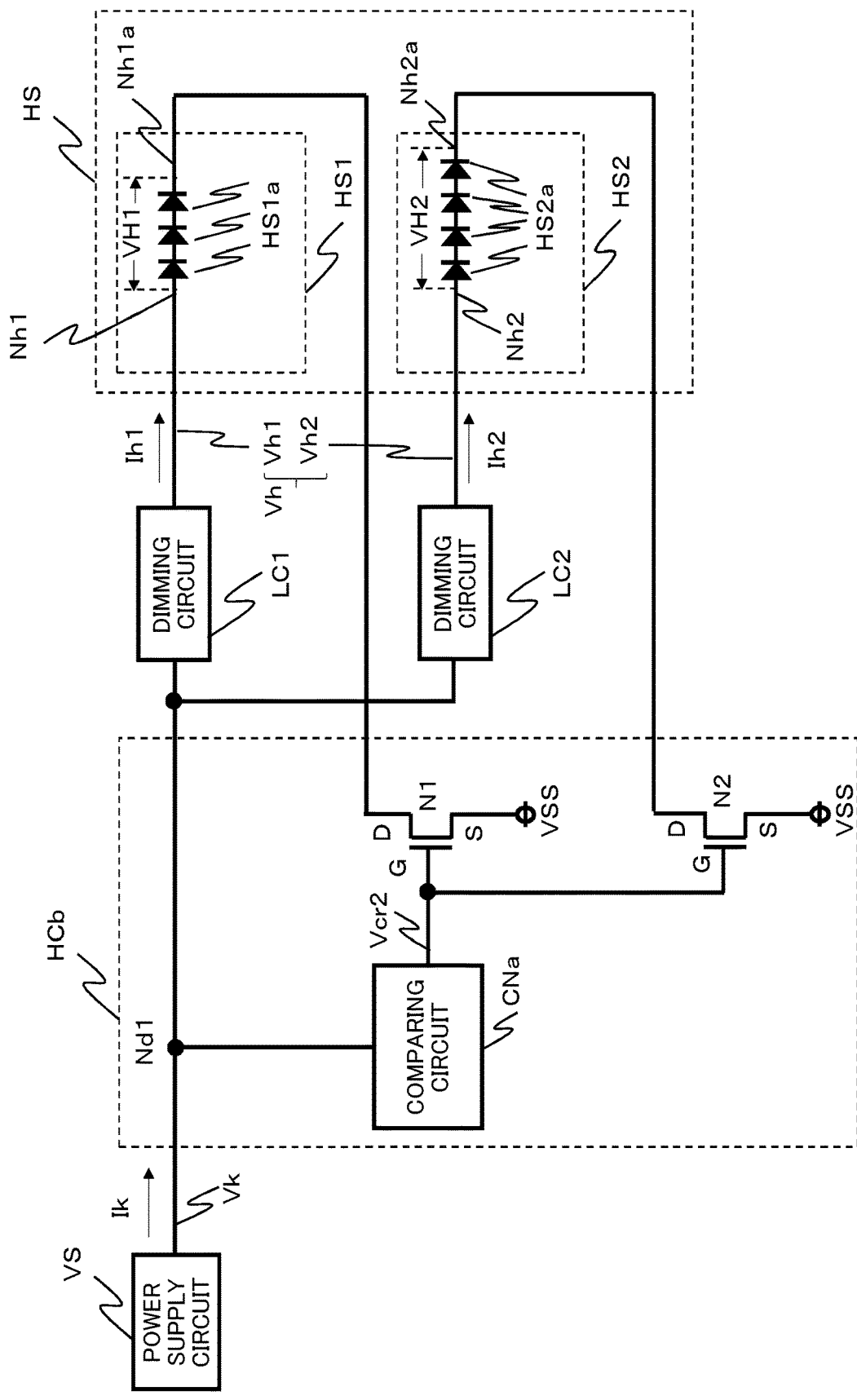
FIG. 7 is a diagram illustrating a lighting device 20a according to a first variation of the second embodiment of the present invention.

FIG. 7 is a diagram illustrating a lighting device 20a according to a first variation of the second embodiment of the present invention. The lighting device 20a includes the power supply circuit VS, the light emitting element groups HS, the light emission control unit HCb, the dimming circuit LC1, and the dimming circuit LC2. The lighting device 20a according to this variation is substantially different from the lighting device 20 illustrated in FIG. 5 in that the dimming circuit LC1 and the dimming circuit LC2 are further provided. Note that in the lighting device 20a illustrated in FIG. 7, the same structure as in the lighting device 10a illustrated in FIG. 3, the lighting device 10b illustrated in FIG. 4, or the lighting device 20 illustrated in FIG. 5 is denoted by the same numeral or symbol, and description thereof is appropriately omitted.

The dimming circuit LC1 has one terminal connected to the node Nd1 so as to be connected to the power supply circuit VS. In addition, the dimming circuit LC1 has the other terminal connected to the node Nh1. In other words, the node Nh1 is connected to the power supply circuit VS via the dimming circuit LC1 and the node Nd1. The dimming circuit LC1 adjusts the light emission current Ih1 flowing in the light emitting element group HS1 to have a predetermined current value.

Note that the lighting device 20a according to this embodiment has the structure in which the dimming circuit LC1 is connected between the node Nd1 and the node Nh1, but this is not a limitation. The dimming circuit LC1 may be connected between the node Nh1a and the power supply VSS.

The dimming circuit LC2 has one terminal connected to the node Nd1, so as to be connected to the power supply circuit VS. In addition, the dimming circuit LC2 has the other terminal connected to the node Nh2. In other words, the node Nh2 is connected to the power supply circuit VS via the dimming circuit LC2 and the node Nd1. In this way, the series connection of the dimming circuit LC2 and the light emitting element group HS2 is connected in parallel to the series connection of the dimming circuit LC1 and the light emitting element group HS1 at the node Nd1. The dimming circuit LC2 adjusts the light emission current Ih2 flowing in the light emitting element group HS2 to have a predetermined current value.

Note that the lighting device 20a according to this embodiment has the structure in which the dimming circuit LC2 is connected between the node Nd2 and the node Nh2, but this is not a limitation. The dimming circuit LC2 may be connected between the node Nh2a and the power supply VSS.

Third Embodiment

Figure 8:
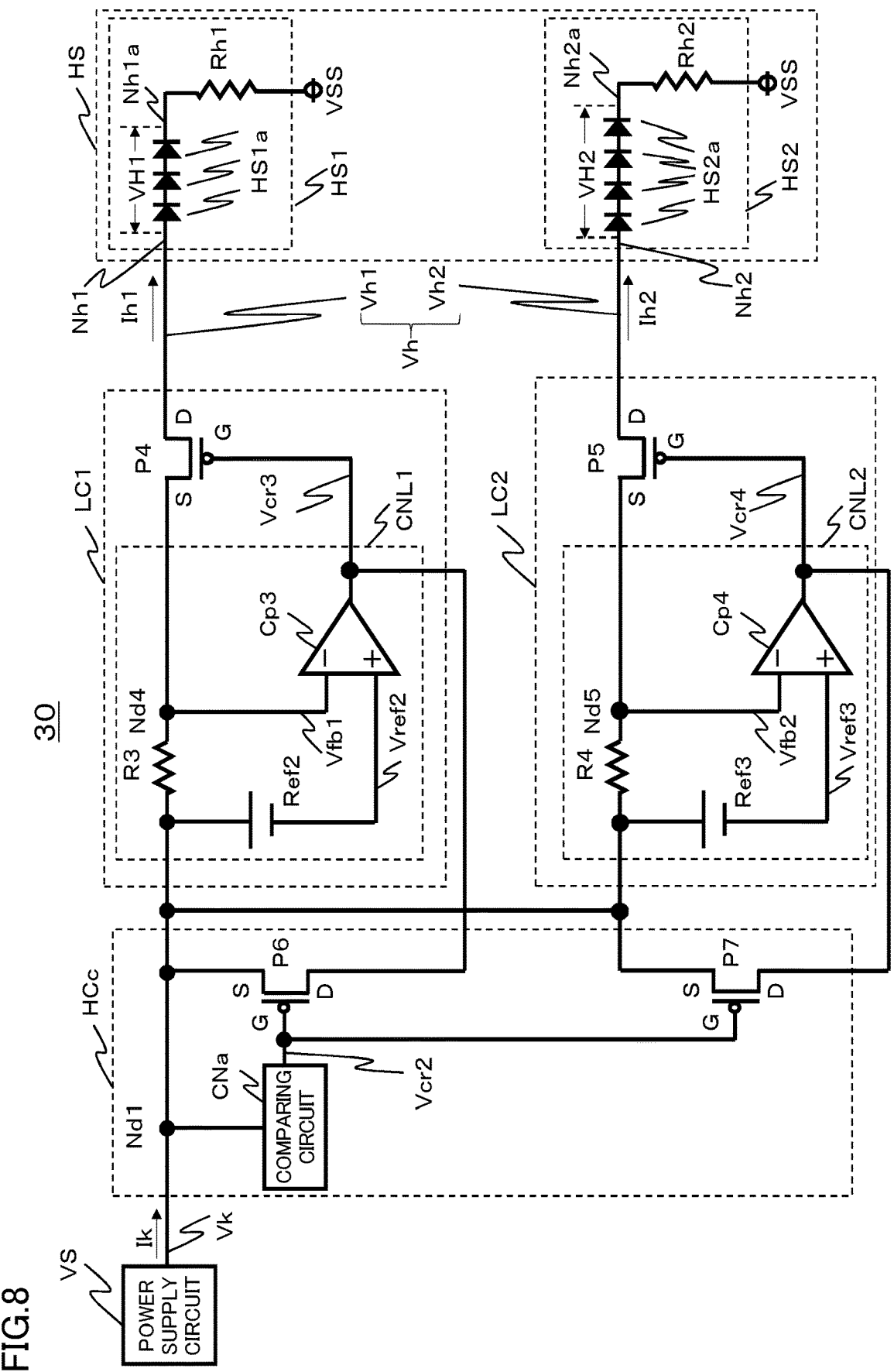
FIG. 8 is a diagram illustrating a lighting device 30 according to a third embodiment of the present invention.

FIG. 8 is a diagram illustrating a lighting device 30 according to a third embodiment of the present invention. The lighting device 30 includes the power supply circuit VS, the light emitting element groups HS, the dimming circuit LC1, the dimming circuit LC2, and a light emission control unit HCc. The lighting device 30 according to this embodiment is substantially different from the lighting device 10a illustrated in FIG. 3 in that the light emission control unit HCc is provided instead of the light emission control unit HC, and is substantially different from the lighting device 10b illustrated in FIG. 4 in that the light emission control unit HCc is provided instead of the light emission control unit HCa, and is substantially different from the lighting device 20a illustrated in FIG. 7 in that the light emission control unit HCc is provided instead of the light emission control unit HCb. Note that in the lighting device 30 illustrated in FIG. 8, the same structure as in the lighting device 10a illustrated in FIG. 3, the lighting device 10b illustrated in FIG. 4, or the lighting device 20a illustrated in FIG. 7 is denoted by the same numeral or symbol, and description thereof is appropriately omitted.

The dimming circuit LC1 has one terminal connected to the node Nd1, so as to be connected to the power supply circuit VS. In addition, the dimming circuit LC1 has the other terminal connected to the node Nh1. In other words, the node Nh1 is connected to the power supply circuit VS via the dimming circuit LC1 and the node Nd1. The dimming circuit LC1 adjusts the light emission current Ih1 flowing in the light emitting element group HS1 to have a predetermined current value, so as to adjust the light emission luminance of the light emitting element group HS1. The dimming circuit LC1 includes a transistor P4 as a first dimming switch and a comparing circuit CNL1 as a first dimming comparing circuit.

The comparing circuit CNL1 includes a resistor element R3, a reference power supply Ref2, and a comparator Cp3.

The resistor element R3 has one terminal connected to the power supply circuit VS and has a resistance value of 400 ohms, for example.

The reference power supply Ref2 has one terminal connected to the power supply circuit VS and one terminal of the resistor element R3, and outputs a reference voltage Vref2 as a first dimming reference voltage. The reference power supply Ref2 outputs the reference voltage Vref2 at a potential that is decreased from the drive voltage Vk by a predetermined potential.

The comparator Cp3 has an inverting terminal connected to the other terminal of the resistor element R3 so as to receive a feedback voltage Vfb1 as a first dimming comparison voltage that is a potential of the resistor element R3, and a noninverting terminal connected to the other terminal of the reference power supply Ref2 so as to receive the reference voltage Vref2. The comparator Cp3 compares the feedback voltage Vfb1 with the reference voltage Vref2 and outputs a comparison result signal Vcr3 as a first control signal as a result of the comparison from an output terminal. Here, a connection node between the other terminal of the resistor element R3 and the inverting terminal of the comparator Cp3 is referred to as a node Nd4. Note that the voltage level of the feedback voltage Vfb1 is determined based on the light emission voltage Vh1.

The transistor P4 is a PMOS transistor, and its source terminal S is connected to the node Nd4 that is the other terminal of the resistor element R3 and is a noninverting terminal of the comparator Cp3, i.e. is connected to the power supply circuit VS via the resistor element R3, and its drain terminal D is connected to the node Nh1. The transistor P4 generates and outputs the light emission voltage Vh1 and the light emission current Ih1 from the drive voltage Vk supplied to the source terminal S from the power supply circuit VS via the resistor element R3.

Here, the comparator Cp3 compares the feedback voltage Vfb1 with the reference voltage Vref2, supplies the comparison result signal Vcr3 to the gate terminal G of the transistor P4 so that a potential of the node Nd4 has the same level as the reference voltage Vref2 based on a result of the comparison, and adjusts the output level of the light emission current Ih1 output from the transistor P4. If the feedback voltage Vfb1 is lower than the reference voltage Vref2, for example, the comparator Cp3 outputs the comparison result signal Vcr3 having a lower voltage level so as to increase the potential of the node Nd4, and controls the output of the transistor P4 to increase. If the feedback voltage Vfb1 is higher than the reference voltage Vref2, for example, the comparator Cp3 outputs the comparison result signal Vcr3 having a higher voltage level so as to decrease the potential of the node Nd4, and controls the output of the transistor P4 to decrease.

As described above, the dimming circuit LC1 adjusts the light emission current Ih1 output from the transistor P4 to have a predetermined current value using the comparison result signal Vcr3 output from the comparing circuit CNL1, and thus adjusts the light emission luminance of the light emitting element group HS1.

The dimming circuit LC2 has one terminal connected to the node Nd1, so as to be connected to the power supply circuit VS. In addition, the dimming circuit LC2 has the other terminal connected to the node Nh2. In other words, the node Nh2 is connected to the power supply circuit VS via the dimming circuit LC2 and the node Nd1. The dimming circuit LC2 adjusts the light emission current Ih2 flowing in the light emitting element group HS2 to have a predetermined current value, and thus adjusts the light emission luminance of the light emitting element group HS2. The dimming circuit LC2 includes a transistor P5 as a second dimming switch, and a comparing circuit CNL2 as a second dimming comparing circuit.

The comparing circuit CNL2 includes a resistor element R4, a reference power supply Ref3, and a comparator Cp4.

The resistor element R4 has one terminal connected to the power supply circuit VS and has a resistance value of 400 ohms, for example.

The reference power supply Ref3 has one terminal connected to the power supply circuit VS and one terminal of the resistor element R4 so as to supply a reference voltage Vref3 as a second dimming reference voltage. In the lighting device 30, the reference voltage Vref3 is supplied as a potential that is decreased from the drive voltage Vk by a predetermined potential.

The comparator Cp4 has an inverting terminal connected to the other terminal of the resistor element R4 so as to receive a feedback voltage Vfb2 as a second dimming comparison voltage having a potential of the resistor element R4, and a noninverting terminal connected to the other terminal of the reference power supply Ref3 so as to receive the reference voltage Vref3. The comparator Cp4 compares the feedback voltage Vfb2 with the reference voltage Vref3, and outputs a comparison result signal Vcr4 as a second control signal as a result of the comparison from an output terminal. Here, a connection node between the other terminal of the resistor element R4 and the inverting terminal of the comparator Cp4 is referred to as a node Nd5. Note that a voltage level of the feedback voltage Vfb2 is determined based on the light emission voltage Vh2.

The transistor P5 is a PMOS transistor, and its source terminal S is connected to the node Nd5 that is the other terminal of the resistor element R4 and is the noninverting terminal of the comparator Cp4, i.e. is connected to the power supply circuit VS via the resistor element R4, and its drain terminal D is connected to the node Nh2. The transistor P5 generates and outputs the light emission voltage Vh2 and the light emission current Ih2 from the drive voltage Vk supplied to the source terminal S from the power supply circuit VS via the resistor element R4.

Here, the comparator Cp4 compares the feedback voltage Vfb2 with the reference voltage Vref3, supplies the comparison result signal Vcr4 to the gate terminal G of the transistor P5 so that a potential of the node Nd5 has the same level as the reference voltage Vref3 based on a result of the comparison, and adjusts an output level of the light emission current Ih2 output from the transistor P5. If the feedback voltage Vfb2 is lower than the reference voltage Vref3, for example, the comparator Cp4 outputs the comparison result signal Vcr4 having a lower voltage level so as to increase the potential of the node Nd5, and controls the output of the transistor P5 to increase. If the feedback voltage Vfb2 is higher than the reference voltage Vref3, for example, the comparator Cp4 outputs the comparison result signal Vcr4 having a higher voltage level so as to decrease the potential of the node Nd5, and controls the output of the transistor P5 to decrease.

As described above, the dimming circuit LC2 adjusts the light emission current Ih2 output from the transistor P5 to have a predetermined current value using the comparison result signal Vcr4 output from the comparing circuit CNL2, and thus adjusts the light emission luminance of the light emitting element group HS2.

Note that the series connection of the dimming circuit LC1 and the light emitting element group HS1 is connected in parallel to the series connection of the dimming circuit LC2 and the light emitting element group HS2 with respect to the power supply circuit VS.

The light emission control unit HCc includes a transistor P6, a transistor P7, and the comparing circuit CNa.

The transistor P6 is a PMOS transistor, which has the source terminal S as one terminal connected to the power supply circuit VS, the drain terminal D as the other terminal connected to the gate terminal G of the transistor P4, and the gate terminal G as a control terminal connected to the comparing circuit CNa. The transistor P6 is on-off controlled by the comparison result signal Vcr2, which is output from the comparing circuit CNa and is input to the gate terminal G, and thus the light emission control and the light emission stop control of the light emitting element group HS1 are performed.

The transistor P6 is turned on when the low level comparison result signal Vcr2 is input to the gate terminal G from the comparing circuit CNa. In this way, the transistor P4 becomes off state regardless of the output of the comparison result signal Vcr3 because the source terminal S and the gate terminal G are short-circuited. In other words, the transistor P4 cannot be turned on by the comparison result signal Vcr3 so that the supply of the light emission current Ih to the light emitting element group HS1 is stopped. In other words, the dimming circuit LC1 stops generation of the light emission current Ih1 based on the light emission stop control by the light emission control unit HCc. In the way described above, the light emission stop control of the light emitting element group HS1 is performed.

The transistor P6 is turned off when the high level comparison result signal Vcr2 is input to the gate terminal G from the comparing circuit CNa. In this way, the short-circuit between the source terminal S and the gate terminal G of the transistor P4 is released so that they are unconnected, and hence a current value of the light emission current Ih1 output from the transistor P4 to the light emitting element group HS1 can be controlled by the comparison result signal Vcr3. In other words, the dimming circuit LC1 generates the light emission current Ih1 based on the light emission control by the light emission control unit HCc. As described above, the light emission control of the light emitting element group HS1 is performed.

Note that a first threshold voltage for the transistor P6 to be turned on is preferred to be lower than a second threshold voltage for the transistor P4 to be turned on. The reason of this is as follows. As to the transistor P6, if the drive voltage Vk is lower than the light emission reference voltage VH, the low level comparison result signal Vcr2 is input to the gate terminal G while the drive voltage Vk is input to the source terminal S, and hence the transistor P6 is turned on along with an increase of the drive voltage Vk. On the other hand, as to the transistor P4, the drive voltage Vk is input to the source terminal S while the output of the transistor P6 is input to the gate terminal G. In this case, if the second threshold voltage of the transistor P4 is lower than the first threshold voltage of the transistor P6, the transistor P4 is turned on before the transistor P6 is turned on so that the gate terminal G and the source terminal S of the transistor P4 are short-circuited, and hence the light emission voltage Vh1 may be applied to the light emitting element group HS1 so that the light emitting element group HS1 may emit light slightly.

The transistor P7 is a PMOS transistor, which has the source terminal S as one terminal connected to the power supply circuit VS, the drain terminal D as the other terminal connected to the gate terminal G of the transistor P5, and the gate terminal G as a control terminal connected to the comparing circuit CNa. The transistor P7 is on-off controlled by the comparison result signal Vcr2, which is output from the comparing circuit CNa and is input to the gate terminal G. In this way, the light emission control and the light emission stop control of the light emitting element group HS2 are performed.

The transistor P7 is turned on when the low level comparison result signal Vcr2 is input to the gate terminal G from the comparing circuit CNa. In this way, the transistor P5 becomes off state regardless of the output of the comparison result signal Vcr4 because the source terminal S and the gate terminal G are short-circuited. In other words, the transistor P5 cannot be turned on by the comparison result signal Vcr4 so that the supply of the light emission current Ih2 to the light emitting element group HS2 is stopped. In other words, the dimming circuit LC2 stops generation of the light emission current Ih2 based on the light emission stop control by the light emission control unit HCc. In the way described above, the light emission stop control of the light emitting element group HS2 is performed.

The transistor P7 is turned off when the high level comparison result signal Vcr2 is input to the gate terminal G from the comparing circuit CNa. In this way, the short-circuit between the source terminal S and the gate terminal G of the transistor P5 is released so that they are unconnected, and hence a current value of the light emission current Ih2 output from the transistor P5 to the light emitting element group HS2 can be controlled by the comparison result signal Vcr4. In other words, the dimming circuit LC2 generates the light emission current Ih2 based on the light emission control by the light emission control unit HCc. As described above, the light emission control of the light emitting element group HS2 is performed.

Note that a third threshold voltage for the transistor P7 to be turned on is preferred to be lower than a fourth threshold voltage for the transistor P5 to be turned on. The reason of this is as follows. As to the transistor P7, if the drive voltage Vk is lower than the light emission reference voltage VH, the low level comparison result signal Vcr2 is input to the gate terminal G while the drive voltage Vk is input to the source terminal S, and hence the transistor P7 is turned on along with an increase of the drive voltage Vk. On the other hand, as to the transistor P5, the drive voltage Vk is input to the source terminal S while the output of the transistor P7 is input to the gate terminal G. In this case, if the fourth threshold voltage of the transistor P5 is lower than the third threshold voltage of the transistor P7, the transistor P5 is turned on before the transistor P7 is turned on so that the gate terminal G and the source terminal S of the transistor P5 are short-circuited, and hence the light emission voltage Vh2 may be applied to the light emitting element group HS1 so that the light emitting element group HS2 may emit light slightly.

As described above, the light emission control unit HCc detects a magnitude relationship between the drive voltage Vk and the light emission reference voltage VH. If the drive voltage Vk is higher than the light emission reference voltage VH, the light emission control unit HCc performs the light emission control to cause light emission of the light emitting element groups HS by turning off the transistor P6 to enable control of the output of the transistor P4 by the comparison result signal Vcr3, and by turning off the transistor P7 to enable control of the output of the transistor P5 by the comparison result signal Vcr4, so that the light emission current Ih1 can be supplied to the light emitting element group HS1 and that the light emission current Ih2 can be supplied light emitting element group HS2. In other words, the light emission control unit HCc performs light emission control so that the dimming circuit LC1 can generate the light emission current Ih1 while the dimming circuit LC2 can generate the light emission current Ih2. In addition, if the drive voltage Vk is lower than the light emission reference voltage VH, the light emission control unit HCc performs the light emission stop control to stop light emission of the light emitting element groups HS by turning on the transistor P6 and the transistor P7 so that the outputs of the transistor P4 and the transistor P5 of the dimming circuit LC1 cannot be controlled by the comparison result signal Vcr3 and are forcibly stopped, so that the light emission current Ih1 cannot be supplied to the light emitting element group HS1, and that the light emission current Ih2 cannot be supplied to the light emitting element group HS2. In other words, the light emission control unit HCc performs the light emission stop control so that the dimming circuit LC1 cannot generate the light emission current Ih1, and that the dimming circuit LC2 cannot generate the light emission current Ih2. Therefore, the lighting device 30 according to this embodiment can cause as well as stop the light emission of the light emitting element group HS1 and the light emitting element group HS2 at the same time.

Figure 9:
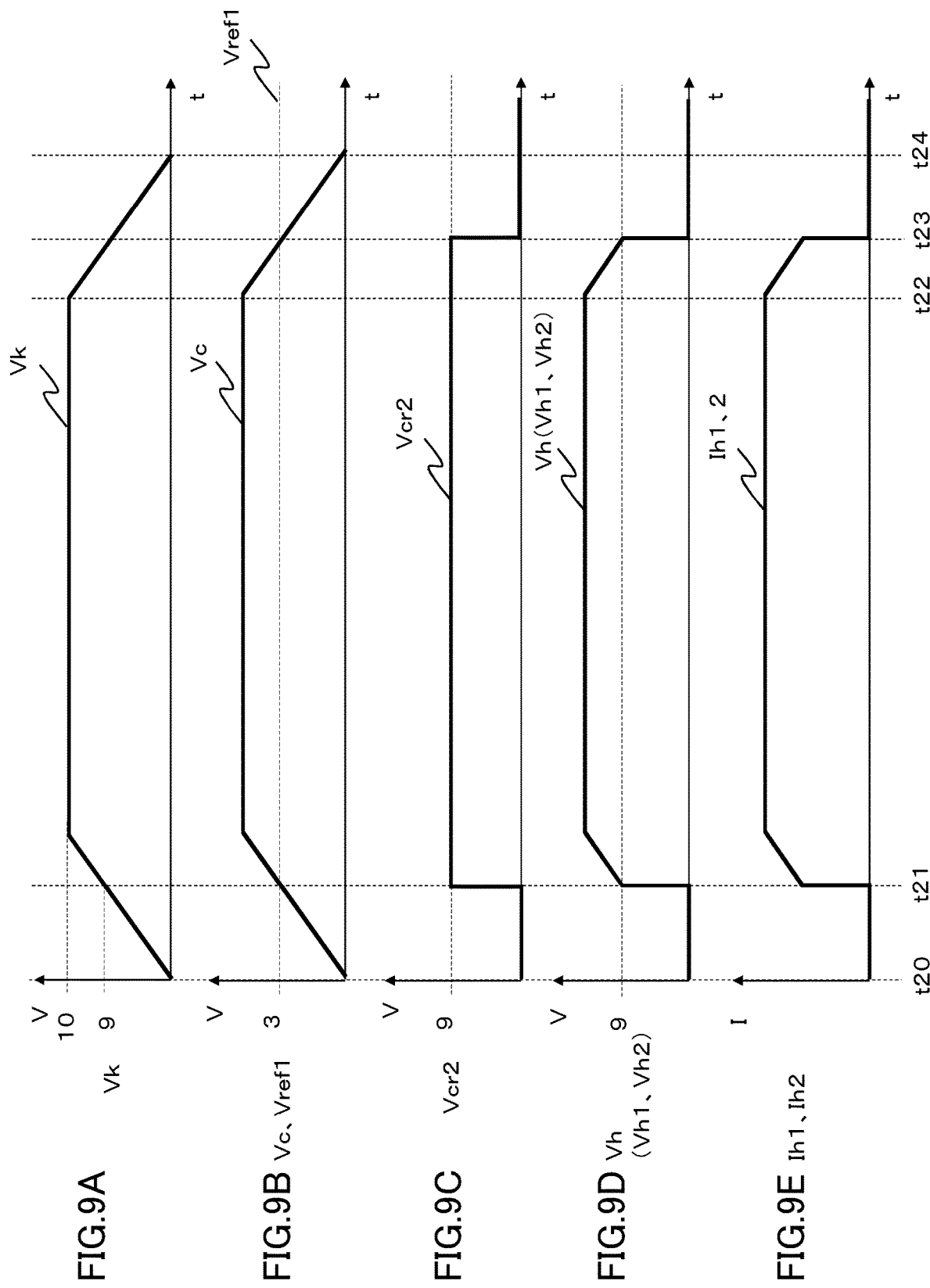
FIGS. 9A to 9E are diagrams illustrating transitions of signal waveforms from rising to falling of a power supply to drive the lighting device 30.

FIGS. 9A to 9E are diagram illustrating transitions of signal waveforms from rising to falling of a power supply to drive the lighting device 30. FIG. 9A indicates the transition of the drive voltage Vk in temporal change. FIG. 9B indicates a relationship between the transition of the comparison voltage Vc and the reference voltage Vref1 in temporal change. FIG. 9C indicates the transition of the comparison result signal Vcr2 in temporal change. FIG. 9D indicates the transitions of the light emission voltage Vh1 and the light emission voltage Vh2 in temporal change. FIG. 9E indicates the transition of the light emission current Ih1 and the light emission current Ih2 in temporal change. Note that, in each of FIGS. 9A to 9D, the vertical axis represents voltage V, and the horizontal axis represents time t. Further, in FIG. 9E, the vertical axis represents current I, and the horizontal axis represents time t. Further, time points t20 to t24 are common among FIGS. 9A to 9E. In addition, in FIG. 9E, the light emission current Ih1 and the light emission current Ih2 are shown to have the same current value, but this is not a limitation in reality. In addition, in FIGS. 9A to 9E, the signal waveform described in second embodiment with reference to FIGS. 6A to 6E is denoted by the same numeral or symbol, and description thereof is appropriately omitted.

At time point t20, the drive of the power supply to drive the lighting device 30 is started so that the drive voltage Vk starts to increase. In this case, because the comparison voltage Vc is equal to or lower than 3 V as the reference voltage Vref1, the comparison result signal Vcr2 has low level. In addition, because the comparison result signal Vcr2 has low level, the drive voltage Vk increases. When the gate-source voltage of the transistor P6 exceeds a threshold value, the transistor P6 is turned on. When the gate-source voltage of the transistor P7 exceeds a threshold value, the transistor P7 is turned on. In this way, the gate terminal G and the source terminal S of the transistor P4 are short-circuited so that the transistor P4 is turned off. In addition, the gate terminal G and the source terminal S of the transistor P5 are short-circuited so that the transistor P5 is turned off. Therefore, the light emission voltage Vh1 is 0 V so that the light emission current Ih1 does not flow in the light emitting element group HS1, and the light emission voltage Vh2 is 0 V so that the light emission current Ih2 does not flow in the light emitting element group HS2. In other words, the light emitting element group HS1 and the light emitting element group HS2 are both turned off.

At time point t21, the comparison voltage Vc becomes equal to or higher than the reference voltage Vref1, and the comparison result signal Vcr2 is changed to high level, so that the transistor P6 and the transistor P7 are turned off. In this way, the short-circuit between the gate terminal G and the source terminal S of the transistor P4 is released so that the output of the transistor P4 can be adjusted by the comparison result signal Vcr3, and hence the light emission luminance of the light emitting element group HS1 can be adjusted. Here, because the light emission voltage Vh1 is approximately 9 V, when the transistor P4 is turned on, the light emission current Ih1 flows in the light emitting element group HS1 so that the light emitting element group HS1 emits light. In addition, the short-circuit between the gate terminal G and the source terminal S of the transistor P5 is released, and hence the output of the transistor P5 can be adjusted by the comparison result signal Vcr4. Thus, the light emission luminance of the light emitting element group HS2 can be adjusted. Here, because the light emission voltage Vh2 is approximately 9 V, when the transistor P5 is turned on, the light emission current Ih2 flows in the light emitting element group HS2 so that the light emitting element group HS2 emits light. In other words, all the light emitting elements HS1a of the light emitting element group HS1 and all the light emitting elements HS2a of the light emitting element group HS2 emit light at the same timing without a variation.

At time point t22, the drive of the power supply to drive the lighting device 30 is stopped, and then the drive voltage Vk starts to decrease. In this case, the comparison voltage Vc, the light emission voltage Vh1, the light emission current Ih1, the light emission voltage Vh2, and the light emission current Ih2 also start to decrease.

At time point t23, the decreasing drive voltage Vk becomes lower than 9 V, and the comparison voltage Vc becomes lower than 3 V. In this way, the comparison result signal Vcr2 is changed to low level, and again the transistor P6 and the transistor P7 are turned on while the transistor P4 and the transistor P5 are turned off. Then, the light emission current Ih1 flowing in the light emitting element group HS1 and the light emission current Ih2 flowing in the light emitting element group HS2 are stopped so that the light emitting element group HS1 and the light emitting element group HS2 are turned off at the same time. In this case, the transistor P4 and the transistor P5 are turned off at a time point when the light emission voltage Vh1 and the light emission voltage Vh2 are higher than 8 V as the reference voltage VH2, and hence it is avoided that the light emitting element group HS1 and the light emitting element group HS2 are turned off at different timings with a variation.

At time point t24, the drive voltage Vk is decreased to 0 V. In this way, the drive of the lighting device 30 is stopped.

As described above, in the lighting device 30 according to the third embodiment of the present invention, the light emission control unit HCc detects a magnitude relationship between the drive voltage Vk and the light emission reference voltage VH, performs light emission control to cause light emission of the light emitting element groups HS if the drive voltage Vk is higher than the light emission reference voltage VH, and performs light emission stop control to stop light emission of the light emitting element groups HS if the drive voltage Vk is lower than the light emission reference voltage VH. Therefore, it is possible to prevent a variation in timing of causing as well as stopping light emission of the light emitting element group HS1 and the light emitting element group HS2.

In addition, in the lighting device 30 according to the third embodiment of the present invention, the dimming circuit LC1 stops generation of the light emission current Ih1 based on the light emission stop control by the light emission control unit HCc, and generates the light emission current Ih1 based on the light emission control by the light emission control unit HCc. In addition, the dimming circuit LC2 stops generation of the light emission current Ih2 based on the light emission stop control by the light emission control unit HCc, and generates the light emission current Ih2 based on the light emission control by the light emission control unit HCc. Therefore, it is not necessary to dispose a transistor for performing the light emission control or the light emission stop control in the path of current for causing light emission of the light emitting element groups HS like the lighting devices 10, 10a, 10b, 20, and 20a. Therefore, it is possible to suppress an increase in a circuit area of the lighting device that may occur when using the present invention.

Note that the lighting device 30 according to this embodiment has the structure in which the dimming circuit LC1 is connected between the power supply circuit VS and the node Nh1, and the dimming circuit LC2 is connected between the power supply circuit VS and the node Nh2 as described above, but this is not a limitation. It is possible to adopt a structure in which the dimming circuit LC1 is connected between the node Nh1a and the power supply VSS, and the dimming circuit LC2 is connected between the node Nh2a and the power supply VSS. In this case too, when adopting the structure in which the dimming circuit LC1 generates the light emission current Ih1 based on the light emission control and stops generation of the light emission current Ih1 based on the light emission stop control, and the dimming circuit LC2 generates the light emission current Ih2 based on the light emission control and stops generation of the light emission current Ih2 based on the light emission stop control, it is possible to achieve the effect obtained by this embodiment, i.e., to suppress an increase in the circuit area.

In addition, in the lighting device 30 according to this embodiment, the noninverting terminal of the comparator Cp4 is connected to the other terminal of the reference power supply Ref3 so that the reference voltage Vref3 is supplied, as an example, but this is not a limitation. It is possible to supply the reference voltage Vref3 to the noninverting terminal of the comparator Cp4 from the reference power supply Ref2. In this case, it is preferred to adopt the structure in which, instead of the reference power supply Ref3, the other terminal of the reference power supply Ref2, whose one terminal is connected to the power supply circuit VS and one terminal of the resistor element R3, is connected to the noninverting terminal of the comparator Cp3 and is connected to the noninverting terminal of the comparator Cp4. In this way, it is possible to suppress an increase in the area of the lighting device 30.

[First Variation of Third Embodiment]

Figure 10:
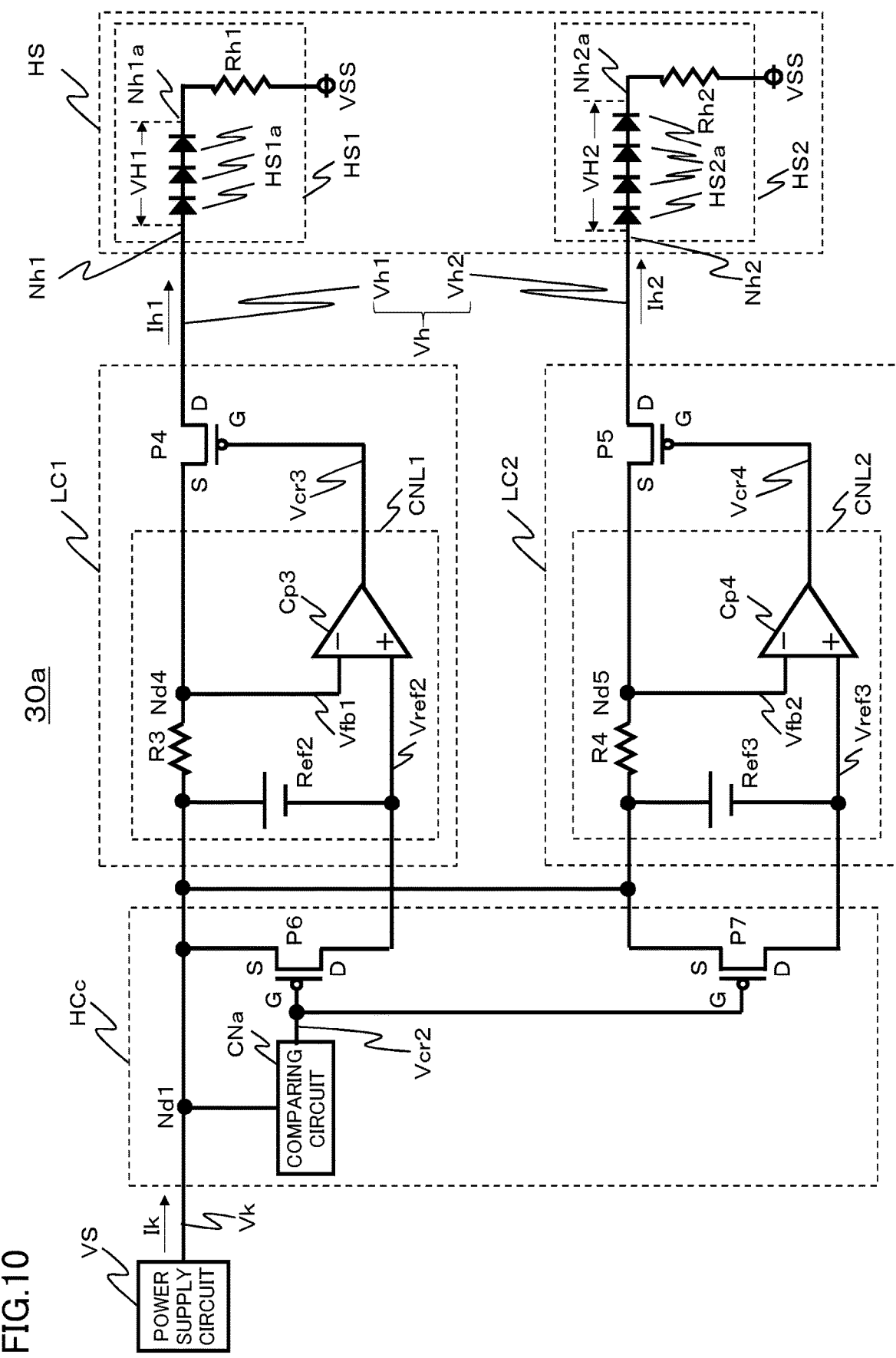
FIG. 10 is a diagram illustrating a lighting device 30a according to a first variation of the third embodiment of the present invention.

FIG. 10 is a diagram illustrating a lighting device 30a according to a first variation of the third embodiment of the present invention. The lighting device 30a includes the power supply circuit VS, the light emitting element groups HS, the dimming circuit LC1, the dimming circuit LC2, and the light emission control unit HCc. In the lighting device 30a according to this variation, the connection destinations of the transistor P6 and the transistor P7 of the light emission control unit HCc are substantially different from those in the lighting device 30 illustrated in FIG. 8. Note that in the lighting device 30a illustrated in FIG. 10, the same structure as in the lighting device 30 illustrated in FIG. 8 is denoted by the same numeral or symbol, and description thereof is appropriately omitted.

The transistor P6 has the drain terminal D as the other terminal connected to the other terminal of the reference power supply Ref2 and the noninverting terminal of the comparator Cp3.

The transistor P6 is turned on when the low level comparison result signal Vcr1 is input to the gate terminal G from the comparing circuit CNa. In this way, the noninverting terminal of the comparator Cp3 is supplied with the drive voltage Vk as the reference voltage Vref2 regardless of the potential supplied by the reference power supply Ref2, and the comparison result signal Vcr3 output from the comparator Cp3 is supplied to the gate terminal G of the transistor P4, so that the feedback voltage Vfb1 has the same level as the reference voltage Vref2, i.e. so that the drive voltage Vk does not cause a voltage drop by the resistor element R3, in other words, so that potentials on both ends of the resistor element R3 have the same level, and the transistor P4 is turned off so that the supply of the light emission current Ih1 to the light emitting element group HS1 is stopped. In other words, the dimming circuit LC1 stops generation of the light emission current Ih1 based on the light emission stop control by the light emission control unit HCc. In the way described above, the light emission stop control of the light emitting element group HS1 is performed.

In addition, the transistor P6 is turned off when the high level comparison result signal Vcr1 is input to the gate terminal G from the comparing circuit CNa. In this way, because a voltage supplied from the reference power supply Ref2 is supplied as the reference voltage Vref2 to the noninverting terminal of the comparator Cp3, a current value of the light emission current Ih1 output from the transistor P4 to the light emitting element group HS1 can be controlled by the comparison result signal Vcr3. In other words, the dimming circuit LC1 generates the light emission current Ih1 based on the light emission control by the light emission control unit HCc. As described above, the light emission control of the light emitting element group HS1 is performed.

The transistor P7 has the drain terminal D as the other terminal connected to the other terminal of the reference power supply Ref3 and the noninverting terminal of the comparator Cp4.

The transistor P7 is turned on when the low level comparison result signal Vcr1 is input to the gate terminal G from the comparing circuit CNa. In this way, the noninverting terminal of the comparator Cp4 is supplied with the drive voltage Vk as the reference voltage Vref3 regardless of the potential supplied by the reference power supply Ref3, and the comparison result signal Vcr4 output from the comparator Cp4 is supplied to the gate terminal G of the transistor P5, so that the feedback voltage Vfb2 has the same level as the reference voltage Vref3, i.e. so that the drive voltage Vk does not cause a voltage drop by the resistor element R4, in other words, so that potentials on both ends of the resistor element R4 have the same level, and the transistor P5 is turned off so that the supply of the light emission current Ih2 to the light emitting element group HS2 is stopped. In other words, the dimming circuit LC2 stops generation of the light emission current Ih2 based on the light emission stop control by the light emission control unit HCc. In the way described above, the light emission stop control of the light emitting element group HS2 is performed.

In addition, the transistor P7 is turned off when the high level comparison result signal Vcr1 is input to the gate terminal G from the comparing circuit CNa. In this way, because a voltage supplied from the reference power supply Ref3 is supplied as the reference voltage Vref3 to the noninverting terminal of the comparator Cp4, a current value of the light emission current Ih2 output from the transistor P5 to the light emitting element group HS2 can be controlled by the comparison result signal Vcr4. In other words, the dimming circuit LC2 generates the light emission current Ih2 based on the light emission control by the light emission control unit HCc. As described above, the light emission control of the light emitting element group HS2 is performed.

As described above, the light emission control unit HCc detects a magnitude relationship between the drive voltage Vk and the light emission reference voltage VH. If the drive voltage Vk is higher than the light emission reference voltage VH, the light emission control unit HCc performs the light emission control to cause light emission of the light emitting element groups HS by turning off the transistor P6 to enable control of the output of the transistor P4 by the comparison result signal Vcr3, and by turning off the transistor P7 to enable control of the output of the transistor P5 by the comparison result signal Vcr4, so that the light emission current Ih1 can be supplied to the light emitting element group HS1 and that the light emission current Ih2 can be supplied to the light emitting element group HS2. In other words, the light emission control unit HCc performs light emission control so that the dimming circuit LC1 can generate the light emission current Ih1 while the dimming circuit LC2 can generate the light emission current Ih2. In addition, if the drive voltage Vk is lower than the light emission reference voltage VH, the light emission control unit HCc performs the light emission stop control to stop light emission of the light emitting element groups HS by turning on the transistor P6 and the transistor P7 to forcibly stop the outputs of the transistor P4 and the transistor P5 of the dimming circuit LC1, so that the light emission current Ih1 cannot be supplied to the light emitting element group HS1, and that the light emission current Ih2 cannot be supplied to the light emitting element group HS2. In other words, the light emission control unit HCc performs the light emission stop control so that the dimming circuit LC1 cannot generate the light emission current Ih1, and that the dimming circuit LC2 cannot generate the light emission current Ih2. Therefore, the lighting device 30 according to this embodiment can cause as well as stop the light emission of the light emitting element group HS1 and the light emitting element group HS2 at the same time.

In addition, the lighting device 30a according to this embodiment performs the light emission control and the light emission stop control by the comparing circuit CNa and the two transistors, i.e. the transistor P6 and the transistor P7 of the light emission control unit HCc, but this is not a limitation. It is possible to perform the control by the comparing circuit CNa and the transistor P6. In this case, it is preferred to adopt a structure in which the drain terminal D of the transistor P6, instead of the transistor P7, is connected to the noninverting terminal of the comparator Cp3 and is also connected to the noninverting terminal of the comparator Cp4.

[Second Variation of Third Embodiment]

Figure 11:
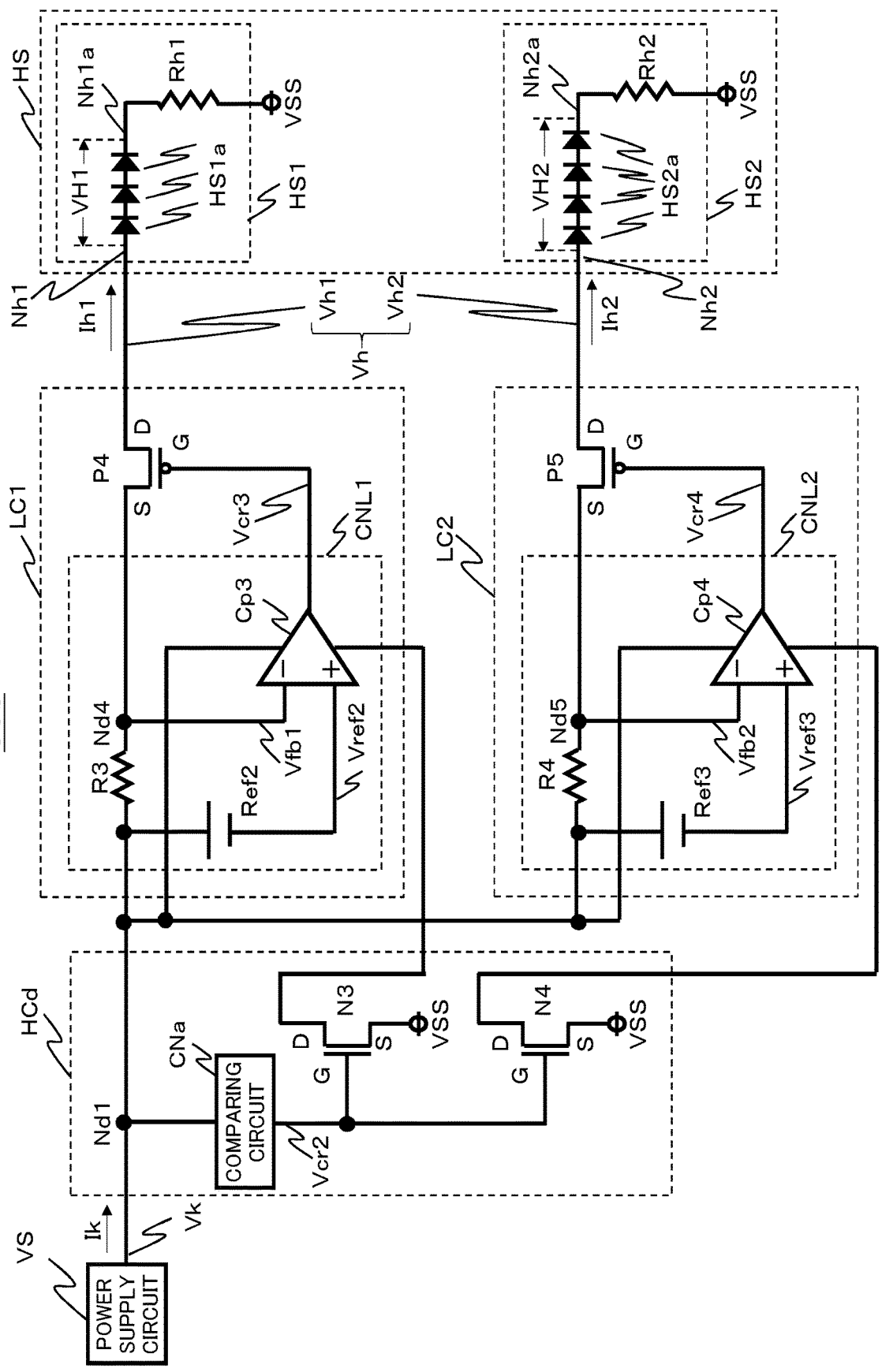
FIG. 11 is a diagram illustrating a lighting device 30b according to a second variation of the third embodiment of the present invention.

FIG. 11 is a diagram illustrating a lighting device 30b according to a second variation of the third embodiment of the present invention. The lighting device 30b includes the power supply circuit VS, the light emitting element groups HS, the dimming circuit LC1, the dimming circuit LC2, and a light emission control unit HCd. The lighting device 30b according to this variation is substantially different from the lighting device 30 illustrated in FIG. 8 in that the light emission control unit HCd is provided instead of the light emission control unit HCc. Note that in the lighting device 30b illustrated in FIG. 11, the same structure as in the lighting device 30 illustrated in FIG. 8 is denoted by the same numeral or symbol, and description thereof is appropriately omitted.

The comparator Cp3 of the dimming circuit LC1 is connected to the power supply circuit VS and receives supply of the drive voltage Vk output from the power supply circuit VS so as to be driven. In other words, the comparison result signal Vcr3 is generated based on the drive voltage Vk.

The comparator Cp4 of the dimming circuit LC2 is connected to the power supply circuit VS and receives supply of the drive voltage Vk output from the power supply circuit VS so as to be driven. In other words, the comparison result signal Vcr4 is generated based on the drive voltage Vk.

The light emission control unit HCd includes a transistor N3, a transistor N4, and the comparing circuit CNa.

The transistor N3 is an NMOS transistor, which has the source terminal S as one terminal connected to the power supply VSS and the drain terminal D as the other terminal connected to the comparator Cp3. In this way, the comparator Cp3 is connected to the power supply VSS via the transistor N3. In addition, the transistor N3 has the gate terminal G as a control terminal connected to the comparing circuit CNa. The transistor N3 is on-off controlled by the comparison result signal Vcr2, which is output from the comparing circuit CNa and is input to the gate terminal G. In this way, the light emission control and the light emission stop control of the light emitting element group HS1 are performed.

The transistor N3 is turned off when the low level comparison result signal Vcr2 is input to the gate terminal G from the comparing circuit CNa. In this way, the connection between the comparator Cp3 and the power supply VSS is interrupted, the comparison result signal Vcr3 output from the comparator Cp3 is forcibly set to high level, and the gate terminal G of the transistor P4 is supplied with a voltage having substantially the same level as the drive voltage Vk. In this way, the transistor P4 is forcibly turned off regardless of a result of the comparison between the reference voltage Vref2 and the feedback voltage Vfb1 by the comparator Cp3, and hence the supply of the light emission current Ih1 to the light emitting element group HS1 is stopped. In other words, the dimming circuit LC1 stops generation of the light emission current Ih1 based on the light emission stop control by the light emission control unit HCd. In the way described above, the light emission stop control of the light emitting element group HS1 is performed.

In addition, the transistor N3 is turned on when the high level comparison result signal Vcr2 is input to the gate terminal G from the comparing circuit CNa. In this way, the comparator Cp3 and the power supply VSS are electrically connected to each other, and the comparator Cp3 can output the comparison result signal Vcr3 based on a result of the comparison between the reference voltage Vref2 and the feedback voltage Vfb1. Therefore, the current value of the light emission current Ih1 output from the transistor P4 to the light emitting element group HS1 can be controlled by the comparison result signal Vcr3. In other words, the dimming circuit LC1 generates the light emission current Ih1 based on the light emission control by the light emission control unit HCd. As described above, the light emission control of the light emitting element group HS1 is performed.

The transistor N4 is an NMOS transistor, which has the source terminal S as one terminal connected to the power supply VSS, and the drain terminal D as the other terminal connected to the comparator Cp4. In this way, the comparator Cp4 is connected to the power supply VSS via the transistor N4. In addition, the transistor N4 has the gate terminal G as a control terminal connected to the comparing circuit CNa. The transistor N4 is on-off controlled by the comparison result signal Vcr2, which is output from the comparing circuit CNa and is input to the gate terminal G, and thus the light emission control and the light emission stop control of the light emitting element group HS2 are performed.

The transistor N4 is turned off when the low level comparison result signal Vcr2 is input to the gate terminal G of the comparing circuit CNa. In this way, the connection between the comparator Cp4 and the power supply VSS is interrupted, the comparison result signal Vcr4 output from the comparator Cp4 is forcibly set to high level, and the gate terminal G of the transistor P5 is supplied with a voltage having substantially the same level as the drive voltage Vk. In this way, the transistor P5 is forcibly turned off regardless of a result of the comparison between the reference voltage Vref3 and the feedback voltage Vfb1 by the comparator Cp3, and hence the supply of the light emission current Ih2 to the light emitting element group HS2 is stopped. In other words, the dimming circuit LC2 stops generation of the light emission current Ih2 based on the light emission stop control by the light emission control unit HCd. In the way described above, the light emission stop control of the light emitting element group HS2 is performed.

In addition, the transistor N4 is turned on when the high level comparison result signal Vcr2 is input to the gate terminal G from the comparing circuit CNa. In this way, the comparator Cp4 and the power supply VSS are electrically connected to each other, and hence the comparator Cp4 can output the comparison result signal Vcr4 based on a result of the comparison between the reference voltage Vref3 and the feedback voltage Vfb2. Therefore, the current value of the light emission current Ih2 output from the transistor P5 to the light emitting element group HS2 can be controlled by the comparison result signal Vcr4. In other words, the dimming circuit LC2 generates the light emission current Ih2 based on the light emission control by the light emission control unit HCd. In the way described above, the light emission control of the light emitting element group HS2 is performed.

As described above, the light emission control unit HCd detects a magnitude relationship between the drive voltage Vk and the light emission reference voltage VH. If the drive voltage Vk is higher than the light emission reference voltage VH, the light emission control unit HCd performs the light emission control to cause light emission of the of the light emitting element groups HS by turning on the transistor N3 to enable control of the output of the transistor P4 by the comparison result signal Vcr3 based on the comparison between the reference voltage Vref2 and the feedback voltage Vfb1, and by turning on the transistor N4 to enable control of the output of the transistor P5 by the comparison result signal Vcr4 based on the comparison between the reference voltage Vref3 and the feedback voltage Vfb2, so that the light emission current Ih1 can be supplied to the light emitting element group HS1 and that the light emission current Ih2 can be supplied to the light emitting element group HS2. In other words, the light emission control unit HCd performs the light emission control so that the dimming circuit LC1 can generate the light emission current Ih1 while the dimming circuit LC2 can generate the light emission current Ih2. In addition, if the drive voltage Vk is lower than the light emission reference voltage VH, the light emission control unit HCd performs the light emission stop control to stop light emission of the light emitting element groups HS by turning off the transistor N3 to disable control of the output of the transistor P4 of the dimming circuit LC1 to be forcibly turned off by the comparison result signal Vcr3 based on the comparison between the reference voltage Vref2 and the feedback voltage Vfb1, and by turning off the transistor N4 to disable control of the output of the transistor P5 of the dimming circuit LC2 to be forcibly turned off by the comparison result signal Vcr4 based on the comparison between the reference voltage Vref3 and the feedback voltage Vfb2, so that the light emission current Ih1 cannot be supplied to the light emitting element group HS1, and that the light emission current Ih2 cannot be supplied to the light emitting element group HS2. In other words, the light emission control unit HCd performs the light emission stop control so that the dimming circuit LC1 cannot generate the light emission current Ih1, and that the dimming circuit LC2 cannot generate the light emission current Ih2. Therefore, the lighting device 30 according to this embodiment can cause as well as stop the light emission of the light emitting element group HS1 and the light emitting element group HS2 at the same time.

In addition, the lighting device 30b according to this embodiment performs the light emission control and the light emission stop control by the comparing circuit CNa and the two transistors, i.e. the transistor N3 and the transistor N4 of the light emission control unit HCd, but this is not a limitation. It is possible to perform the control by the comparing circuit CNa and the transistor N3. In this case, it is preferred to adopt a structure in which the drain terminal D of the transistor N3 is connected to the comparator Cp3 and is also connected to the comparator Cp4.

[Third Variation of Third Embodiment]

Figure 12:
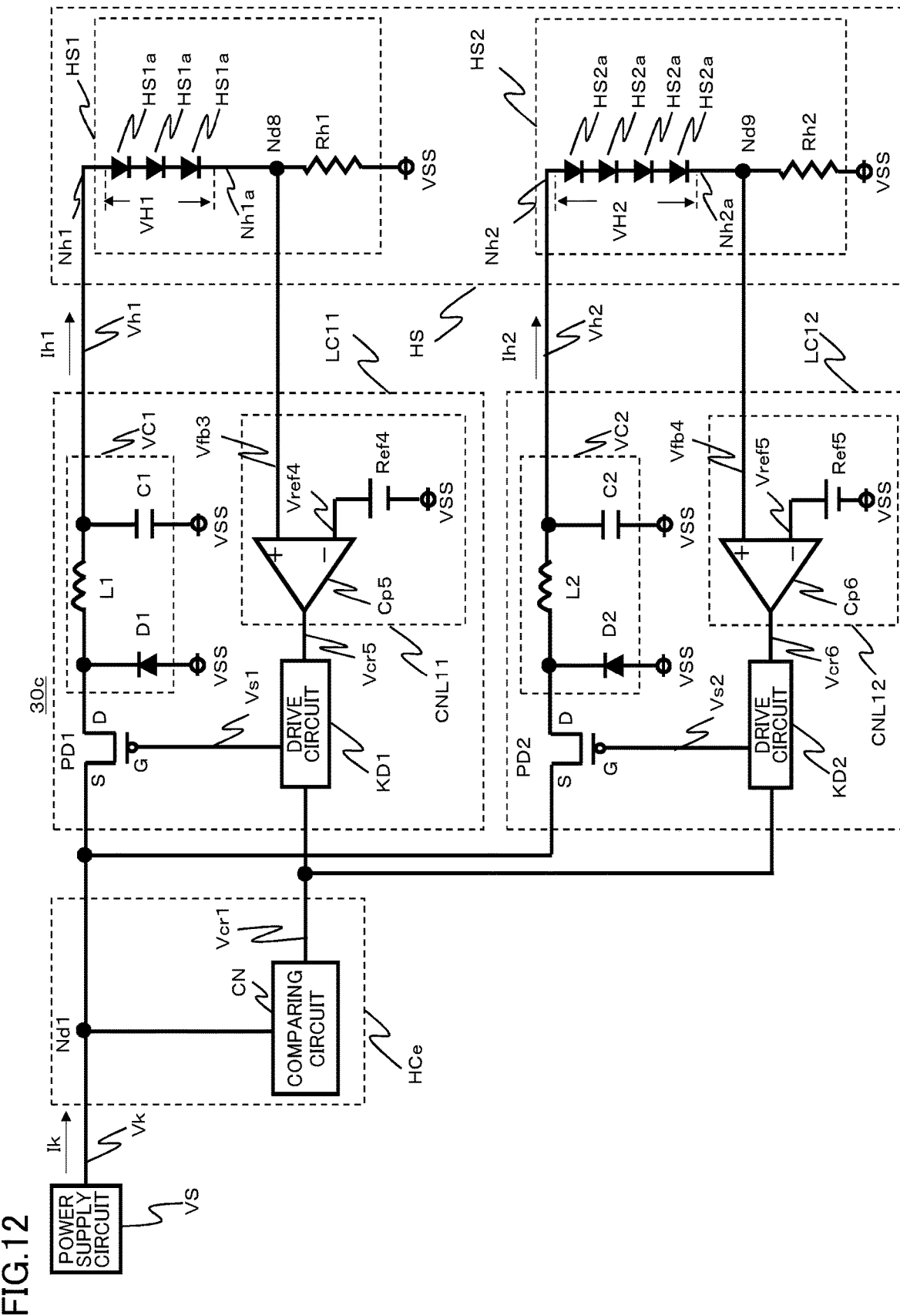
FIG. 12 is a diagram illustrating a lighting device 30c according to a third variation of the third embodiment of the present invention.

FIG. 12 is a diagram illustrating a lighting device 30c according to a third variation of the third embodiment of the present invention. The lighting device 30c includes the power supply circuit VS, the light emitting element groups HS, the light emission control unit HCe, a dimming circuit LC11, and a dimming circuit LC12. The lighting device 30c according to this variation is substantially different from the lighting device 30 illustrated in FIG. 8 in that the light emission control unit HCe is provided instead of the light emission control unit HCc, and that the dimming circuit LC11 and the dimming circuit LC12 are provided instead of the dimming circuit LC1 and the dimming circuit LC2. Note that in the lighting device 30c illustrated in FIG. 12, the same structure as in the lighting device 30 illustrated in FIG. 8 is denoted by the same numeral or symbol, and description thereof is appropriately omitted.

The light emission control unit HCe detects a magnitude relationship between the drive voltage Vk and the light emission reference voltage VH, performs light emission control to cause light emission of the light emitting element groups HS if the drive voltage Vk is higher than the light emission reference voltage VH, and performs light emission stop control to stop light emission of the light emitting element groups HS if the drive voltage Vk is lower than the light emission reference voltage VH. The light emission control unit HCe includes the comparing circuit CN.

The dimming circuit LC11 has one terminal connected to the node Nd1, and thus is connected to the power supply circuit VS. In addition, the dimming circuit LC11 has the other terminal connected to the node Nh1. In other words, the node Nh1 is connected to the power supply circuit VS via the dimming circuit LC11 and the node Nd1. The dimming circuit LC11 adjusts the light emission current Ih1 flowing in the light emitting element group HS1 to have a predetermined current value, and hence adjusts the light emission luminance of the light emitting element group HS1. The dimming circuit LC11 includes a transistor PD1 as the first dimming switch, a current generator circuit VC1 as a first current generator circuit, a comparing circuit CNL11 as the first dimming comparing circuit, and a driving circuit KD1 as a first driving circuit.

The transistor PD1 is a PMOS transistor having the source terminal S connected to the power supply circuit VS.

The current generator circuit VC1 includes an inductor L1, a capacitor C, and a rectifier diode D1. The inductor L1 has one terminal connected to the drain terminal D of the transistor PD1. The capacitor C1 has one terminal connected to the other terminal of the inductor L1 and the other terminal connected to the power supply VSS. The rectifier diode D1 has the anode connected to the power supply VSS and the cathode connected to a connection node between the drain terminal D of the transistor PD1 and one terminal of the inductor L1.

When the transistor PD1 is on, in the current generator circuit VC1, the inductor L1 stores magnetic energy based on the drive voltage Vk output from the transistor PD1, and the capacitor C1 smooths the same so as to generate and output the light emission voltage Vh1 and the light emission current Ih1. In addition, when the transistor PD1 is off, in the current generator circuit VC1, the magnetic energy stored in the inductor L1 is supplied to the capacitor C1 via the rectifier diode D1, the capacitor C1 smooths the magnetic energy so as to generate and output the light emission voltage Vh1 and the light emission current Ih1. In other words, the current generator circuit VC1 steps down the drive voltage Vk obtained by turning on and off the transistor PD1, so as to generate and output the light emission voltage Vh1 and the light emission current Ih1.

The comparing circuit CNL11 includes a reference power supply Ref4 and a comparator Cp5.

The reference power supply Ref4 has one terminal connected to the power supply VSS and generates a reference voltage Vref4 as the first dimming reference voltage. The reference voltage Vref4 is e.g. 2 V.

The comparator Cp5 has the noninverting terminal connected to a node Nd8 as a connection node between the node Nh1a and the resistor element Rh1 so as to receive a feedback voltage Vfb3 as the first dimming comparison voltage that is a potential at the node Nd8, and the inverting terminal connected to the reference power supply Ref4 so as to receive the reference voltage Vref4. The comparator Cp5 compares the feedback voltage Vfb3 with the reference voltage Vref4, outputs the comparison result signal Vcr5 as the first control signal so that the potential at the node Nd8 becomes the same level as the reference voltage Vref4 based on a result of the comparison, and adjusts the light emission current Ih1 generated by the transistor PD1 and the current generator circuit VC1. If the feedback voltage Vfb3 is lower than the reference voltage Vref4, for example, the comparator Cp5 outputs the high level comparison result signal Vcr5 so as to increase the potential at the node Nd8. In addition, if the feedback voltage Vfb3 is higher than the reference voltage Vref4, the comparator Cp5 outputs the low level comparison result signal Vcr5 so as to decrease the potential at the node Nd8.

In the way described above, the comparing circuit CNL11 detects the feedback voltage Vfb3 based on the light emission voltage Vh1, outputs the comparison result signal Vcr5 so that the light emission current Ih1 flowing in the light emitting element group HS1 becomes a desired value, and adjusts the output of the transistor PD1.

The driving circuit KD1 is connected to the gate terminal G as a control terminal of the transistor PD1 and the output terminal of the comparator Cp5 in the comparing circuit CNL11, and supplies the drive signal Vs1 as a first drive signal to the transistor PD1 in accordance with the comparison result signal Vcr5 output from the comparator Cp5, i.e. the comparing circuit CNL11. When receiving the low level comparison result signal Vcr5, for example, the driving circuit KD1 supplies the high level drive signal Vs1 at for example 5 V to the gate terminal G of the transistor PD1. In this way, the transistor PD1 is turned off, and the supply of a voltage based on the drive voltage Vk to the inductor L1 is stopped. In addition, when receiving the high level comparison result signal Vcr5, for example, the driving circuit KD1 supplies the low level drive signal Vs1 at 0 V for example to the gate terminal G of the transistor PD1. In this way, the transistor PD1 is turned on, and the voltage based on the drive voltage Vk is supplied to the inductor L1. Note that the driving circuit KD1 may have a structure for performing a PWM control in which a PWM signal having a predetermined duty ratio is supplied to the gate terminal G of the transistor PD1.

As described above, the dimming circuit LC11 adjusts the light emission current Ih1 output from the transistor PD1 to have a predetermined current value by the drive signal Vs1 based on the comparison result signal Vcr5 output from the comparing circuit CNL11, and thus adjusts the light emission luminance of the light emitting element group HS1.

The dimming circuit LC12 has one terminal connected to the node Nd1, and hence is connected to the power supply circuit VS. In addition, the dimming circuit LC12 has the other terminal connected to the node Nh2. In other words, the node Nh2 is connected to the power supply circuit VS via the dimming circuit LC12 and the node Nd1. The dimming circuit LC12 adjusts the light emission current Ih2 flowing in the light emitting element group HS2 to have a predetermined current value, and thus adjusts the light emission luminance of the light emitting element group HS2. The dimming circuit LC12 includes a transistor PD2 as the second dimming switch, a current generator circuit VC2 as a second current generator circuit, a comparing circuit CNL12 as the second dimming comparing circuit, and a driving circuit KD2 as a second driving circuit.

The transistor PD2 is a PMOS transistor having the source terminal S connected to the power supply circuit VS.

The current generator circuit VC2 includes an inductor L2, a capacitor C2, and a rectifier diode D2. The inductor L2 has one terminal connected to the drain terminal D of the transistor PD2. The capacitor C2 has one terminal connected to the other terminal of the inductor L2 and the other terminal connected to the power supply VSS. The rectifier diode D2 has the anode connected to the power supply VSS and the cathode connected to a connection node between the drain terminal D of the transistor PD2 and one terminal of the inductor L2.

When the transistor PD2 is on, in the current generator circuit VC2, the inductor L2 stores magnetic energy based on the drive voltage Vk output from the transistor PD2, and the capacitor C2 smooths the same so as to generate and output the light emission voltage Vh2 and the light emission current Ih2. In addition, when the transistor PD2 is off, in the current generator circuit VC2, the magnetic energy stored in the inductor L2 is supplied to the capacitor C2 via the rectifier diode D2, and the capacitor C2 smooths the magnetic energy so as to generate and output the light emission voltage Vh2 and the light emission current Ih2. In other words, the current generator circuit VC2 steps down the drive voltage Vk obtained by turning on and off the transistor PD2, so as to generate and output the light emission voltage Vh2 and the light emission current Ih2.

The comparing circuit CNL12 includes a reference power supply Ref5 and a comparator Cp6.

The reference power supply Ref5 has one terminal connected to the power supply VSS so as to generate a reference voltage Vref5 as the second dimming reference voltage. The reference voltage Vref5 is e.g. 2 V.

The comparator Cp6 has the noninverting terminal connected to a node Nd9 that is a connection node between the node Nh2a and the resistor element Rh2 so as to receive a feedback voltage Vfb4 as the second dimming comparison voltage that is a potential at the node Nd9, and the inverting terminal connected to the reference power supply Ref5 so as to receive the reference voltage Vref5. The comparator Cp6 compares the feedback voltage Vfb4 with the reference voltage Vref5, outputs a comparison result signal Vcr6 as the second control signal so that the potential at the node Nd9 becomes the same level as the reference voltage Vref5 based on a result of the comparison, and adjusts the light emission current Ih2 generated by the transistor PD2 and the current generator circuit VC2. If the feedback voltage Vfb4 is lower than the reference voltage Vref5, for example, the comparator Cp6 outputs the high level comparison result signal Vcr6 so as to increase a potential of the node Nd9. In addition, if the feedback voltage Vfb4 is higher than the reference voltage Vref5, for example, the comparator Cp6 outputs the low level comparison result signal Vcr6 so as to decrease the potential of the node Nd9.

In the way described above, the comparing circuit CNL12 detects the feedback voltage Vfb4 based on the light emission voltage Vh2 and outputs the comparison result signal Vcr6 to adjust the output of the transistor PD2, so that the light emission current Ih2 flowing in the light emitting element group HS2 becomes a desired value.

The driving circuit KD2 is connected to the gate terminal G as a control terminal of the transistor PD2 and the output terminal of the comparator Cp6 in the comparing circuit CNL12, so as to supply a drive signal Vs2 as a second drive signal to the transistor PD2 in accordance with the comparison result signal Vcr6 output from the comparator Cp6, i.e. the comparing circuit CNL12. When receiving the low level comparison result signal Vcr6, for example, the driving circuit KD2 supplies the high level drive signal Vs2 at for example 5 V to the gate terminal G of the transistor PD2. In this way, the transistor PD2 is turned off, and the supply of the voltage based on the drive voltage Vk to the inductor L2 is stopped. In addition, when receiving the high level comparison result signal Vcr6, for example, the driving circuit KD2 supplies the low level drive signal Vs2 at for example 0 V to the gate terminal G of the transistor PD2. In this way, the transistor PD2 is turned on, and the voltage based on the drive voltage Vk is supplied to the inductor L2. Note that the driving circuit KD2 may have a structure for performing the PWM control in which the PWM signal having a predetermined duty ratio is supplied to the gate terminal G of the transistor PD2.

As described above, the dimming circuit LC12 adjusts the light emission current Ih2 output from the transistor PD2 to have a predetermined current value by the drive signal Vs2 based on the comparison result signal Vcr6 output from the comparing circuit CNL12, and thus adjusts the light emission luminance of the light emitting element group HS2.

If the drive voltage Vk is lower than the light emission reference voltage VH so that the light emission control unit HCe is required to perform the light emission stop control, the driving circuit KD1 is supplied with the low level comparison result signal Vcr1 and outputs the high level drive signal Vs1 regardless of the output of the comparing circuit CNL11, so as to forcibly turn off the transistor PD1. In this way, the supply of the light emission current Ih1 to the light emitting element group HS1 is stopped. In addition, if the drive voltage Vk is higher than the light emission reference voltage VH so that the light emission control unit HCe is required to perform the light emission control, the driving circuit KD1 is supplied with the high level comparison result signal Vcr1 and outputs the drive signal Vs1 corresponding to the output of the comparing circuit CNL11 so that the transistor PD1 is on-off controlled. In this way, the current value of the light emission current Ih1 flowing in the light emitting element group HS1 can be controlled by the comparison result signal Vcr5.

If the drive voltage Vk is lower than the light emission reference voltage VH so that the light emission control unit HCe is required to perform the light emission stop control, the driving circuit KD2 is supplied with the low level comparison result signal Vcr1 and outputs the high level drive signal Vs2 regardless of the output of the comparing circuit CNL12 so as to forcibly turn off the transistor PD2. In this way, the supply of the light emission current Ih2 to the light emitting element group HS2 is stopped. In addition, if the drive voltage Vk is higher than the light emission reference voltage VH so that the light emission control unit HCe is required to perform the light emission control, the driving circuit KD2 is supplied with the high level comparison result signal Vcr2 and outputs the drive signal Vs2 corresponding to the output of the comparing circuit CNL12 so that the transistor PD2 is on-off controlled. In this way, the current value of the light emission current Ih2 flowing in the light emitting element group HS2 can be controlled by the comparison result signal Vcr6.

As described above, in the lighting device 30c according to the third variation of the third embodiment of the present invention, the light emission control unit HCe detects a magnitude relationship between the drive voltage Vk and the light emission reference voltage VH, performs light emission control to cause light emission of the light emitting element groups HS if the drive voltage Vk is higher than the light emission reference voltage VH, and performs light emission stop control to stop light emission of the light emitting element groups HS if the drive voltage Vk is lower than the light emission reference voltage VH. Therefore, it is possible to prevent a variation in timing of causing as well as stopping light emission of the light emitting element group HS1 and the light emitting element group HS2.

Note that in the above description, an asynchronous rectifier type step-down converter using the rectifier diodes D1 and D2 is exemplified as the lighting device 30c, but this is not a limitation. It is possible to use a synchronous rectifier type step-down converter. In addition, without limiting to step-down converter, a step-up converter may be used, or a step-up and down converter may be used.

In addition, PMOS transistors are used as the transistor PD1 and the transistor PD2 in the lighting device 30c, but it is possible to use NMOS transistors as them. In this case, when receiving the low level comparison result signal Vcr5, the driving circuit KD1 should supply the low level drive signal Vs1 at for example 0 V to the gate terminal G of the transistor PD1, and when receiving the high level comparison result signal Vcr5, the driving circuit KD1 should supply the high level drive signal Vs1 at for example 5 V to the gate terminal G of the transistor PD1. In addition, when receiving the low level comparison result signal Vcr6, the driving circuit KD2 should supply the low level drive signal Vs2 at for example 0 V to the gate terminal G of the transistor PD2, and when receiving the high level comparison result signal Vcr6, the driving circuit KD2 should supply the high level drive signal Vs2 at for example 5 V to the gate terminal G of the transistor PD2. Note that when an NMOS transistor is used as the transistor PD1, the driving circuit KD1 may step up the comparison result signal Vc5 to generate the drive signal Vs1, and when an NMOS transistor is uses as the transistor PD2, the driving circuit KD2 may step up the comparison result signal Vc6 to generate the drive signal Vs2.

Fourth Embodiment

Figure 13:
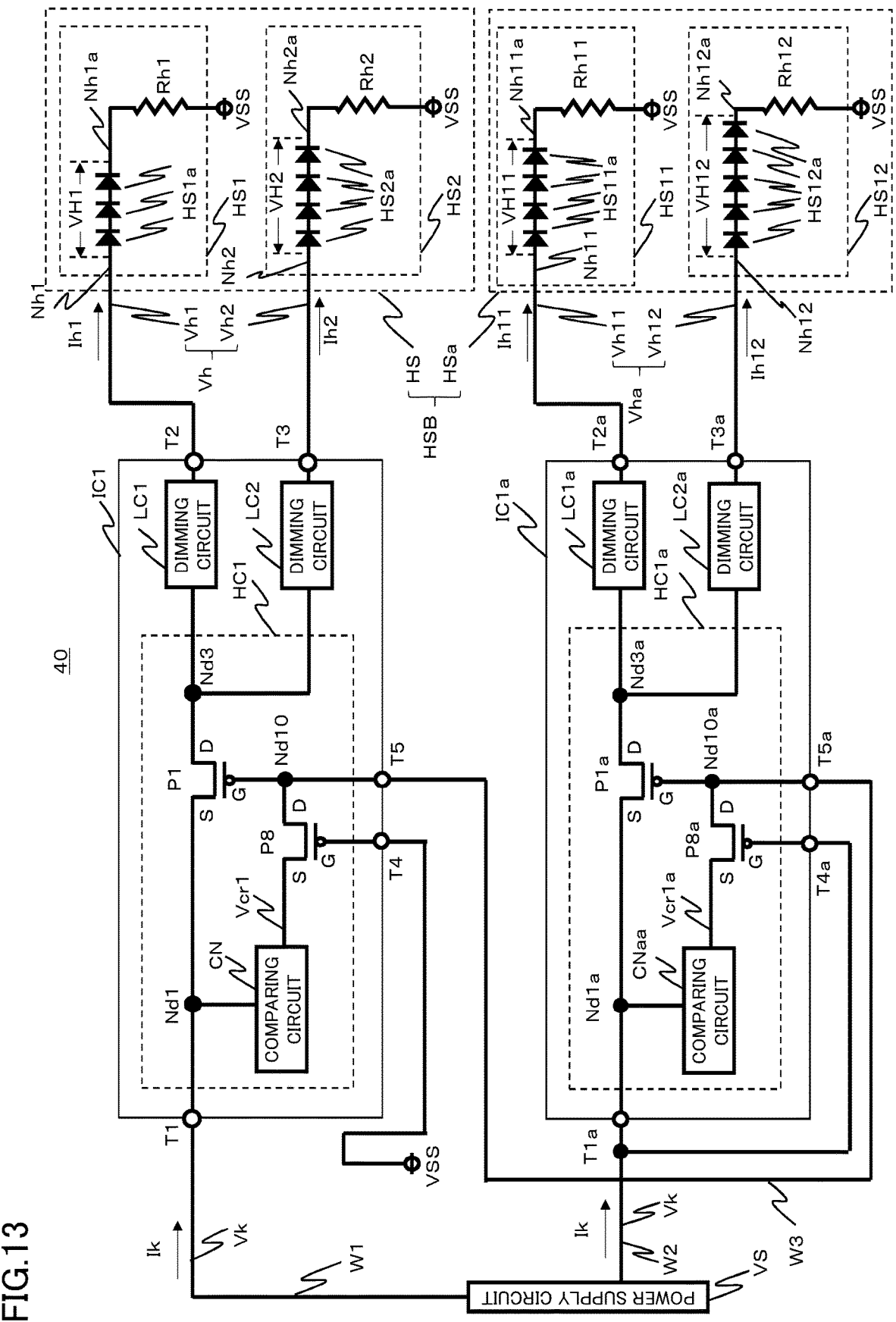
FIG. 13 is a diagram illustrating a lighting device 40 according to a fourth embodiment of the present invention.

FIG. 13 is a diagram illustrating a lighting device 40 according to a fourth embodiment of the present invention. The lighting device 40 includes the power supply circuit VS, light emitting element groups HSB, a semiconductor chip IC1 as a first semiconductor chip, and a semiconductor chip IC1a as a second semiconductor chip. Note that in the lighting device 40 illustrated in FIG. 13, the same structure as in the lighting device 10 illustrated in FIG. 1 or in the lighting device 10a illustrated in FIG. 3 is denoted by the same numeral or symbol, and description thereof is appropriately omitted.

The light emitting element groups HSB include the light emitting element groups HS, and a light emitting element groups HSa. The light emitting element groups HS include the light emitting element group HS1, and the light emitting element group HS2 as a first light emitting element group. The light emitting element groups HSa include a light emitting element group HS11, and a light emitting element group HS12 as a second light emitting element group.

Here, the "first light emission voltage" recited in the claims corresponds to the light emission voltage Vh2, the "first light emission reference voltage" corresponds to the light emission reference voltage VH2, the "first light emission current" corresponds to the light emission current Ih2, and the "first light emitting element" corresponds to the light emitting element HS2a.

The light emitting element group HS11 includes a plurality of light emitting elements HS11a connected in series to each other, and a resistor element Rh11. The light emitting elements HS11a is a light emitting diode (LED) and is a self light emitting element. The cathode of the light emitting elements HS11a as one terminal of the light emitting element group HS11 is connected to one terminal of the resistor element Rh11. The other terminal of the resistor element Rh11 is connected to the power supply VSS of for example 0 V that is lower than the drive voltage Vk. Note that the light emitting elements HS11a is not limited to a LED, and a general organic electro luminescence (EL) element as a self light emitting element such as a light emitting polymer can be used.

The light emitting element group HS11 emits light when a light emission voltage Vh11 equal to or higher than a light emission reference voltage VH11 based on the drive voltage Vk is applied to the anode of the light emitting elements HS11a as the other terminal of itself, so that a light emission current Ih11 flows in each of the light emitting elements HS11a. Note that the current value of the light emission current Ih11 is determined based on a resistance value of the resistor element Rh11. In addition, each of the light emitting elements HS11a has an internal resistance, and a forward voltage of one light emitting element HS11a is supposed to be 2 V, for example.

Here, in this embodiment, the light emission reference voltage VH11 for the light emitting element group HS11 to emit light is 8 V, for example, because the light emitting element group HS11 includes four light emitting elements HS11a connected in series, each of which has a forward voltage of 2 V. In other words, in order that the light emitting element group HS11 emits light, the light emission voltage Vh11 applied to the anode of the light emitting elements HS11a on the other terminal must be 8 V or higher.

Here, "the anode of the light emitting elements HS11a as the other terminal of the light emitting element group HS11" is referred to as a node Nh11, and "the cathode of the light emitting elements HS11a as the one terminal of the light emitting element group HS11" is referred to as a node Nh11a. In addition, "the light emission current Ih11 flowing in each of the light emitting elements HS11a" is referred to as "the light emission current Ih11 flowing in the light emitting element group HS11".

The light emitting element group HS12 includes a plurality of light emitting elements HS12a as a second light emitting elements connected in series, and a resistor element Rh12. The light emitting element HS12a is a light emitting diode (LED) and is a self light emitting element. The cathode of the light emitting elements HS12a as one terminal of the light emitting element group HS12 is connected to one terminal of the resistor element Rh12. The other terminal of the resistor element Rh12 is connected to the power supply VSS. Note that the light emitting element HS12a is not limited to an LED, and a general organic electro luminescence (EL) element as a self light emitting element such as a light emitting polymer can be used.

The light emitting element group HS12 emits light when the light emission voltage Vh12 as a second light emission voltage based on the drive voltage Vk, which is equal to or higher than a light emission reference voltage VH12 as a second light emission reference voltage higher than the light emission reference voltage VH11, is applied to the anode of the light emitting elements HS12a as the other terminal of itself, so that a light emission current Ih12 as a second light emission current flows in each of the light emitting elements HS12a. Note that the current value of the light emission current Ih12 is determined based on the resistance value of the resistor element Rh12. In addition, each of the light emitting elements HS12a has an internal resistance, and a forward voltage of one light emitting element HS12a is supposed to be 2 V, for example.

Here, in this embodiment, the light emission reference voltage VH12 for the light emitting element group HS12 to emit light is 10 V, for example, because the light emitting element group HS12 includes five light emitting elements HS12a connected in series, each of which has a forward voltage of 2 V. In other words, in order that the light emitting element group HS12 emits light, the light emission voltage Vh12 applied to the anode of the light emitting element HS12a on the other terminal must be 10 V or higher.

Here, "the anode of the light emitting element HS12 as the other terminal of the light emitting element group HS12" is referred to as a node Nh12, and "the cathode of the light emitting element HS12a as the one terminal of the light emitting element group HS12" is referred to as a node Nh12a. In addition, "the light emission current Ih12 flowing in each of the light emitting elements HS12a" is referred to as "the light emission current Ih12 flowing in the light emitting element group HS12".

Here, in this embodiment, in order that the light emitting element groups HSa emit light without an internal variation, i.e. in order that the light emitting element group HS11 and the light emitting element group HS12 emit light at the same time, because the light emission reference voltage VH12 at 10 V is higher than the light emission reference voltage VH11 at 8 V, a voltage higher than 10 V as the light emission reference voltage VH12 must be applied to the light emitting element groups HSa as a light emission voltage Vha. Here, the voltage for the light emitting element groups HSa to emit light without an internal variation is referred to as a light emission reference voltage VHa. The light emitting element groups HSa emit light when being applied with the light emission voltage Vha equal to or higher than the light emission reference voltage VHa based on the light emission reference voltage VH12. Note that in this embodiment, the light emission reference voltage VHa is 10 V that is the same as the light emission reference voltage VH12.

Note that in this embodiment, the light emitting element group HS12 is equipped with more number of light emitting elements HS12a than the number of light emitting elements HS11a disposed in the light emitting element group HS11, as an example, but this is not a limitation. In other words, the lighting device 40 according to the present invention achieves outstanding effects in cases where the light emission reference voltage VH11 necessary for the light emitting element group HS11 to emit light is different from the light emission reference voltage VH12 necessary for the light emitting element group HS12 to emit light, and a case where the light emitting element group HS11 and the light emitting element group HS12 have the same number of light emitting elements is not excluded. In addition, in the same manner, each of the light emitting element group HS11 and the light emitting element group HS12 may have a single LED.

Here, if the light emitting element groups HSa are applied with the light emission voltage Vha, which is equal to or higher than the light emission reference voltage VH11 and lower than or equal to the light emission reference voltage VH12 without any control, the light emitting element group HS11 emits light while the light emitting element group HS12 does not emit light. In addition, after that, when the light emission voltage Vha becomes equal to or higher than the light emission reference voltage VH12 and is applied to the light emitting element groups HSa, not only the light emitting element group HS11 but also the light emitting element group HS12 emits light. In other words, if the light emitting element groups HSa are applied with the light emission voltage Vh lower than the light emission reference voltage VH12, light emission timing is varied between the light emitting element group HS11 and the light emitting element group HS12, and hence light emission of the entire light emitting element groups HSa may be fluctuated. In particular, when being used as an in-vehicle exterior lamp, the fluctuation in light emission of the light emitting element groups may cause an accident. The lighting device 40 according to the present invention is aimed to prevent occurrence of such a problem.

Here, in this embodiment, in order that the light emitting element groups HSB emit light without an internal variation, i.e. in order that the light emitting element groups HS and the light emitting element groups HSa emit light at the same time, because the light emission reference voltage VH12 at 10 V is higher than the light emission reference voltage VH2 at 8 V, a voltage higher than 10 V as the light emission reference voltage VH12 must be applied to the light emitting element groups HS as the light emission voltage Vh and must be applied to the light emitting element groups HSa as the light emission voltage Vha. Here, the voltage for the light emitting element groups HSB to emit light without an internal variation is referred to as a light emission reference voltage VHB. The light emitting element groups HSB emit light when the light emitting element groups HS are applied with the light emission voltage Vh equal to or higher than the light emission reference voltage VHB based on the light emission reference voltage VH12 and the light emitting element groups HSa are applied with the light emission voltage Vha equal to or higher than the light emission reference voltage VHB. Note that in this embodiment, the light emission reference voltage VHB is 10 V that is the same as the light emission reference voltage VH12.

Note that in this embodiment, the light emitting element group HS12 includes more number of light emitting elements HS12a than the number of light emitting elements HS2a disposed in the light emitting element group HS2, as an example, but this is not a limitation. In other words, the lighting device 40 according to the present invention achieves outstanding effects in cases where the light emission reference voltage VH2 necessary for the light emitting element group HS2 to emit light is different from the light emission reference voltage VH12 necessary for the light emitting element group HS12 to emit light, and a case where the light emitting element group HS2 and the light emitting element group HS12 include the same number of light emitting elements is not excluded. In addition, in the same manner, each of the light emitting element group HS2 and the light emitting element group HS12 may have a single LED.

Here, if the light emitting element groups HS is applied with the light emission voltage Vh that is equal to or higher than the light emission reference voltage VH2 and is lower than or equal to the light emission reference voltage VH12, and the light emitting element groups HSa is applied with the light emission voltage Vha that is equal to or higher than the light emission reference voltage VH2 and is lower than or equal to the light emission reference voltage VH12, without any control, then the light emitting element group HS2 emits light while the light emitting element group HS12 does not emit light. In addition, after that, when the light emission voltage Vha becomes equal to or higher than the light emission reference voltage VH12 and is applied to the light emitting element groups HSa, not only the light emitting element group HS2 but also the light emitting element group HS12 emits light. In other words, if the light emitting element groups HSa is applied with the light emission voltage Vh lower than the light emission reference voltage VH12, light emission timing is varied between the light emitting element group HS2 and the light emitting element group HS12, and hence light emission of the entire light emitting element groups HSB may be fluctuated. In particular, when being used as an in-vehicle exterior lamp, the fluctuation in light emission of the light emitting element groups may cause an accident. The lighting device 40 according to the present invention is aimed to prevent occurrence of such a problem.

The semiconductor chip IC1 has electrode pads for external electric connection, which include an electrode pad T1, an electrode pad T2, an electrode pad T3, an electrode pad T4, and an electrode pad T5. In addition, the semiconductor chip IC1 includes a light emission control unit HC1 as the first light emission control unit, the dimming circuit LC1, and the dimming circuit LC2 as a first dimming portion.

The electrode pad T1 is connected to the power supply circuit VS via wiring W1 as first power supply wiring. In other words, the wiring W1 is connected to the power supply circuit VS and the semiconductor chip IC1. The electrode pad T2 is connected to the node Nh1 of the light emitting element group HS1. The electrode pad T3 is connected to the node Nh2 of the light emitting element group HS2. The electrode pad T4 is connected to the power supply VSS.

The light emission control unit HC1 includes the comparing circuit CN as a first comparing circuit, the transistor P1 as a first control switch, and a transistor P8 as a third control switch.

The comparing circuit CN is connected to the electrode pad T1, i.e., is connected to the power supply circuit VS via the electrode pad T1. The comparing circuit CN determines whether the drive voltage Vk is higher or lower than a voltage based on the light emission reference voltage VHa and outputs a result of the comparison as the comparison result signal Vcr1.

The transistor P1 is a PMOS transistor, which has the source terminal S connected to the electrode pad T1, i.e. connected to the power supply circuit VS via the electrode pad T1, the drain terminal D connected to one terminal of the dimming circuit LC1 and one terminal of the dimming circuit LC2, and the gate terminal G connected to the electrode pad T5.

The transistor P8 is a PMOS transistor, which has the source terminal S connected to the comparing circuit CN, and the drain terminal D connected to the gate terminal G of the transistor P1 and the electrode pad T5. In this way, the comparing circuit CN and the gate terminal G of the transistor P1 are connected to each other via the transistor P8, and the electric connection between the comparing circuit CN and the gate terminal G of the transistor P1 is controlled by the transistor P8. In addition, the transistor P8 has the gate terminal G connected to the electrode pad T4, i.e. connected to the power supply VSS via the electrode pad T4. In this way, the transistor P8 is turned on when the drive voltage Vk is increased, and the signal level of the comparison result signal Vcr1, which is output from the comparing circuit CN and is supplied to the source terminal S of the transistor P8, is increased, so that the gate-source voltage of the transistor P8 becomes equal to or higher than a threshold voltage. Here, the connection node between the drain terminal D of the transistor P8 and the gate terminal G of the transistor P1 is referred to as anode Nd10.

The dimming circuit LC1 has one terminal connected to the drain terminal D of the transistor P1 in the light emission control unit HC. In addition, the dimming circuit LC1 has the other terminal connected to the electrode pad T2, i.e. connected to the node Nh1 of the light emitting element group HS1 via the electrode pad T2.

The dimming circuit LC2 has one terminal connected to the drain terminal D of the transistor P1 in the light emission control unit HC. In addition, the dimming circuit LC2 has the other terminal connected to the electrode pad T3, i.e. connected to the node Nh2 of the light emitting element group HS2 via the electrode pad T3.

The semiconductor chip IC1a has the same structure as the semiconductor chip IC1. However, in the semiconductor chip IC1a of FIG. 13, for convenience of description, in order to discriminate from the semiconductor chip IC1, the suffix "a" is added to the numeral or symbol of the structure in the semiconductor chip IC1. In addition, in the semiconductor chip IC1a, description of the structure described in the semiconductor chip IC1 is appropriately omitted. Note that the "comparing circuit CN" is referred to as a "comparing circuit CNaa" here, in order to discriminate from the "comparing circuit CNa" illustrated in FIG. 5 or the like.

The semiconductor chip IC1a has electrode pads for external electric connection, which include an electrode pad T1a, an electrode pad T2a, an electrode pad T3a, an electrode pad T4a, and an electrode pad T5a. In addition, the semiconductor chip IC1a includes a light emission control unit HC1a as a second light emission control unit, a dimming circuit LC1a, and a dimming circuit LC2a as a second dimming portion. The light emission control unit HC1a includes the comparing circuit CNaa as a second comparing circuit, a transistor P1a as a second control switch, and a transistor P8a.

The electrode pad T1a is connected to the power supply circuit VS via wiring W2 as second power supply wiring. In other words, the wiring W2 is connected to the power supply circuit VS and the semiconductor chip IC1a. The electrode pad T2a is connected to the node Nh11 of the light emitting element group HS11. The electrode pad T3a is connected to the node Nh12 of the light emitting element group HS12. Note that the wiring W2 has a wiring resistance smaller than that of the wiring W1, for example.

The dimming circuit LC1a has one terminal connected to the drain terminal D of the transistor P1a of the light emission control unit HC1a. In addition, the dimming circuit LC1a has the other terminal connected to the electrode pad T2a, and thus is connected to the node Nh11 of the light emitting element group HS11 via the electrode pad T2a.

The dimming circuit LC2a has one terminal connected to the drain terminal D of the transistor P1a in the light emission control unit HC1a. In addition, the dimming circuit LC2a has the other terminal connected to the electrode pad T3a, and thus is connected to the node Nh12 of the light emitting element group HS12 via the electrode pad T3a.

The electrode pad T4a is connected to the power supply circuit VS. In this way, the gate terminal G of the transistor P8a is always connected to the power supply circuit VS. Therefore, the transistor P8a is not turned on even if the voltage level of the drive voltage Vk is increased, and is always in off state.

The electrode pad T5a is connected to the electrode pad T5 of the semiconductor chip IC1 via wiring W3 as first connection wiring. In other words, the wiring W3 electrically connects the node Nd10 and a node Nd10a. In this way, the gate terminal G of the transistor P1 and the gate terminal G of the transistor P1a are electrically connected.

As described above, as to the lighting device 40, in the light emission control unit HC1, the gate terminal G of the transistor P8 of the semiconductor chip IC1 is electrically connected to the power supply VSS, and hence the comparison result signal Vcr1 is supplied from the comparing circuit CN to the gate terminal G of the transistor P1. In addition, in the light emission control unit HC1a, the gate terminal G of the transistor P8a of the semiconductor chip IC1a is electrically connected to the power supply circuit VS, and hence the supply of the comparison result signal Vcr1a from the comparing circuit CNaa to the gate terminal G of the transistor P1a is interrupted. In addition, the gate terminal G of the transistor P1, which is connected to the comparing circuit CN, is electrically connected to the gate terminal G of the transistor P1a via the wiring W3. Further, thus in the lighting device 40, the light emission control unit HC1 of the semiconductor chip IC1 performs the light emission control and the light emission stop control of the light emitting element groups HS connected to the semiconductor chip IC1, and the light emission control and the light emission stop control of the light emitting element groups HSa connected to the semiconductor chip IC1a, i.e. performs the light emission control and the light emission stop control of the light emitting element groups HSB.

Therefore, even if there is a manufacturing variation between the comparing circuit CN of the semiconductor chip IC1 and the comparing circuit CNaa of the semiconductor chip IC1a, the lighting device 40 can prevent a variation in timing of causing as well as stopping light emission of the light emitting element groups HS and the light emitting element groups HSa.

In addition, as to the lighting device 40, in the case where a wiring resistance of the wiring W1 for the semiconductor chip IC1 to receive power supply of the drive voltage Vk and the drive current Ik from the power supply circuit VS is larger than a wiring resistance of the wiring W2 for the semiconductor chip IC1a to receive power supply of the drive voltage Vk and the drive current Ik from the power supply circuit VS, the light emission control unit HC1 of the semiconductor chip IC1 performs the light emission control and the light emission stop control of the light emitting element groups HS connected to the semiconductor chip IC1, and performs the light emission control and the light emission stop control of the light emitting element groups HSa connected to the semiconductor chip IC1a. Therefore, even if a potential increase in the drive voltage Vk obtained by the comparing circuit CN of the semiconductor chip IC1 is delayed from a potential increase in the drive voltage Vk obtained by the comparing circuit CNaa of the semiconductor chip IC1a based on a wiring resistance difference between the wiring W1 and the wiring W2, it is possible to prevent a light emission timing variation between the light emitting element groups HS and the light emitting element groups HSa.

[First Variation of Fourth Embodiment]

Figure 14:
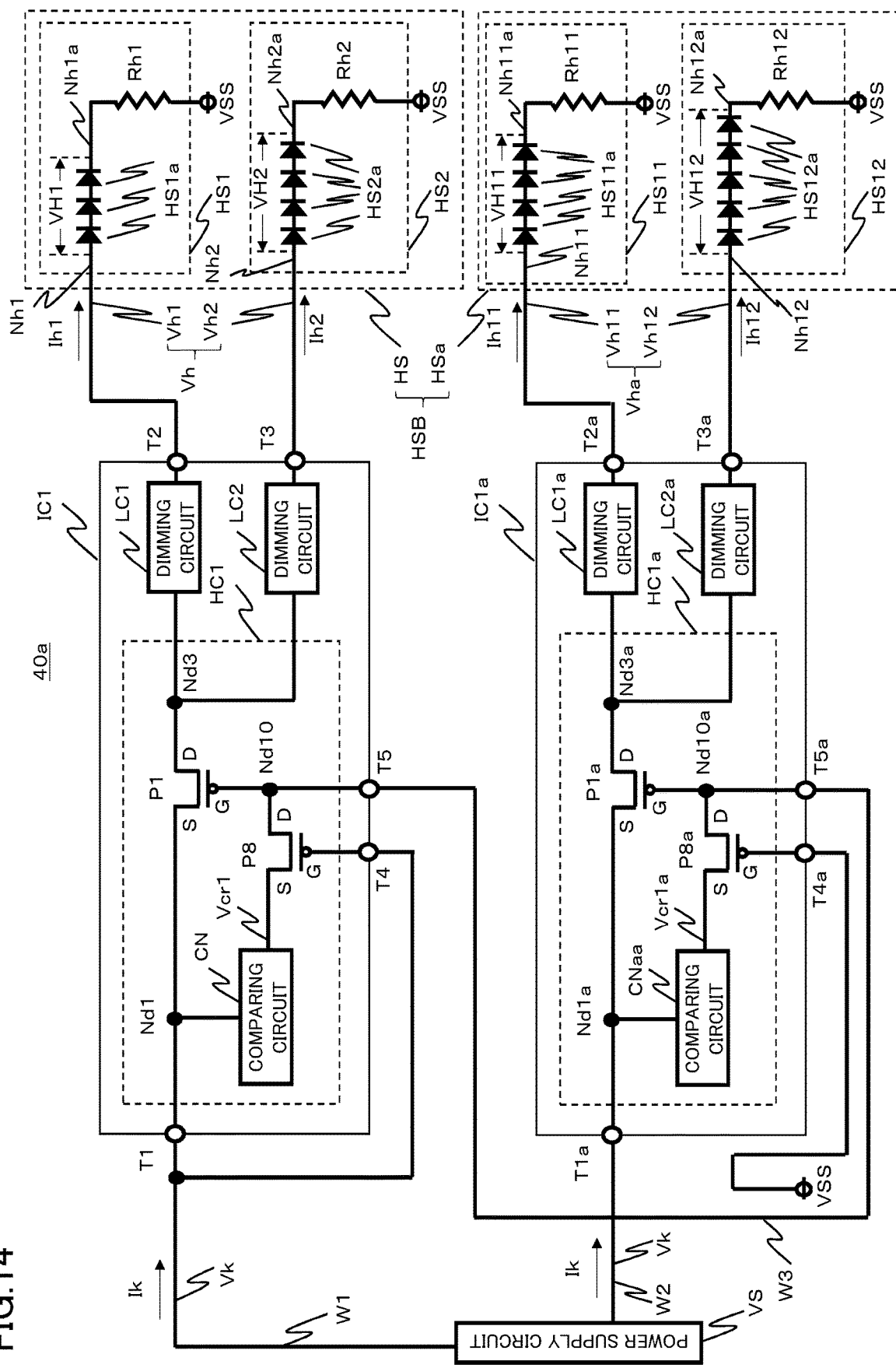
FIG. 14 is a diagram illustrating a lighting device 40a according to a first variation of the fourth embodiment of the present invention.

FIG. 14 is a diagram illustrating a lighting device 40a according to a first variation of the fourth embodiment of the present invention. The lighting device 40a includes the power supply circuit VS, the light emitting element groups HSB, the semiconductor chip IC1, and the semiconductor chip IC1a. Note that in the lighting device 40a illustrated in FIG. 14, the same structure as in the lighting device 40 illustrated in FIG. 13 is denoted by the same numeral or symbol, and description thereof is appropriately omitted.

The lighting device 40a is substantially different from the lighting device 40 in the connection destination of the electrode pad T4 of the semiconductor chip IC1 and in the connection destination of the electrode pad T4a of the semiconductor chip IC1a.

The electrode pad T4 is connected to the power supply circuit VS. In this way, in the transistor P8, the gate terminal G is always connected to the power supply circuit VS. Therefore, the transistor P8 is not turned on even if the voltage level of the drive voltage Vk is increased, and is always in off state.

In addition, the electrode pad T4a is connected to the power supply VSS. In this way, in the transistor P8a, the gate terminal G is connected to the power supply VSS. Therefore, the transistor P8a is turned on when the drive voltage Vk is increased so that the gate-source voltage of the transistor P8 becomes equal to or higher than a threshold voltage.

As described above, as to the lighting device 40a, in the light emission control unit HC1, the gate terminal G of the transistor P8 of the semiconductor chip IC1 is electrically connected to the power supply circuit VS, and hence supply of the comparison result signal Vcr1 from the comparing circuit CN to the gate terminal G of the transistor P1 is interrupted. In addition, in the light emission control unit HC1a, the gate terminal G of the transistor P8a of the semiconductor chip IC1a is electrically connected to the power supply VSS, and hence the comparison result signal Vcr1a is supplied from the comparing circuit CNaa to the gate terminal G of the transistor P1a. In addition, the gate terminal G of the transistor P1a connected to the comparing circuit CNaa is electrically connected to the gate terminal G of the transistor P1 via the wiring W3. Further, thus in the lighting device 40, the light emission control unit HC1a of the semiconductor chip IC1a performs the light emission control and the light emission stop control of the light emitting element groups HS connected to the semiconductor chip IC1, and the light emission control and the light emission stop control of the light emitting element groups HSa connected to the semiconductor chip IC1a, i.e. performs the light emission control and the light emission stop control of the light emitting element groups HSB.

Therefore, even if there is a manufacturing variation between the comparing circuit CN of the semiconductor chip IC1 and the comparing circuit CNaa of the semiconductor chip IC1a, the lighting device 40a can prevent a variation in timing of causing as well as stopping light emission of the light emitting element groups HS and the light emitting element groups HSa.

Note that the light emission control and the light emission stop control in the lighting device including the semiconductor chip IC1 and the semiconductor chip IC1a are performed by one of the light emission control unit HC1 of the semiconductor chip IC1 and the light emission control unit HC1a of the semiconductor chip IC1a as described above.

[Second Variation of Fourth Embodiment]

Figure 15:
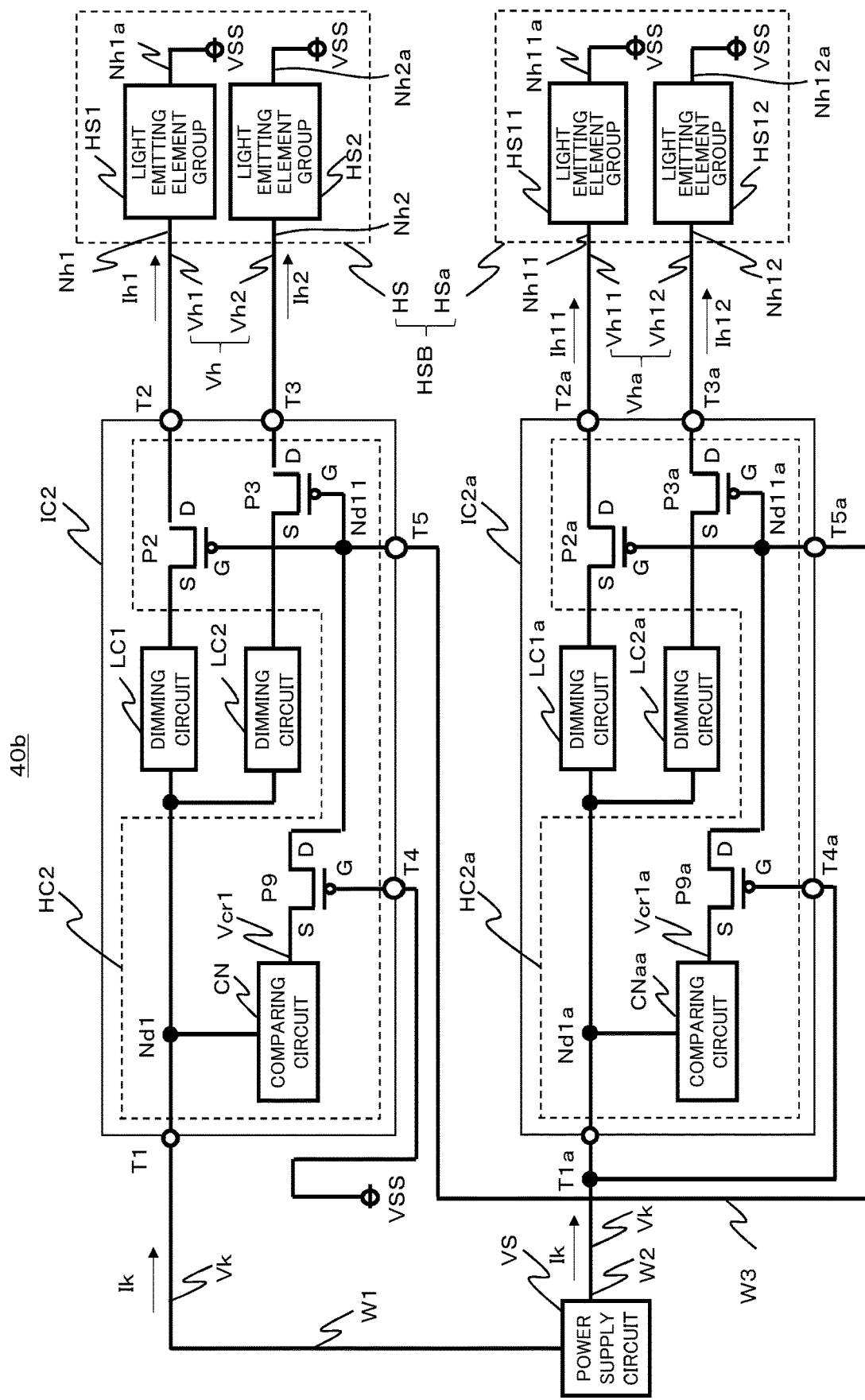
FIG. 15 is a diagram illustrating a lighting device 40b according to a second variation of the fourth embodiment of the present invention.

FIG. 15 is a diagram illustrating a lighting device 40b according to a second variation of the fourth embodiment of the present invention. The lighting device 40b includes the power supply circuit VS, the light emitting element groups HSB, a semiconductor chip IC2 as the first semiconductor chip, and a semiconductor chip IC2a as the second semiconductor chip. Note that in the lighting device 40b illustrated in FIG. 15, the same structure as in the lighting device 10b illustrated in FIG. 4 or the lighting device 40 illustrated in FIG. 13 is denoted by the same numeral or symbol, and description thereof is appropriately omitted.

The semiconductor chip IC2 has electrode pads for external electric connection, which include the electrode pad T1, the electrode pad T2, the electrode pad T3, the electrode pad T4, and the electrode pad T5. In addition, the semiconductor chip IC2 includes a light emission control unit HC2 as the first light emission control unit, the dimming circuit LC1, and the dimming circuit LC2 as the first dimming portion.

The electrode pad T1 is connected to the power supply circuit VS via the wiring W1 as the first power supply wiring. In other words, the wiring W1 is connected to the power supply circuit VS and the semiconductor chip IC2. The electrode pad T2 is connected to the node Nh1 of the light emitting element group HS1. The electrode pad T3 is connected to the node Nh2 of the light emitting element group HS2. The electrode pad T4 is connected to the power supply VSS.

The light emission control unit HC2 includes the comparing circuit CN as the first comparing circuit, the transistor P2, the transistor P3 as the first control switch, and a transistor P9 as the third control switch.

The dimming circuit LC1 has one terminal connected to the electrode pad T1, i.e. connected to the power supply circuit VS via the electrode pad T1.

The dimming circuit LC2 has one terminal connected to the electrode pad T1, i.e. connected to the power supply circuit VS via the electrode pad T1.

The transistor P2 is a PMOS transistor, which has the source terminal S connected to the other terminal of the dimming circuit LC1, and the drain terminal D connected to the electrode pad T2, i.e. connected to the node Nh1 of the light emitting element group HS1 via the electrode pad T2.

The transistor P3 is a PMOS transistor, which has the source terminal S connected to the other terminal of the dimming circuit LC2, and the drain terminal D connected to the electrode pad T3, i.e. connected to the node Nh2 of the light emitting element group HS2 via the electrode pad T3.

The transistor P9 is a PMOS transistor, which has the source terminal S connected to the comparing circuit CN, and the drain terminal D connected to the gate terminal G of the transistor P1 and the electrode pad T5. In this way, the comparing circuit CN is connected to the gate terminals G of the transistor P2 and the transistor P3 via the transistor P9, and the electric connection between the comparing circuit CN and the gate terminals G of the transistor P2 and the transistor P3 is controlled by the transistor P9. In addition, the transistor P9 has the gate terminal G connected to the electrode pad T4, i.e. connected to the power supply VSS via the electrode pad T4. In this way, the transistor P9 is turned on when the drive voltage Vk is increased so that the signal level of the comparison result signal Vcr1, which is output from the comparing circuit CN and is supplied to the source terminal S of the transistor P9, is increased, and hence the gate-source voltage of the transistor P9 becomes equal to or higher than a threshold voltage. Here, the connection node between the drain terminal D of the transistor P9 and the gate terminals G of the transistor P2 and the transistor P3 is referred to as a node Nd11.

The semiconductor chip IC2a has the same structure as the semiconductor chip IC2. However, in the semiconductor chip IC2a of FIG. 15, for convenience of description, in order to discriminate from the semiconductor chip IC2, the suffix "a" is added to the numeral or symbol of the structure in the semiconductor chip IC2. In addition, in the semiconductor chip IC2a, description of the structure described in the semiconductor chip IC2 is appropriately omitted. Note that the "comparing circuit CN" is referred to as a "comparing circuit CNaa" here, in order to discriminate from the "comparing circuit CNa" illustrated in FIG. 5 or the like.

The semiconductor chip IC2a has electrode pads for external electric connection, which include the electrode pad T1a, the electrode pad T2a, the electrode pad T3a, the electrode pad T4a, and the electrode pad T5a. In addition, the semiconductor chip IC2a includes a light emission control unit HC2a as the second light emission control unit, the dimming circuit LC1a, and the dimming circuit LC2a as the second dimming portion. The light emission control unit HC2a includes the comparing circuit CNaa, a transistor P2a as the second control switch, a transistor P3a as the second control switch, and a transistor P9a.

The electrode pad T1a is connected to the power supply circuit VS via the wiring W2 as the second power supply wiring. In other words, the wiring W2 is connected to the power supply circuit VS and the semiconductor chip IC2a. The electrode pad T2a is connected to the node Nh11 of the light emitting element group HS11. The electrode pad T3a is connected to the node Nh12 of the light emitting element group HS12. Note that the wiring W2 has a smaller wiring resistance than the wiring W1, for example.

The dimming circuit LC1a has one terminal connected to the electrode pad T1a, i.e. connected to the power supply circuit VS via the electrode pad T1a.

The dimming circuit LC2a has one terminal connected to the electrode pad T1a, i.e. connected to the power supply circuit VS via the electrode pad T1a.

The transistor P2a is a PMOS transistor, which has the source terminal S connected to the other terminal of the dimming circuit LC1a, and the drain terminal D connected to the electrode pad T2a, i.e. connected to the node Nh11 of the light emitting element group HS11 via the electrode pad T2a.

The transistor P3a is a PMOS transistor, which has the source terminal S connected to the other terminal of the dimming circuit LC2a, and the drain terminal D connected to the electrode pad T3a, i.e. connected to the node Nh12 of the light emitting element group HS12 via the electrode pad T3a.

The electrode pad T4a is connected to the power supply circuit VS. In this way, in the transistor P9a, the gate terminal G is always connected to the power supply circuit VS. Therefore, transistor P9a is not turned on even if the voltage level of the drive voltage Vk is increased, and is always in off state.

The electrode pad T5a is connected to the electrode pad T5 of the semiconductor chip IC2 via the wiring W3. In other words, the wiring W3 electrically connects the node Nd11 and the node Nd11a. In this way, the gate terminals G of the transistor P2 and the transistor P3 are electrically connected to gate terminals G of the transistor P2a and the transistor P3a.

As described above, in the lighting device 40*b*, the gate terminal G of the transistor P9 of the semiconductor chip IC2 is electrically connected to the power supply VSS in the light emission control unit HC2, and hence the comparison result signal Vcr1 is supplied from the comparing circuit CN to the gate terminals G of the transistor P2 and the transistor P3. In addition, the gate terminals G of the transistor P2a and the transistor P3a of the semiconductor chip IC2a are electrically connected to the power supply circuit VS in the light emission control unit HC2a, and hence the supply of the comparison result signal Vcr1a from the comparing circuit CNaa to the gate terminals G of the transistor P2a and the transistor P3a is interrupted. In addition, the gate terminals G of the transistor P2 and the transistor P3, which are connected to the comparing circuit CN, are electrically connected to the gate terminals G of the transistor P2a and the transistor P3a via the wiring W3. Further, in this way, in the lighting device 40*b*, the light emission control unit HC2 of the semiconductor chip IC2 performs the light emission control and the light emission stop control of the light emitting element groups HS connected to the semiconductor chip IC2, and the light emission control and the light emission stop control of the light emitting element groups HSa connected to the semiconductor chip IC2a, i.e. performs the light emission control and the light emission stop control of the light emitting element groups HSB.

Therefore, even if there is a manufacturing variation between the comparing circuit CN of the semiconductor chip IC2 and the comparing circuit CNaa of the semiconductor chip IC2a, the lighting device 40b can prevent a variation in timing of causing as well as stopping light emission of the light emitting element groups HS and the light emitting element groups HSa.

In addition, as to the lighting device 40b, in the case where a wiring resistance of the wiring W1 for the semiconductor chip IC2 to receive power supply of the drive voltage Vk and the drive current Ik from the power supply circuit VS is larger than a wiring resistance of the wiring W2 for the semiconductor chip IC2a to receive power supply of the drive voltage Vk and the drive current Ik from the power supply circuit VS, the light emission control unit HC2 of the semiconductor chip IC2 performs the light emission control and the light emission stop control of the light emitting element groups HS connected to the semiconductor chip IC2, and performs the light emission control and the light emission stop control of the light emitting element groups HSa connected to the semiconductor chip IC2a. Therefore, even if a potential increase in the drive voltage Vk obtained by the comparing circuit CN of the semiconductor chip IC2 is delayed from a potential increase in the drive voltage Vk obtained by the comparing circuit CNaa of the semiconductor chip IC2a, based on the wiring resistance difference between the wiring W1 and the wiring W2, it is possible to prevent a light emission timing variation between the light emitting element groups HS and the light emitting element groups HSa.

[Third Variation of Fourth Embodiment]

Figure 16:
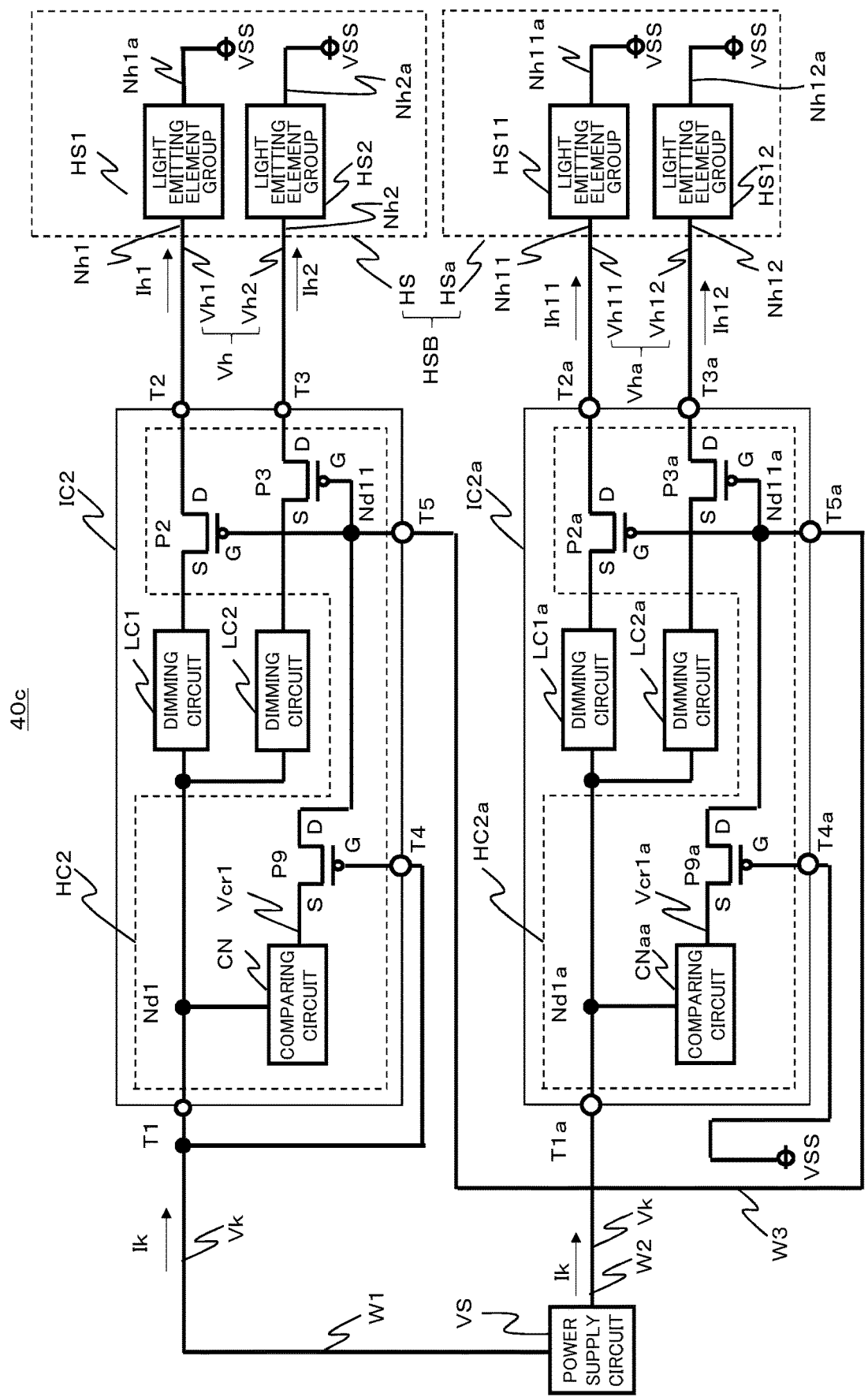
FIG. 16 is a diagram illustrating a lighting device 40c according to a third variation of the fourth embodiment of the present invention.

FIG. 16 is a diagram illustrating a lighting device 40c according to a third variation of the fourth embodiment of the present invention. The lighting device 40c includes the power supply circuit VS, the light emitting element groups HSB, the semiconductor chip IC2, and the semiconductor chip IC2a. Note that in the lighting device 40c illustrated in FIG. 16, the same structure as in the lighting device 40b illustrated in FIG. 15 is denoted by the same numeral or symbol, and description thereof is appropriately omitted.

The lighting device 40c is substantially different from the lighting device 40b in the connection destination of the electrode pad T4 of the semiconductor chip IC2 and in the connection destination of the electrode pad T4a of the semiconductor chip IC2a.

The electrode pad T4 is connected to the power supply circuit VS. In this way, on the transistor P9, the gate terminal G is always connected to the power supply circuit VS. Therefore, transistor P9 is not turned on even if the voltage level of the drive voltage Vk is increased, and is always in off state.

In addition, the electrode pad T4a is connected to the power supply VSS. In this way, in the transistor P9a, the gate terminal G is connected to the power supply VSS. Therefore, transistor P9a is turned on when the drive voltage Vk is increased so that the gate-source voltage of the transistor P9 becomes equal to or higher than a threshold voltage.

As described above, in the lighting device 40a, the gate terminal G of the transistor P9 of the semiconductor chip IC2 is electrically connected to the power supply circuit VS in the light emission control unit HC2, and hence supply of the comparison result signal Vcr1 from the comparing circuit CN to the gate terminals G of the transistor P2 and the transistor P3 is interrupted. In addition, in the light emission control unit HC2a, the gate terminal G of the transistor P9a of the semiconductor chip IC2a is electrically connected to the power supply VSS, and hence supply of the comparison result signal Vcr1a from the comparing circuit CNaa to the gate terminals G of the transistor P2a and the transistor P3a is performed. In addition, the gate terminals G of the transistor P2a and the transistor P3a connected to the comparing circuit CNaa are electrically connected to the gate terminals G of the transistor P2 and the transistor P3 via the wiring W3. Further, in this way, in the lighting device 40c, the light emission control unit HC2a of the semiconductor chip IC2a performs the light emission control and the light emission stop control of the light emitting element groups HS connected to the semiconductor chip IC2, and the light emission control and the light emission stop control of the light emitting element groups HSa connected to the semiconductor chip IC2a, i.e. performs the light emission control and the light emission stop control of the light emitting element groups HSB.

Therefore, even if there is a manufacturing variation between the comparing circuit CN of the semiconductor chip IC2 and the comparing circuit CNaa of the semiconductor chip IC2a, the lighting device 40c can prevent a variation in timing of causing as well as stopping light emission of the light emitting element groups HS and the light emitting element groups HSa.

Note that the light emission control and the light emission stop control of the lighting device including the semiconductor chip IC2 and the semiconductor chip IC2a are performed by one of the light emission control unit HC2 of the semiconductor chip IC2 and the light emission control unit HC2a of the semiconductor chip IC2a, as described above.

[Fourth Variation of Fourth Embodiment]

Figure 17:
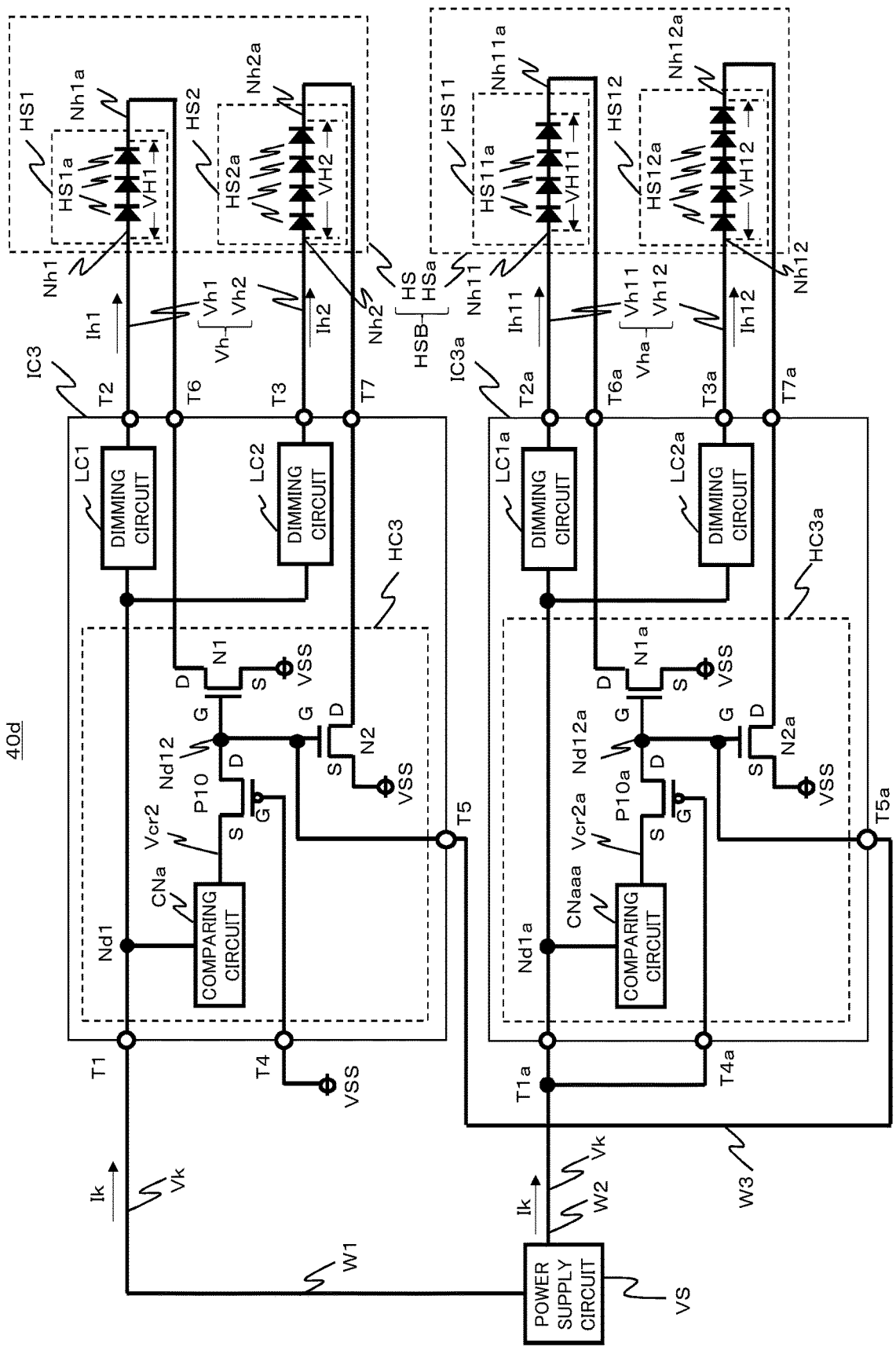
FIG. 17 is a diagram illustrating a lighting device 40d according to a fourth variation of the fourth embodiment of the present invention.

FIG. 17 is a diagram illustrating a lighting device 40d according to a fourth variation of the fourth embodiment of the present invention. The lighting device 40d includes the power supply circuit VS, the light emitting element groups HSB, a semiconductor chip IC3 as the first semiconductor chip, and a semiconductor chip IC3a as the second semiconductor chip. Note that in the lighting device 40d illustrated in FIG. 17, the same structure as in the lighting device 20 illustrated in FIG. 5, the lighting device 20a illustrated in FIG. 7, or the lighting device 40 illustrated in FIG. 13 is denoted by the same numeral or symbol, and description thereof is appropriately omitted.

The semiconductor chip IC3 has electrode pads for external electric connection, which include the electrode pad T1, the electrode pad T2, the electrode pad T3, the electrode pad T4, the electrode pad T5, the electrode pad T6, and the electrode pad T7. In addition, the semiconductor chip IC3 includes a light emission control unit HC3 as the first light emission control unit, the dimming circuit LC1, and the dimming circuit LC2 as the first dimming portion.

The light emission control unit HC3 includes the comparing circuit CNa as the first comparing circuit, the transistor N1, the transistor N2 as the first control switch, and a transistor P10 as the third control switch.

The comparing circuit CNa is connected to the electrode pad T1, i.e. is connected to the power supply circuit VS via the electrode pad T1. The comparing circuit CNa determines whether the drive voltage Vk is higher or lower than the light emission reference voltage VHa or a voltage based on the light emission reference voltage VHa, and outputs a result of the comparison as the comparison result signal Vcr2.

The dimming circuit LC1 has one terminal connected to the electrode pad T1, i.e. connected to the power supply circuit VS via the electrode pad T1, and the other terminal connected to the electrode pad T2.

The dimming circuit LC2 has one terminal connected to the electrode pad T1, i.e. connected to the power supply circuit VS via the electrode pad T1, and the other terminal connected to the electrode pad T3.

The transistor N1 is an NMOS transistor, which has the source terminal S connected to the power supply VSS, and the drain terminal D connected to the electrode pad T6.

The transistor N2 is an NMOS transistor, which has the source terminal S connected to the power supply VSS, and the drain terminal D connected to the electrode pad T7.

The transistor P10 is a PMOS transistor, which has the source terminal S connected to the comparing circuit CNa, and the drain terminal D connected to the gate terminals G of the transistor N1 and the transistor N2 and the electrode pad T5. In this way, the comparing circuit CNa is connected to the gate terminals G of the transistor N1 and the transistor N2 via the transistor P10, and the electric connection between the comparing circuit CNa and the gate terminals G of the transistor N1 and the transistor N2 is controlled by the transistor P10. In addition, the transistor P10 has the gate terminal G connected to the electrode pad T4, i.e. connected to the power supply VSS via the electrode pad T4. In this way, the transistor P10 is turned on when the drive voltage Vk is increased, and the signal level of the comparison result signal Vcr2, which is output from the comparing circuit CNa and is supplied to the source terminal S of the transistor P10, is increased so that the gate-source voltage of the transistor P10 becomes equal to or higher than a threshold voltage. Here, the connection node between the drain terminal D of the transistor P10 and the gate terminals G of the transistor N1 and the transistor N2 is referred to as a node Nd12.

The light emitting element groups HSB include the light emitting element groups HS and the light emitting element groups HSa. The light emitting element groups HS include the light emitting element group HS1, and the light emitting element group HS2 as the first light emitting element group. The light emitting element groups HSa include the light emitting element group HS11, and the light emitting element group HS12 as the second light emitting element group.

The light emitting element group HS1 has the node Nh1 connected to the electrode pad T2, i.e. connected to the other terminal of the dimming circuit LC1 via the electrode pad T2, and the node Nh1a connected to the electrode pad T6, i.e. connected to the drain terminal D of the transistor N1 via the electrode pad T6.

The light emitting element group HS2 has the node Nh2 connected to the electrode pad T3, i.e. connected to the other terminal of the dimming circuit LC2 via the electrode pad T3, and the node NH2a connected to the electrode pad T7, i.e. connected to the drain terminal D of the transistor N2 via the electrode pad T7.

The semiconductor chip IC3a has the same structure as the semiconductor chip IC3. However, in the semiconductor chip IC3a of FIG. 17, for convenience of description, in order to discriminate from the semiconductor chip IC3, the suffix "a" is added to the numeral or symbol of the structure in the semiconductor chip IC3. In addition, in the semiconductor chip IC3a, description of the structure described in the semiconductor chip IC3 is appropriately omitted. Note that the "comparing circuit CNa" is referred to as a "comparing circuit CNaaa" here, in order to discriminate from the "comparing circuit CNaa" illustrated in FIG. 13 or the like.

The semiconductor chip IC3a has electrode pads for external electric connection, which include the electrode pad T1a, the electrode pad T2a, the electrode pad T3a, the electrode pad T4a, the electrode pad T5a, an electrode pad T6a, and an electrode pad T7a. In addition, the semiconductor chip IC3a includes a light emission control unit HC3a as the second light emission control unit, the dimming circuit LC1a, and the dimming circuit LC2a as the second dimming portion. The light emission control unit HC3a includes the comparing circuit CNaaa as the second comparing circuit, a transistor N1a, a transistor N2a as the second control switch, and a transistor P10a.

The electrode pad T1a is connected to the power supply circuit VS via the wiring W2 as the second power supply wiring. In other words, the wiring W2 is connected to the power supply circuit VS and the semiconductor chip IC3a. The electrode pad T2a is connected to the node Nh11 of the light emitting element group HS11. The electrode pad T3a is connected to the node Nh12 of the light emitting element group HS12. Note that the wiring W2 has a smaller wiring resistance than the wiring W1, for example.

The light emitting element group HS11 has the node Nh11 connected to the electrode pad T2a, i.e. connected to the other terminal of the dimming circuit LC1a via the electrode pad T2a. The node Nh11a is connected to the electrode pad T6a, i.e. is connected to the drain terminal D of the transistor N1a via the electrode pad T6a.

The light emitting element group HS12 has the node Nh12 connected to the electrode pad T3a, i.e. connected to the other terminal of the dimming circuit LC2a via the electrode pad T3a. The node Nh12a is connected to the electrode pad T7a, i.e. is connected to the drain terminal D of the transistor N2a via the electrode pad T7a.

The electrode pad T4a is connected to the power supply circuit VS. In this way, in the transistor P10a, the gate terminal G is always connected to the power supply circuit VS. Therefore, the transistor P10a is not turned on even if the voltage level of the drive voltage Vk is increased, and is always in off state.

The electrode pad T5a is connected to the electrode pad T5 of the semiconductor chip IC3 via the wiring W3. In other words, the wiring W3 electrically connects the node Nd12 and the node Nd12a. In this way, the gate terminals G of the transistor N1 and the transistor N2 are electrically connected to the gate terminals G of the transistor N1a and the transistor N2a.

As described above, in the lighting device 40d, the gate terminal G of the transistor P10 of the semiconductor chip IC3 is electrically connected to the power supply VSS in the light emission control unit HC3, and hence supply of the comparison result signal Vcr2 from the comparing circuit CNa to the gate terminals G of the transistor N1 and the transistor N2 is performed. In addition, in the light emission control unit HC3a, the gate terminals G of the transistor N1a and the transistor N2a of the semiconductor chip IC3a are electrically connected to the power supply circuit VS, and hence supply of the comparison result signal Vcr2a from the comparing circuit CNaaa to the gate terminals G of the transistor N1a and the transistor N2a is interrupted. In addition, the gate terminals G of the transistor N1 and the transistor N2 connected to the comparing circuit CNa are electrically connected to the gate terminals G of the transistor N1a and the transistor N2a via the wiring W3. Further, in this way, in the lighting device 40d, the light emission control unit HC3 of the semiconductor chip IC3 performs the light emission control and the light emission stop control of the light emitting element groups HS connected to the semiconductor chip IC3, and the light emission control and the light emission stop control of the light emitting element groups HSa connected to the semiconductor chip IC3a, i.e. performs the light emission control and the light emission stop control of the light emitting element groups HSB.

Therefore, even if there is a manufacturing variation between the comparing circuit CNa of the semiconductor chip IC3 and the comparing circuit CNaaa of the semiconductor chip IC3a, the lighting device 40d can prevent a variation in timing of causing as well as stopping light emission of the light emitting element groups HS and the light emitting element groups HSa.

In addition, in the lighting device 40d, in a case where the wiring resistance of the wiring W1 for the semiconductor chip IC3 to receive power supply of the drive voltage Vk and the drive current Ik from the power supply circuit VS is larger than the wiring resistance of the wiring W2 for the semiconductor chip IC3a to receive power supply of the drive voltage Vk and the drive current Ik from the power supply circuit VS, the light emission control and the light emission stop control of the light emitting element groups HS connected to the semiconductor chip IC3, and the light emission control and the light emission stop control of the light emitting element groups HSa connected to the semiconductor chip IC3a are performed by the light emission control unit HC3 of the semiconductor chip IC3. Therefore, even if a potential increase in the drive voltage Vk obtained by the comparing circuit CNa of the semiconductor chip IC3 is delayed from a potential increase in the drive voltage Vk obtained by the comparing circuit CNaaa of the semiconductor chip IC3a, based on the wiring resistance difference between the wiring W1 and the wiring W2, it is possible to prevent a light emission timing variation between the light emitting element groups HS and the light emitting element groups HSa.

[Fifth Variation of Fourth Embodiment]

Figure 18:
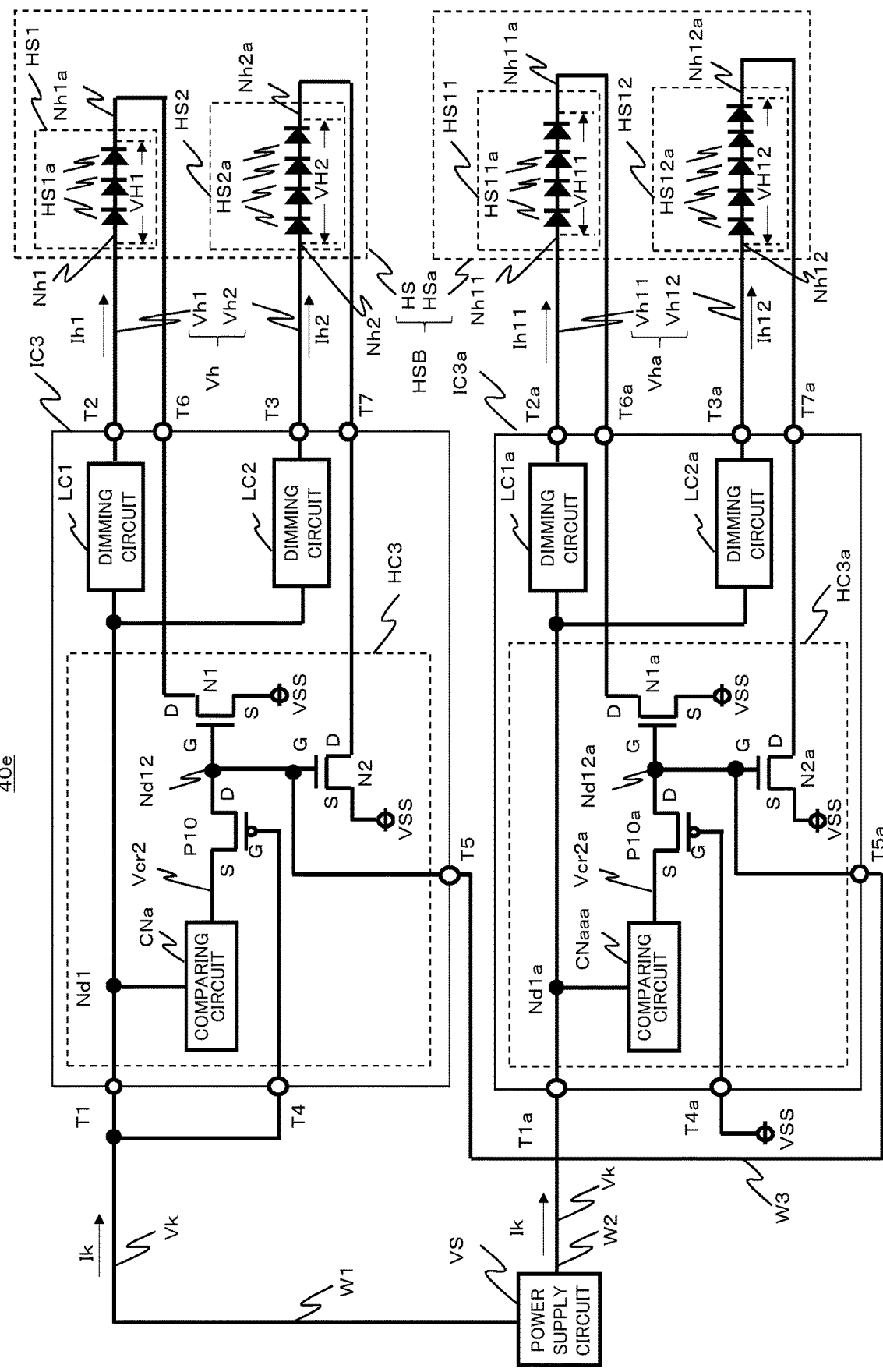
FIG. 18 is a diagram illustrating a lighting device 40e according to a fifth variation of the fourth embodiment of the present invention.

FIG. 18 is a diagram illustrating a lighting device 40e according to a fifth variation of the fourth embodiment of the present invention. The lighting device 40e includes the power supply circuit VS, the light emitting element groups HSB, the semiconductor chip IC3, and the semiconductor chip IC3a. Note that in the lighting device 40e illustrated in FIG. 18, the same structure as in the lighting device 40d illustrated in FIG. 17 is denoted by the same numeral or symbol, and description thereof is appropriately omitted.

The lighting device 40e is substantially different from the lighting device 40d in the connection destination of the electrode pad T4 of the semiconductor chip IC3 and in the connection destination of the electrode pad T4a of the semiconductor chip IC3a.

The electrode pad T4 is connected to the power supply circuit VS. In this way, in the transistor P10, the gate terminal G is always connected to the power supply circuit VS. Therefore, the transistor P10 is not turned on even if the voltage level of the drive voltage Vk is increased, and is always in off state.

In addition, the electrode pad T4a is connected to the power supply VSS. In this way, in the transistor P10a, the gate terminal G is connected to the power supply VSS. Therefore, the transistor P10a is turned on when the drive voltage Vk is increased so that the gate-source voltage of the transistor P10 becomes equal to or higher than a threshold voltage.

As described above, in the lighting device 40e, the gate terminal G of the transistor P10 of the semiconductor chip IC3 is electrically connected to the power supply circuit VS in the light emission control unit HC3, and hence supply of the comparison result signal Vcr2 from the comparing circuit CNa to the gate terminals G of the transistor N1 and the transistor N2 is interrupted. In addition, the gate terminal G of the transistor P10a of the semiconductor chip IC3a is electrically connected to the power supply VSS in the light emission control unit HC3a, and hence supply of the comparison result signal Vcr2a from the comparing circuit CNaaa to the gate terminals G of the transistor N1a and the transistor N2a is performed. In addition, the gate terminals G of the transistor N1a and the transistor N2a connected to the comparing circuit CNaaa are electrically connected to the gate terminals G of the transistor N1 and the transistor N2 via the wiring W3. Further, in this way, in the lighting device 40e, the light emission control unit HC3a of the semiconductor chip IC3a performs the light emission control and the light emission stop control of the light emitting element groups HS connected to the semiconductor chip IC3, and the light emission control and the light emission stop control of the light emitting element groups HSa connected to the semiconductor chip IC3a, i.e. performs the light emission control and the light emission stop control of the light emitting element groups HSB.

Therefore, even if there is a manufacturing variation between the comparing circuit CNa of the semiconductor chip IC3 and the comparing circuit CNaaa of the semiconductor chip IC3a, the lighting device 40e can prevent a variation in timing of causing as well as stopping light emission of the light emitting element groups HS and the light emitting element groups HSa.

Note that as described above, the light emission control and the light emission stop control of the lighting device including the semiconductor chip IC3 and the semiconductor chip IC3a are performed by one of the light emission control unit HC3 of the semiconductor chip IC3 and the light emission control unit HC3a of the semiconductor chip IC3a.

[Sixth Variation of Fourth Embodiment]

Figure 19:
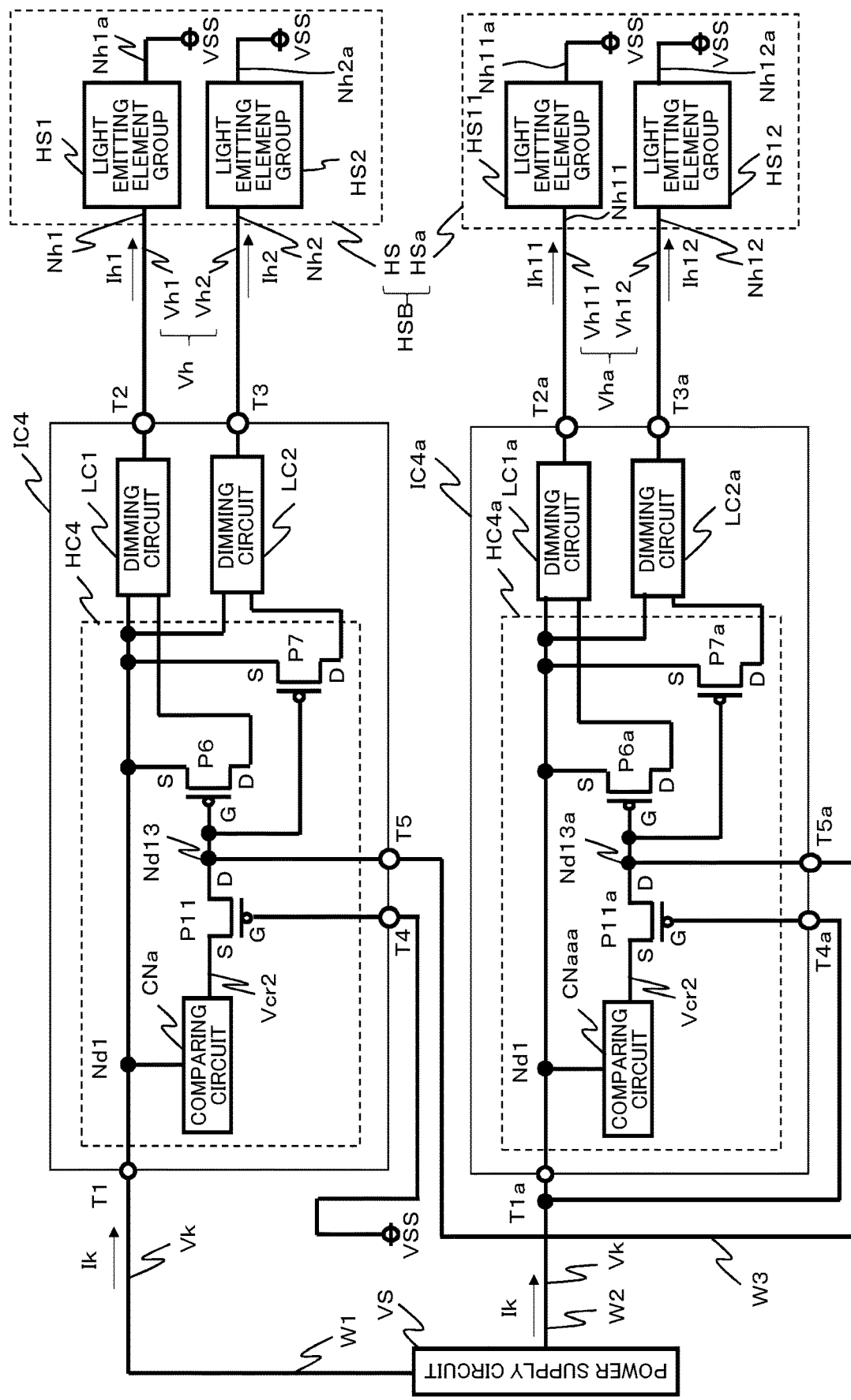
FIG. 19 is a diagram illustrating a lighting device 40f according to a sixth variation of the fourth embodiment of the present invention.

FIG. 19 is a diagram illustrating a lighting device 40f according to a sixth variation of the fourth embodiment of the present invention. The lighting device 40f includes the power supply circuit VS, the light emitting element groups HSB, a semiconductor chip IC4 as the first semiconductor chip, and a semiconductor chip IC4a as the second semiconductor chip. Note that in the lighting device 40f illustrated in FIG. 19, the same structure as in the lighting device 30 illustrated in FIG. 8, the lighting device 30a illustrated in FIG. 10, or the lighting device 40 illustrated in FIG. 13 is denoted by the same numeral or symbol, and description thereof is appropriately omitted.

The semiconductor chip IC4 has electrode pads for external electric connection, which include the electrode pad T1, the electrode pad T2, the electrode pad T3, the electrode pad T4, and the electrode pad T5. In addition, the semiconductor chip IC4 includes a light emission control unit HC4 as the first light emission control unit, the dimming circuit LC1, and the dimming circuit LC2 as the first dimming portion.

The light emission control unit HC4 includes the comparing circuit CNa as the first comparing circuit, the transistor P6, the transistor P7 as the first control switch, and a transistor P11 as the third control switch.

The comparing circuit CNa is connected to the electrode pad T1, i.e. is connected to the power supply circuit VS via the electrode pad T1. The comparing circuit CNa determines whether the drive voltage Vk is higher or lower than a voltage based on the light emission reference voltage VH, and outputs a result of the comparison as the comparison result signal Vcr2.

The dimming circuit LC1 has one terminal connected to the electrode pad T1, i.e. connected to the power supply circuit VS via the electrode pad T1, and the other terminal connected to the electrode pad T2.

The dimming circuit LC2 has one terminal connected to the electrode pad T1, i.e. connected to the power supply circuit VS via the electrode pad T1, and the other terminal connected to the electrode pad T3.

The transistor P6 is a PMOS transistor, which has the source terminal S connected to the power supply circuit VS, and the drain terminal D connected to the dimming circuit LC1.

The transistor P7 is a PMOS transistor, which has the source terminal S connected to the power supply circuit VS, and the drain terminal D connected to the dimming circuit LC2.

The transistor P11 is a PMOS transistor, which has the source terminal S connected to the comparing circuit CNa, and the drain terminal D connected to the gate terminals G of the transistor P6 and the transistor P7 and the electrode pad T5. In this way, the comparing circuit CNa is connected to the gate terminals G of the transistor P6 and the transistor P7 via the transistor P11. The electric connection between the comparing circuit CNa and the gate terminals G of the transistor P6 and the transistor P7 is controlled by the transistor P11. In addition, transistor P11 has the gate terminal G connected to the electrode pad T4, i.e. connected to the power supply VSS via the electrode pad T4. In this way, the transistor P11 is turned on when the drive voltage Vk is increased, and the signal level of the comparison result signal Vcr2, which is output from the comparing circuit CNa and is supplied to the source terminal S of the transistor P11, increases so that the gate-source voltage of the transistor P11 becomes equal to or higher than a threshold voltage. Here, the connection node between the drain terminal D of the transistor P11 and the gate terminals G of the transistor P6 and the transistor P7 is referred to as a node Nd13.

The semiconductor chip IC4a has the same structure as the semiconductor chip IC4. However, in the semiconductor chip IC4a of FIG. 19, for convenience of description, in order to discriminate from the semiconductor chip IC4, the suffix "a" is added to the numeral or symbol of the structure in the semiconductor chip IC4. In addition, in the semiconductor chip IC4a, description of the structure described in the semiconductor chip IC4 is appropriately omitted. Note that the "comparing circuit CNa" is referred to as the "comparing circuit CNaaa" here, in order to discriminate from the "comparing circuit CNaa" illustrated in FIG. 13 or the like.

The semiconductor chip IC4a has electrode pads for external electric connection, which include the electrode pad T1a, the electrode pad T2a, the electrode pad T3a, the electrode pad T4a, and the electrode pad T5a. In addition, the semiconductor chip IC4a includes a light emission control unit HC4a as the second light emission control unit, the dimming circuit LC1a, and the dimming circuit LC2a as the second dimming portion. The light emission control unit HC4a includes the comparing circuit CNaaa as the second comparing circuit, a transistor P6a, a transistor P7a as the second control switch, and a transistor P1a.

The dimming circuit LC11 has one terminal connected to the electrode pad T1a, i.e. connected to the power supply circuit VS via the electrode pad T1a, and the other terminal connected to the electrode pad T2a.

The dimming circuit LC12 has one terminal connected to the electrode pad T1a, i.e. connected to the power supply circuit VS via the electrode pad T1a, and the other terminal connected to the electrode pad T3a.

The electrode pad T4a is connected to the power supply circuit VS. In this way, in the transistor P11a, the gate terminal G is always connected to the power supply circuit VS. Therefore, the transistor P11a is not turned on even if the voltage level of the drive voltage Vk is increased, and is always in off state.

The electrode pad T5a is connected to the electrode pad T5 of the semiconductor chip IC4 via the wiring W3. In other words, the wiring W3 electrically connects the node Nd13 and the node Nd13a. In this way, the gate terminals G of the transistor P6 and the transistor P7 are electrically connected to the gate terminals G of the transistor P6a and transistor P7a.

As described above, in the lighting device 40f, the gate terminal G of the transistor P11 of the semiconductor chip IC4 is electrically connected to the power supply VSS in the light emission control unit HC4, and hence supply of the comparison result signal Vcr2 from the comparing circuit CNa to the gate terminals G of the transistor P6 and the transistor P7 is performed. In addition, in the light emission control unit HC4a, the gate terminals G of the transistor P6a and the transistor P7a are electrically connected to the power supply circuit VS in the semiconductor chip IC4a, and hence supply of the comparison result signal Vcr2a from the comparing circuit CNaaa to the gate terminals G of the transistor P6a and transistor P7a is interrupted. In addition, the gate terminals G of the transistor P6 and the transistor P7 connected to the comparing circuit CNa are electrically connected to the gate terminals G of the transistor P6a and transistor P7a via the wiring W3. Further, in this way, in the lighting device 40f, the light emission control unit HC4 of the semiconductor chip IC4 performs the light emission control and the light emission stop control of the light emitting element groups HS connected to the semiconductor chip IC4, and the light emission control and the light emission stop control of the light emitting element groups HSa connected to the semiconductor chip IC4a, i.e. performs the light emission control and the light emission stop control of the light emitting element groups HSB.

Therefore, even if there is a manufacturing variation between the comparing circuit CNa of the semiconductor chip IC4 and the comparing circuit CNaaa of the semiconductor chip IC4a, the lighting device 40f can prevent a variation in timing of causing as well as stopping light emission of the light emitting element groups HS and the light emitting element groups HSa.

In addition, in the lighting device 40f, in a case where a wiring resistance of the wiring W1 for the semiconductor chip IC4 to receive power supply of the drive voltage Vk and the drive current Ik from the power supply circuit VS is larger than a wiring resistance of the wiring W2 for the semiconductor chip IC4a to receive power supply of the drive voltage Vk and the drive current Ik from the power supply circuit VS, the light emission control and the light emission stop control of the light emitting element groups HS connected to the semiconductor chip IC4, and the light emission control and the light emission stop control of the light emitting element groups HSa connected to the semiconductor chip IC4a are performed by the light emission control unit HC4 of the semiconductor chip IC4. Therefore, even if a potential increase in the drive voltage Vk obtained by the comparing circuit CNa of the semiconductor chip IC4 is delayed from a potential increase in the drive voltage Vk obtained by the comparing circuit CNaaa of the semiconductor chip IC4a, based on the wiring resistance difference between the wiring W1 and the wiring W2, it is possible to prevent a light emission timing variation between the light emitting element groups HS and the light emitting element groups HSa.

[Seventh Variation of Fourth Embodiment]

Figure 20:
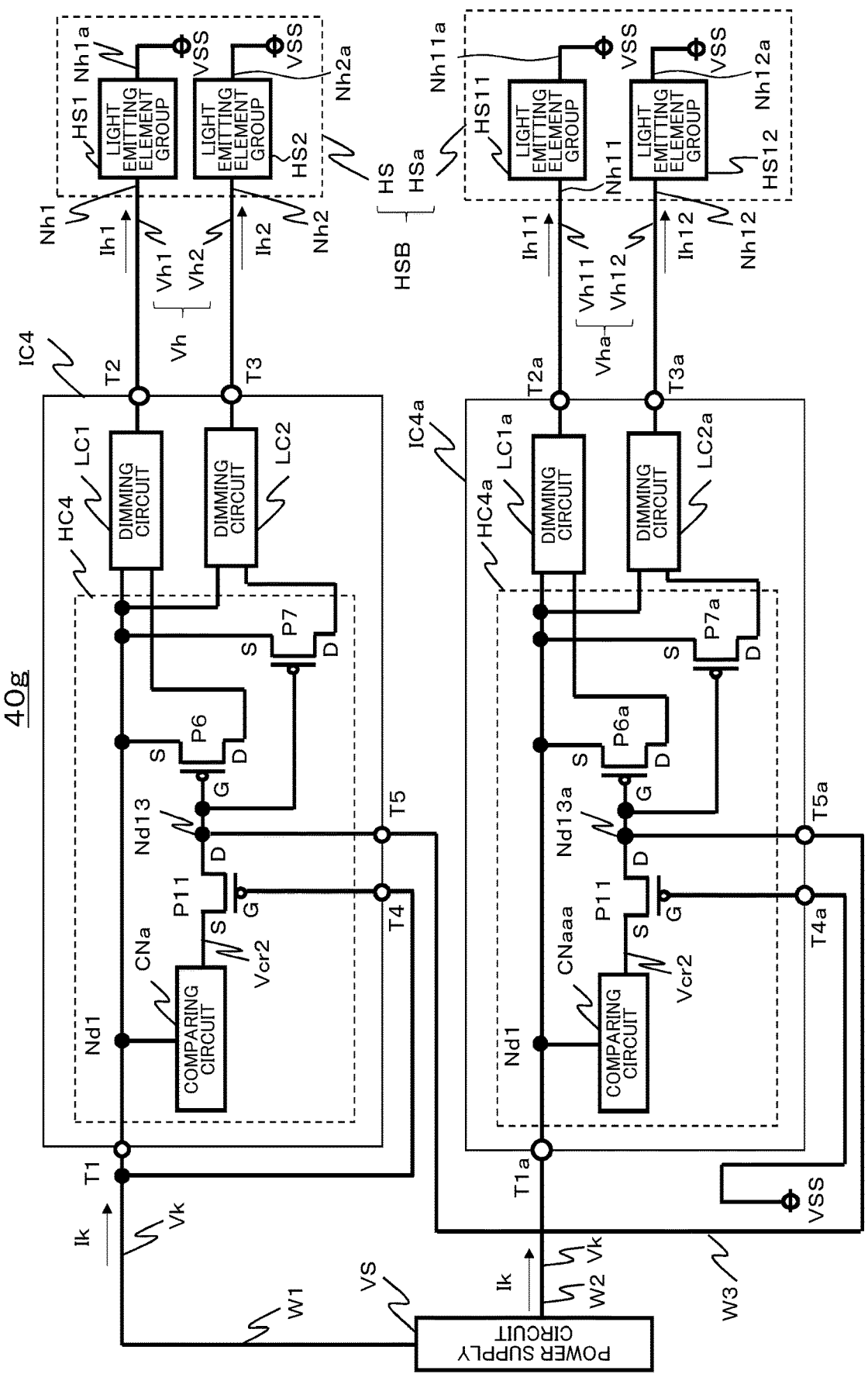
FIG. 20 is a diagram illustrating a lighting device 40g according to a seventh variation of the fourth embodiment of the present invention.

FIG. 20 is a diagram illustrating a lighting device 40g according to a seventh variation of the fourth embodiment of the present invention. The lighting device 40g includes the power supply circuit VS, the light emitting element groups HSB, the semiconductor chip IC4, and the semiconductor chip IC4a. Note that in the lighting device 40g illustrated in FIG. 20, the same structure as in the lighting device 40f illustrated in FIG. 19 is denoted by the same numeral or symbol, and description thereof is appropriately omitted.

The lighting device 40g is substantially different from the lighting device 40f in the connection destination of the electrode pad T4 of the semiconductor chip IC4 and in the connection destination of the electrode pad T4a of the semiconductor chip IC4a.

The electrode pad T4 is connected to the power supply circuit VS. In this way, in the transistor P11, the gate terminal G is always connected to the power supply circuit VS. Therefore, transistor P11 is not turned on even if the voltage level of the drive voltage Vk is increased, and is always in off state.

In addition, the electrode pad T4a is connected to the power supply VSS. In this way, in the transistor P11a, the gate terminal G is connected to the power supply VSS. Therefore, the transistor P11a is turned on when the drive voltage Vk is increased so that the gate-source voltage of the transistor P11 becomes equal to or higher than a threshold voltage.

As described above, in the lighting device 40g, the gate terminal G of the transistor P11 of the semiconductor chip IC4 is electrically connected to the power supply circuit VS in the light emission control unit HC4, and hence supply of the comparison result signal Vcr2 from the comparing circuit CNa to the gate terminals G of the transistor P6 and the transistor P7 is interrupted. In addition, in the light emission control unit HC4a, the gate terminal G of the transistor P11a of the semiconductor chip IC4a is electrically connected to the power supply VSS, and hence supply of the comparison result signal Vcr2a from the comparing circuit CNaaa to the gate terminals G of the transistor P6a and transistor P7a is performed. In addition, the gate terminals G of the transistor P6a and transistor P7a connected to the comparing circuit CNaaa are electrically connected to the gate terminals G of the transistor P6 and the transistor P7 via the wiring W3. Further, in this way, in the lighting device 40g, the light emission control unit HC4a of the semiconductor chip IC4a performs the light emission control and the light emission stop control of the light emitting element groups HS connected to the semiconductor chip IC4, and the light emission control and the light emission stop control of the light emitting element groups HSa connected to the semiconductor chip IC4a, i.e. performs the light emission control and the light emission stop control of the light emitting element groups HSB.

Therefore, even if there is a manufacturing variation between the comparing circuit CNa of the semiconductor chip IC4 and the comparing circuit CNaaa of the semiconductor chip IC4a, the lighting device 40g can prevent a variation in timing of causing as well as stopping light emission of the light emitting element groups HS and the light emitting element groups HSa.

Note that as described above, in the lighting device including the semiconductor chip IC4 and the semiconductor chip IC4a, the light emission control and the light emission stop control are performed by one of the light emission control unit HC4 of the semiconductor chip IC4 and the light emission control unit HC4a of the semiconductor chip IC4a.

[Eighth Variation of Fourth Embodiment]

Figure 21:
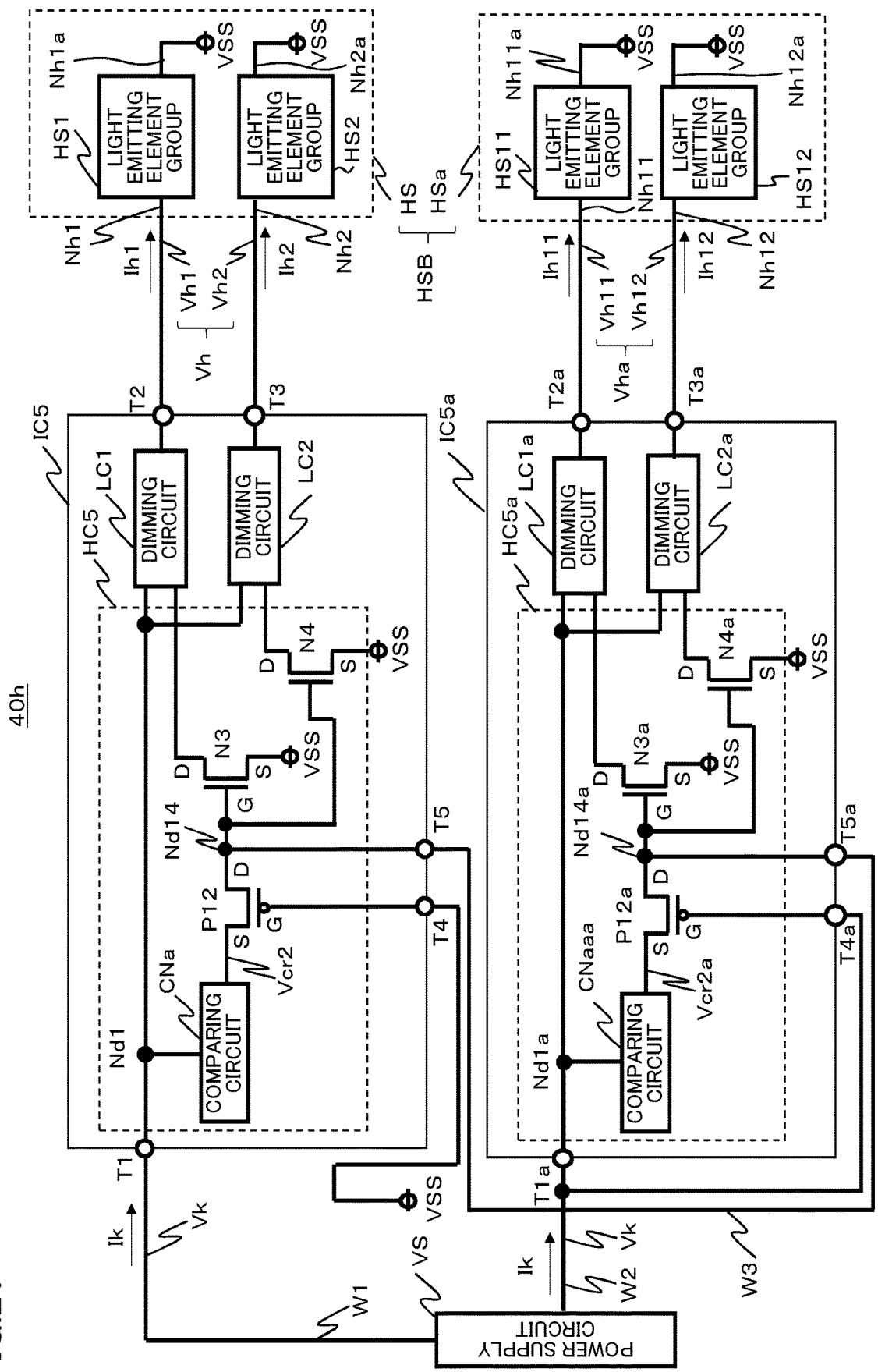
FIG. 21 is a diagram illustrating a lighting device 40h according to an eighth variation of the fourth embodiment of the present invention.

FIG. 21 is a diagram illustrating a lighting device 40h according to an eighth variation of the fourth embodiment of the present invention. The lighting device 40h includes the power supply circuit VS, the light emitting element groups HSB, a semiconductor chip IC5 as the first semiconductor chip, and a semiconductor chip IC5a as the second semiconductor chip. Note that in the lighting device 40h illustrated in FIG. 21, the same structure as in the lighting device 30b illustrated in FIG. 11 or the lighting device 40 illustrated in FIG. 13 is denoted by the same numeral or symbol, and description thereof is appropriately omitted.

The semiconductor chip IC5 has electrode pads for external electric connection, which include the electrode pad T1, the electrode pad T2, the electrode pad T3, the electrode pad T4, and the electrode pad T5. In addition, the semiconductor chip IC5 includes a light emission control unit HC5 as the first light emission control unit, the dimming circuit LC1, and the dimming circuit LC2 as the first dimming portion.

The light emission control unit HC5 includes the comparing circuit CNa as the first comparing circuit, the transistor N3, the transistor N4 as the first control switch, and a transistor P12 as the third control switch.

The comparing circuit CNa is connected to the electrode pad T1, i.e. is connected to the power supply circuit VS via the electrode pad T1. The comparing circuit CNa determines whether the drive voltage Vk is higher or lower than the light emission reference voltage VH or a voltage based on the light emission reference voltage VH, and outputs a result of the comparison as the comparison result signal Vcr2.

The dimming circuit LC1 has one terminal connected to the electrode pad T1, i.e. connected to the power supply circuit VS via the electrode pad T1, and the other terminal connected to the electrode pad T2.

The dimming circuit LC2 has one terminal connected to the electrode pad T1, i.e. connected to the power supply circuit VS via the electrode pad T1, and the other terminal connected to the electrode pad T3.

The transistor N3 is an NMOS transistor, which has the source terminal S connected to the power supply circuit VS, and the drain terminal D connected to the dimming circuit LC1.

The transistor N4 is an NMOS transistor, which has the source terminal S connected to the power supply circuit VS, and the drain terminal D connected to the dimming circuit LC2.

The transistor P12 is a PMOS transistor, which has the source terminal S connected to the comparing circuit CNa, and the drain terminal D connected to the gate terminals G of the transistor N3 and the transistor N4 and the electrode pad T5. In this way, the comparing circuit CNa is connected to the gate terminals G of the transistor N3 and the transistor N4 via the transistor P12, and the electric connection between the comparing circuit CNa and the gate terminals G of the transistor N3 and the transistor N4 is controlled by the transistor P12. In addition, the transistor P12 has the gate terminal G connected to the electrode pad T4, i.e. connected to the power supply VSS via the electrode pad T4. In this way, the transistor P12 is turned on when the drive voltage Vk is increased, and the signal level of the comparison result signal Vcr2, which is output from the comparing circuit CNa and is supplied to the source terminal S of the transistor P12, is increased so that the gate-source voltage of the transistor P12 becomes equal to or higher than a threshold voltage.

Here, the drain terminal D of the transistor P12 and the connection node between the gate terminals G of the transistor N3 and the transistor N4 is referred to as a node Nd14.

The semiconductor chip IC5a has the same structure as the semiconductor chip IC5. However, in the semiconductor chip IC5a of FIG. 21, for convenience of description, in order to discriminate from the semiconductor chip IC5, the suffix "a" is added to the numeral or symbol of the structure in the semiconductor chip IC5. In addition, in the semiconductor chip IC5a, description of the structure described in the semiconductor chip IC5 is appropriately omitted. Note that the "comparing circuit CNa" is referred to as the "comparing circuit CNaaa" here, in order to discriminate from the "comparing circuit CNaa" illustrated in FIG. 13 or the like.

The semiconductor chip IC5a has electrode pads for external electric connection, which include the electrode pad T1a, the electrode pad T2a, the electrode pad T3a, the electrode pad T4a, and the electrode pad T5a. In addition, the semiconductor chip IC5a includes a light emission control unit HC5a as the second light emission control unit, the dimming circuit LC1a, and the dimming circuit LC2a as the second dimming portion. The light emission control unit HC5a includes a comparing circuit CNaaa as the second comparing circuit, a transistor N3a, a transistor N4a as the second control switch, and a transistor P12a.

The dimming circuit LC11 has one terminal connected to the electrode pad T1a, i.e. connected to the power supply circuit VS via the electrode pad T1a, and the other terminal connected to the electrode pad T2a.

The dimming circuit LC12 has one terminal connected to the electrode pad T1a, i.e. connected to the power supply circuit VS via the electrode pad T1a, and the other terminal connected to the electrode pad T3a.

The electrode pad T4a is connected to the power supply circuit VS. In this way, in the transistor P12a, the gate terminal G is always connected to the power supply circuit VS. Therefore, the transistor P12a is not turned on even if the voltage level of the drive voltage Vk is increased, and is always in off state.

The electrode pad T5a is connected to the electrode pad T5 of the semiconductor chip IC5 via the wiring W3. In other words, the wiring W3 electrically connects the node Nd14 and a node Nd14a. In this way, the gate terminals G of the transistor N3 and the transistor N4 are electrically connected to the gate terminals G of the transistor N3a and the transistor N4a.

As described above, in the lighting device 40h, the gate terminal G of the transistor P12 of the semiconductor chip IC5 is electrically connected to the power supply VSS in the light emission control unit HC5, and hence supply of the comparison result signal Vcr2 from the comparing circuit CNa to the gate terminals G of the transistor N3 and the transistor N4 is performed. In addition, in the light emission control unit HC5a, the gate terminals G of the transistor N3a and the transistor N4a of the semiconductor chip IC5a are electrically connected to the power supply circuit VS, and hence supply of the comparison result signal Vcr2a from the comparing circuit CNaaa to the gate terminals G of the transistor N3a and the transistor N4a is interrupted. In addition, the gate terminals G of the transistor N3 and the transistor N4 connected to the comparing circuit CNa are electrically connected to the gate terminals G of the transistor N3a and the transistor N4a via the wiring W3. Further, in this way, in the lighting device 40h, the light emission control unit HC5 of the semiconductor chip IC5 performs the light emission control and the light emission stop control of the light emitting element groups HS connected to the semiconductor chip IC5 and the light emission control and the light emission stop control of the light emitting element groups HSa connected to the semiconductor chip IC5a, i.e. performs the light emission control and the light emission stop control of the light emitting element groups HSB.

Therefore, even if there is a manufacturing variation between the comparing circuit CNa of the semiconductor chip IC5 and the comparing circuit CNaaa of the semiconductor chip IC5a, the lighting device 40h can prevent a variation in timing of causing as well as stopping light emission of the light emitting element groups HS and the light emitting element groups HSa.

In addition, as to the lighting device 40h, in the case where the wiring resistance of the wiring W1 for the semiconductor chip IC5 to receive power supply of the drive voltage Vk and the drive current Ik from the power supply circuit VS is larger than the wiring resistance of the wiring W2 for the semiconductor chip IC5a to receive power supply of the drive voltage Vk and the drive current Ik from the power supply circuit VS, the light emission control unit HC5 of the semiconductor chip IC5 performs the light emission control and the light emission stop control of the light emitting element groups HS connected to the semiconductor chip IC5, and performs the light emission control and the light emission stop control of the light emitting element groups HSa connected to the semiconductor chip IC5a. Therefore, even if a potential increase in the drive voltage Vk obtained by the comparing circuit CNa of the semiconductor chip IC5 is delayed from a potential increase in the drive voltage Vk obtained by the comparing circuit CNaaa of the semiconductor chip IC5a, based on the wiring resistance difference between the wiring W1 and the wiring W2, it is possible to prevent a light emission timing variation between the light emitting element groups HS and the light emitting element groups HSa.

[Ninth Variation of Fourth Embodiment]

Figure 22:
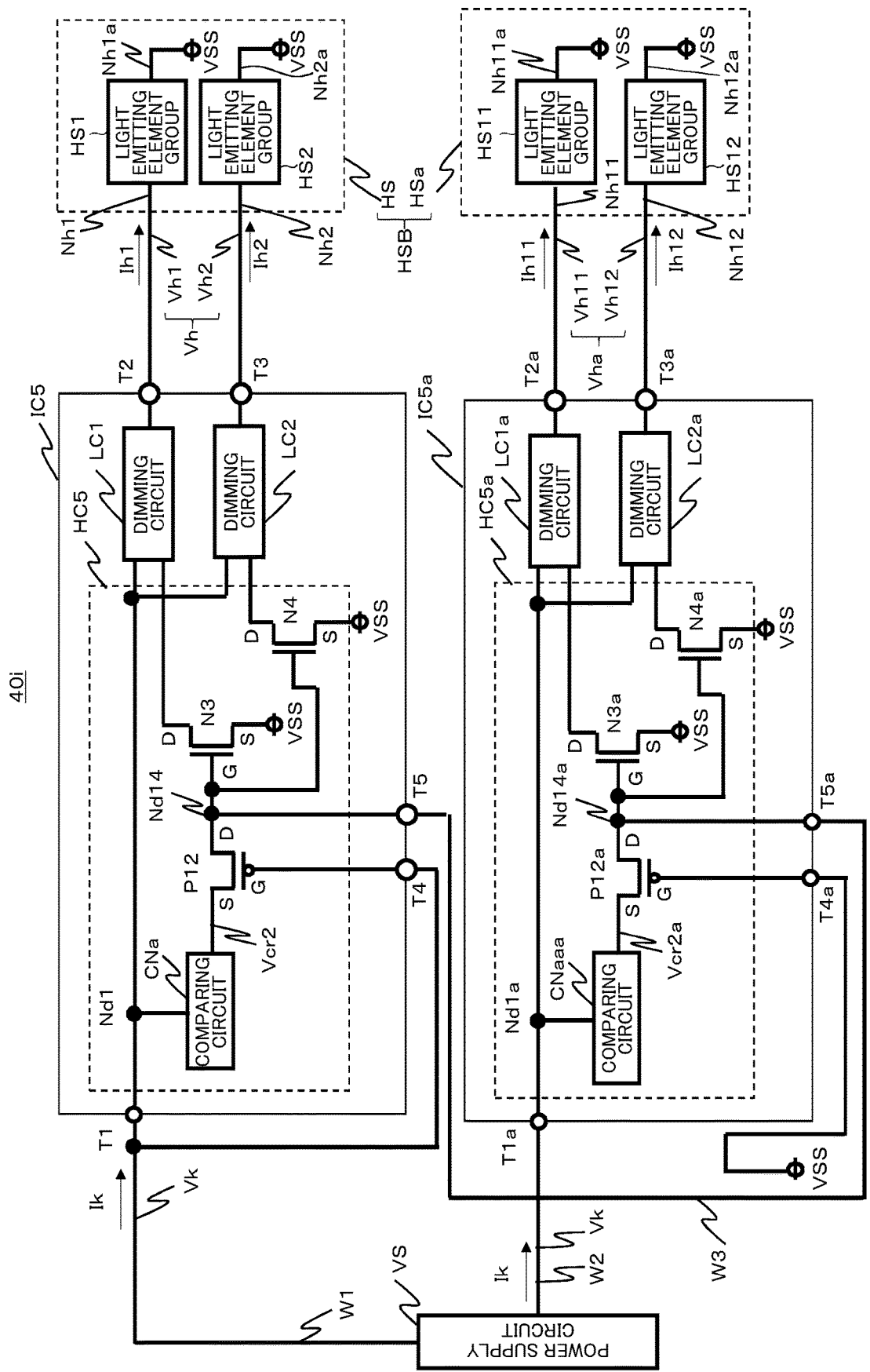
FIG. 22 is a diagram illustrating a lighting device 40i according to a ninth variation of the fourth embodiment of the present invention.

FIG. 22 is a diagram illustrating a lighting device 40i according to a ninth variation of the fourth embodiment of the present invention. The lighting device 40i includes the power supply circuit VS, the light emitting element groups HSB, the semiconductor chip IC5, and the semiconductor chip IC5a. Note that in the lighting device 40i illustrated in FIG. 22, the same structure as in the lighting device 40h illustrated in FIG. 21 is denoted by the same numeral or symbol, and description thereof is appropriately omitted.

The lighting device 40i is substantially different from the lighting device 40h in the connection destination of the electrode pad T4 of the semiconductor chip IC5 and in the connection destination of the electrode pad T4a of the semiconductor chip IC5a.

The electrode pad T4 is connected to the power supply circuit VS. In this way, in the transistor P12, the gate terminal G is always connected to the power supply circuit VS. Therefore, the transistor P12 is not turned on even if the voltage level of the drive voltage Vk is increased, and is always in off state.

In addition, the electrode pad T4a is connected to the power supply VSS. In this way, in the transistor P12a, the gate terminal G is connected to the power supply VSS. Therefore, the transistor P12a is turned on when the drive voltage Vk is increased so that the gate-source voltage of the transistor P12 becomes equal to or higher than a threshold voltage.

As described above, in the lighting device 40i, the gate terminal G of the transistor P12 of the semiconductor chip IC5 is electrically connected to the power supply circuit VS in the light emission control unit HC5, and hence supply of the comparison result signal Vcr2 from the comparing circuit CNa to the gate terminals G of the transistor N3 and the transistor N4 is interrupted. In addition, in the light emission control unit HC5a, the gate terminal G of the transistor P12a of the semiconductor chip IC5a is electrically connected to the power supply VSS, and hence supply of the comparison result signal Vcr2a from the comparing circuit CNaaa to the gate terminals G of the transistor N3a and the transistor N4a is performed. In addition, the gate terminals G of the transistor N3a and the transistor N4a connected to the comparing circuit CNaaa are electrically connected to the gate terminals G of the transistor N3 and the transistor N4 via the wiring W3. Further, in this way, in the lighting device 40i, the light emission control unit HC5a of the semiconductor chip IC5a performs the light emission control and the light emission stop control of the light emitting element groups HS connected to the semiconductor chip IC5, and the light emission control and the light emission stop control of the light emitting element groups HSa connected to the semiconductor chip IC5a, i.e. performs the light emission control and the light emission stop control of the light emitting element groups HSB.

Therefore, even if there is a manufacturing variation between the comparing circuit CNa of the semiconductor chip IC5 and the comparing circuit CNaaa of the semiconductor chip IC5a, the lighting device 40i can prevent a variation in timing of causing as well as stopping light emission of the light emitting element groups HS and the light emitting element groups HSa.

Note that the light emission control and the light emission stop control of the lighting device including the semiconductor chip IC5 and the semiconductor chip IC5a are performed by either one of the light emission control unit HC5 of the semiconductor chip IC5 and the light emission control unit HC5a of the semiconductor chip IC5a, as described above.

[Tenth Variation of Fourth Embodiment]

Figure 23:
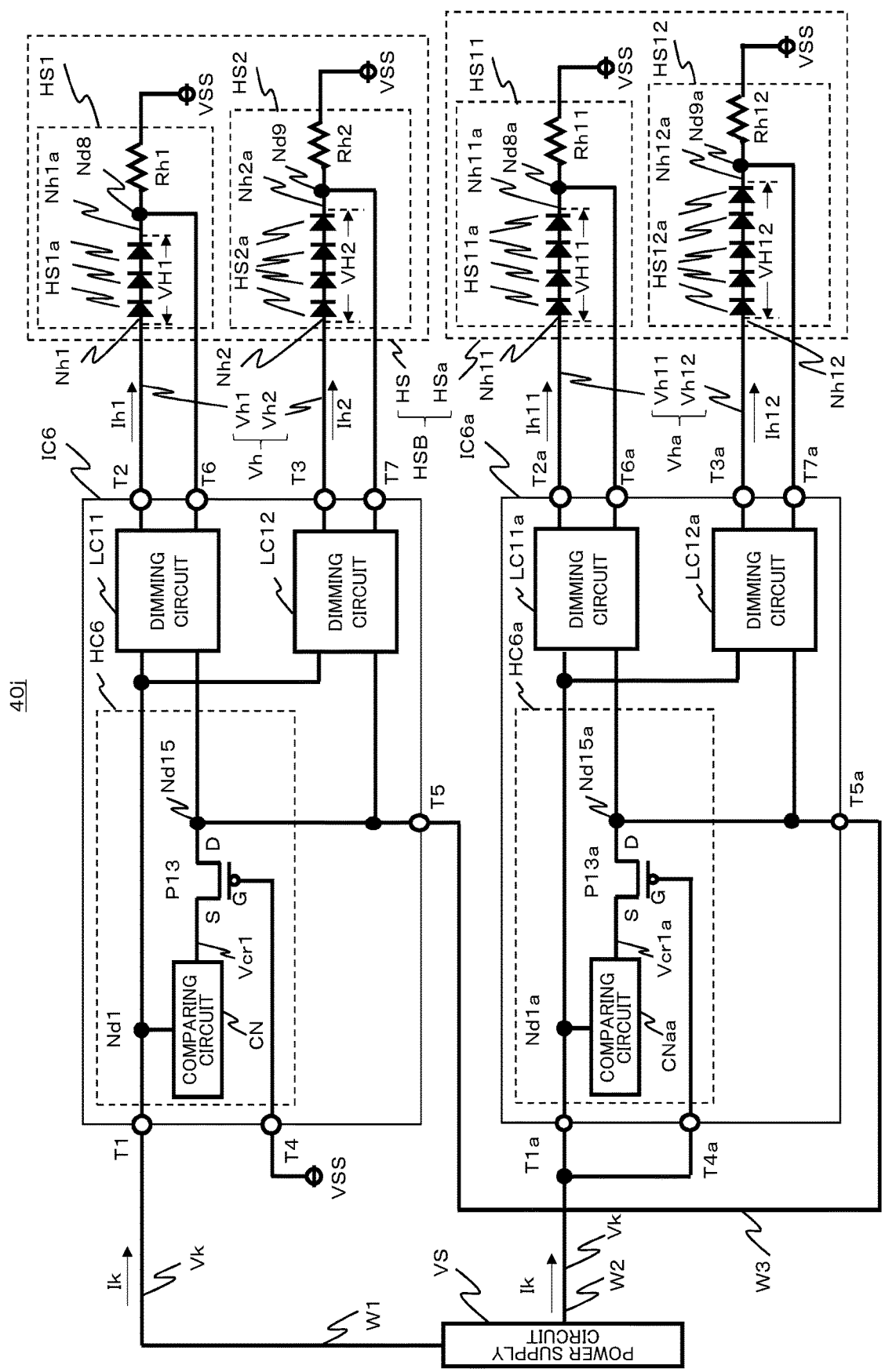
FIG. 23 is a diagram illustrating a lighting device 40j according to a tenth variation of the fourth embodiment of the present invention.

FIG. 23 is a diagram illustrating a lighting device 40j according to a tenth variation of the fourth embodiment of the present invention. The lighting device 40j includes the power supply circuit VS, the light emitting element groups HSB, a semiconductor chip IC6 as the first semiconductor chip, and a semiconductor chip IC6a as the second semiconductor chip. Note that in the lighting device 40j illustrated in FIG. 23, the same structure as in the lighting device 30c illustrated in FIG. 12, or the lighting device 40 illustrated in FIG. 13 is denoted by the same numeral or symbol, and description thereof is appropriately omitted.

The semiconductor chip IC6 has electrode pads for external electric connection, which include the electrode pad T1, the electrode pad T2, the electrode pad T3, the electrode pad T4, the electrode pad T5, the electrode pad T6, and the electrode pad T7. In addition, the semiconductor chip IC4 includes the light emission control unit HC4 as the first light emission control unit, the dimming circuit LC11, and the dimming circuit LC12 as the first dimming portion.

A light emission control unit HC6 includes the comparing circuit CN as the first comparing circuit, and a transistor P13 as the third control switch.

The comparing circuit CN is connected to the electrode pad T1, i.e. is connected to the power supply circuit VS via the electrode pad T1. The comparing circuit CN determines whether the drive voltage Vk is higher or lower than the light emission reference voltage VH or a voltage based on the light emission reference voltage VH, and outputs a result of the comparison as the comparison result signal Vcr1.

The dimming circuit LC11 has one terminal connected to the electrode pad T1, i.e. connected to the power supply circuit VS via the electrode pad T1, and the other terminal connected to the electrode pad T2, i.e. connected to one terminal of the light emitting element group HS1 via the electrode pad T2, and connected to the electrode pad T6, i.e. connected to the node Nd8 of the light emitting element group HS1 via the electrode pad T6. Note that the dimming circuit LC11 includes the driving circuit KD1 illustrated in FIG. 12.

The dimming circuit LC12 has one terminal connected to the electrode pad T1, i.e. connected to the power supply circuit VS via the electrode pad T1, and the other terminal connected to the electrode pad T3, i.e. connected to the one terminal of the light emitting element group HS2 via the electrode pad T3, and connected to the electrode pad T7, i.e. connected to the node Nd9 of the light emitting element group HS2 via the electrode pad T7. Note that the dimming circuit LC12 includes the driving circuit KD2 illustrated in FIG. 12.

The transistor P13 is a PMOS transistor, which has the source terminal S connected to the comparing circuit CN, and the drain terminal D connected to the driving circuit KD1 of the dimming circuit LC11 and the driving circuit KD2 of the dimming circuit 12. In this way, the comparing circuit CN is connected to the driving circuit KD1 via the transistor P13, while the comparing circuit CN is connected to the driving circuit KD2 via the transistor P13. The electric connection between the comparing circuit CN and the driving circuit KD1, and the electric connection between the comparing circuit CN and the driving circuit KD2 are controlled by the transistor P13. In addition, the transistor P13 has the gate terminal G connected to the electrode pad T4, i.e. connected to the power supply VSS via the electrode pad T4. In this way, the transistor P13 is turned on when the drive voltage Vk is increased, and the signal level of the comparison result signal Vcr1, which is output from the comparing circuit CN and is supplied to the source terminal S of the transistor P13, is increased so that the gate-source voltage of the transistor P13 becomes equal to or higher than a threshold voltage. Here, the connection node among the drain terminal D of the transistor P13, the driving circuit KD1, and the driving circuit KD2 is referred to as a node Nd15.

The semiconductor chip IC6a has the same structure as the semiconductor chip IC6. However, in the semiconductor chip IC6a of FIG. 23, for convenience of description, in order to discriminate from the semiconductor chip IC6, the suffix "a" is added to the numeral or symbol of the structure in the semiconductor chip IC6. In addition, in the semiconductor chip IC6a, description of the structure described in the semiconductor chip IC6 is appropriately omitted. Note that the "comparing circuit CN" is referred to as the "comparing circuit CNaa" here, in order to discriminate from the "comparing circuit CNa" illustrated in FIG. 13 or the like.

The semiconductor chip IC6a has electrode pads for external electric connection, which include the electrode pad T1a, the electrode pad T2a, the electrode pad T3a, the electrode pad T4a, the electrode pad T5a, the electrode pad T6a, and the electrode pad T7a. In addition, the semiconductor chip IC6a includes a light emission control unit HC6a as the second light emission control unit, a dimming circuit LC11a, and a dimming circuit LC12a as the second dimming portion. The light emission control unit HC6a includes the comparing circuit CNaa as the second comparing circuit, and a transistor P13a.

The dimming circuit LC11a has one terminal connected to the electrode pad T1a, i.e. connected to the power supply circuit VS via the electrode pad T1a, and the other terminal connected to the electrode pad T2a, i.e. connected to the one terminal of the light emitting element group HS11 via the electrode pad T2a, and connected to the electrode pad T6a, i.e. connected to a node Nd8a of the light emitting element group HS11 via the electrode pad T6a.

The dimming circuit LC12a has one terminal connected to the electrode pad T1a, i.e. connected to the power supply circuit VS via the electrode pad T1a, and the other terminal connected to the electrode pad T3a, i.e. connected to the one terminal of the light emitting element group HS12 via the electrode pad T3a, and connected to the electrode pad T7a, i.e. connected to a node Nd9a of the light emitting element group HS12 via the electrode pad T7a.

The electrode pad T4a is connected to the power supply circuit VS. In this way, in the transistor P13a, the gate terminal G is always connected to the power supply circuit VS. Therefore, the transistor P13a is not turned on even if the voltage level of the drive voltage Vk is increased, and is always in off state.

The electrode pad T5a is connected to the electrode pad T5 of the semiconductor chip IC6 via the wiring W3. In other words, the wiring W3 electrically connects the node Nd15 and the node Nd15a. In this way, the driving circuit KD1 and the driving circuit KD2 are electrically connected to a driving circuit KD1a and a driving circuit KD2a.

As described above, in the lighting device 40j, the gate terminal G of the transistor P13 of the semiconductor chip IC6 is electrically connected to the power supply VSS in the light emission control unit HC6, and hence supply of the comparison result signal Vcr1 from the comparing circuit CN to the driving circuit KD1 and the driving circuit KD2 is performed. In addition, the gate terminal G of the transistor P13a of the semiconductor chip IC6a is electrically connected to the power supply circuit VS in the light emission control unit HC6a, and hence supply of the comparison result signal Vcr1a from the comparing circuit CNaa to the driving circuit KD1 and the driving circuit KD2 is interrupted. In addition, the driving circuit KD1 and the driving circuit KD2 connected to the comparing circuit CN are electrically connected to the driving circuit KD1a and the driving circuit KD2a via the wiring W3. Further, in this way, in the lighting device 40j, the light emission control unit HC6 of the semiconductor chip IC6 performs the light emission control and the light emission stop control of the light emitting element groups HS connected to the semiconductor chip IC6, and the light emission control and the light emission stop control of the light emitting element groups HSa connected to the semiconductor chip IC6a, i.e. performs the light emission control and the light emission stop control of the light emitting element groups HSB.

Therefore, even if there is a manufacturing variation between the comparing circuit CN of the semiconductor chip IC6 and the comparing circuit CNaa of the semiconductor chip IC6a, the lighting device 40j can prevent a variation in timing of causing as well as stopping light emission of the light emitting element groups HS and the light emitting element groups HSa.

In addition, in the lighting device 40j, in the case where the wiring resistance of the wiring W1 for the semiconductor chip IC6 to receive power supply of the drive voltage Vk and the drive current Ik from the power supply circuit VS is larger than the wiring resistance of the wiring W2 for the semiconductor chip IC6a to receive power supply of the drive voltage Vk and the drive current Ik from the power supply circuit VS, the light emission control and the light emission stop control of the light emitting element groups HS connected to the semiconductor chip IC6, and the light emission control and the light emission stop control of the light emitting element groups HSa connected to the semiconductor chip IC6a are performed by the light emission control unit HC6 of the semiconductor chip IC6. Therefore, even if a potential increase in the drive voltage Vk obtained by the comparing circuit CNa of the semiconductor chip IC6 is delayed from a potential increase in the drive voltage Vk obtained by the comparing circuit CNaaa of the semiconductor chip IC6a, based on the wiring resistance difference between the wiring W1 and the wiring W2, it is possible to prevent a light emission timing variation between the light emitting element groups HS and the light emitting element groups HSa.

[Eleventh Variation of Fourth Embodiment]

Figure 24:
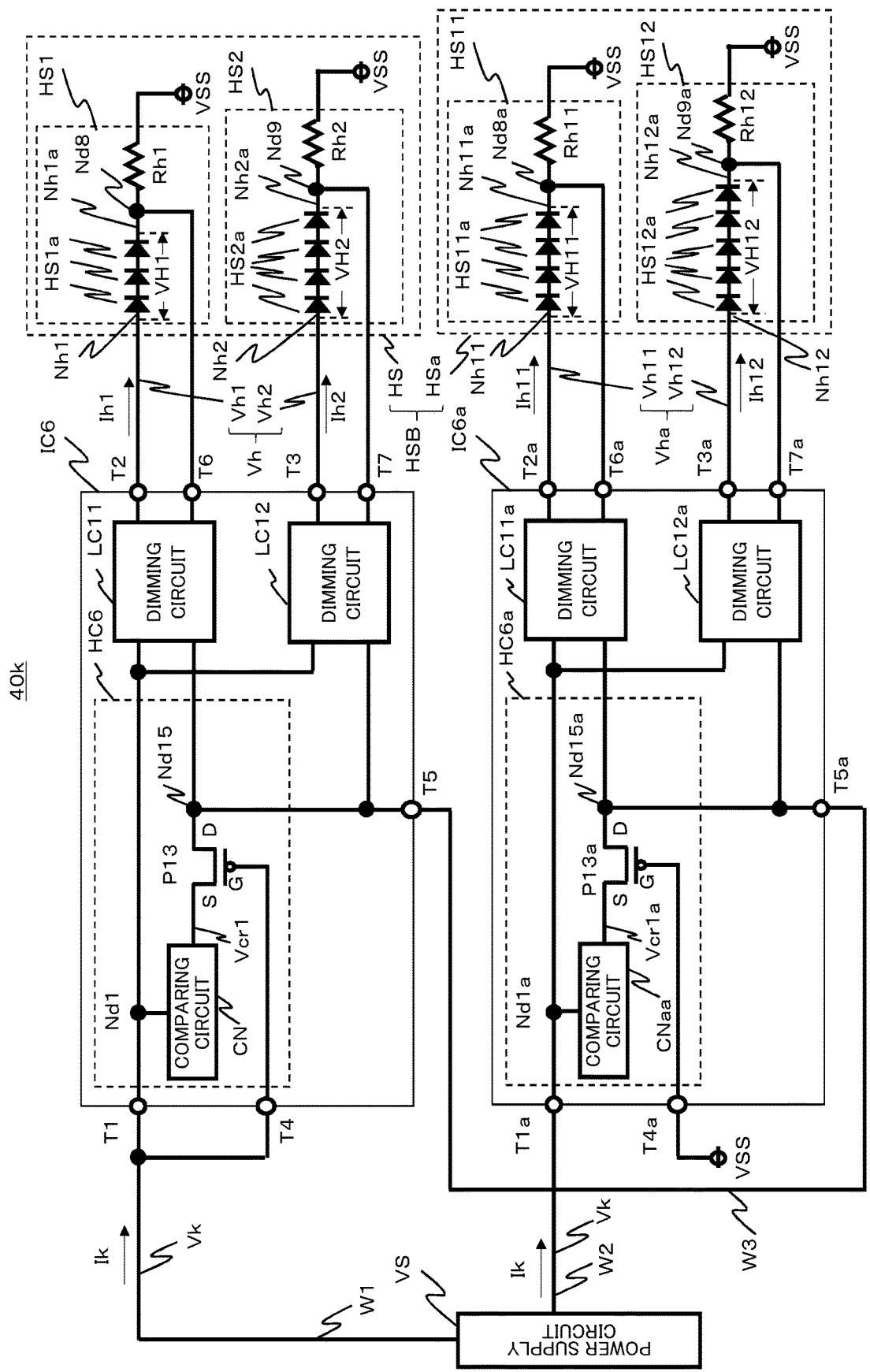
FIG. 24 is a diagram illustrating a lighting device 40k according to an eleventh variation of the fourth embodiment of the present invention.

FIG. 24 is a diagram illustrating a lighting device 40k according to an eleventh variation of the fourth embodiment of the present invention. The lighting device 40k includes the power supply circuit VS, the light emitting element groups HSB, the semiconductor chip IC6, and the semiconductor chip IC6a. Note that in the lighting device 40k illustrated in FIG. 24, the same structure as in the lighting device 40j illustrated in FIG. 23 is denoted by the same numeral or symbol, and description thereof is appropriately omitted.

The lighting device 40k is substantially different from the lighting device 40j in the connection destination of the electrode pad T4 of the semiconductor chip IC6 and in the connection destination of the electrode pad T4a of the semiconductor chip IC6a.

The electrode pad T4 is connected to the power supply circuit VS. In this way, in the transistor P13, the gate terminal G is always connected to the power supply circuit VS. Therefore, the transistor P13 is not turned on even if the voltage level of the drive voltage Vk is increased, and is always in off state.

In addition, the electrode pad T4a is connected to the power supply VSS. In this way, in the transistor P13a, the gate terminal G is connected to the power supply VSS. Therefore, the transistor P13a is turned on when the drive voltage Vk is increased so that the gate-source voltage of the transistor P13 becomes equal to or higher than a threshold voltage.

As described above, in the lighting device 40k, the gate terminal G of the transistor P13 of the semiconductor chip IC6 is electrically connected to the power supply circuit VS in the light emission control unit HC6, and hence supply of the comparison result signal Vcr1 from the comparing circuit CN to the driving circuit KD1 and the driving circuit KD2 is interrupted. In addition, in the light emission control unit HC6a, the gate terminal G of the transistor P13a of the semiconductor chip IC6a is electrically connected to the power supply VSS, and hence supply of the comparison result signal Vcr1a from the comparing circuit CNaa to the gate terminals G of the driving circuit KD1a and the driving circuit KD2a is performed. In addition, the driving circuit KD1a and the driving circuit KD2a connected to the comparing circuit CNaa are electrically connected to the driving circuit KD1 and the driving circuit KD2 via the wiring W3. Further, in this way, in the lighting device 40k, the light emission control unit HC6a of the semiconductor chip IC6a performs the light emission control and the light emission stop control of the light emitting element groups HS connected to the semiconductor chip IC6, and the light emission control and the light emission stop control of the light emitting element groups HSa connected to the semiconductor chip IC6a, i.e. performs the light emission control and the light emission stop control of the light emitting element groups HSB.

Therefore, even if there is a manufacturing variation between the comparing circuit CN of the semiconductor chip IC6 and the comparing circuit CNaa of the semiconductor chip IC6a, the lighting device 40k can prevent a variation in timing of causing as well as stopping light emission of the light emitting element groups HS and the light emitting element groups HSa.

Fifth Embodiment

Figure 25:
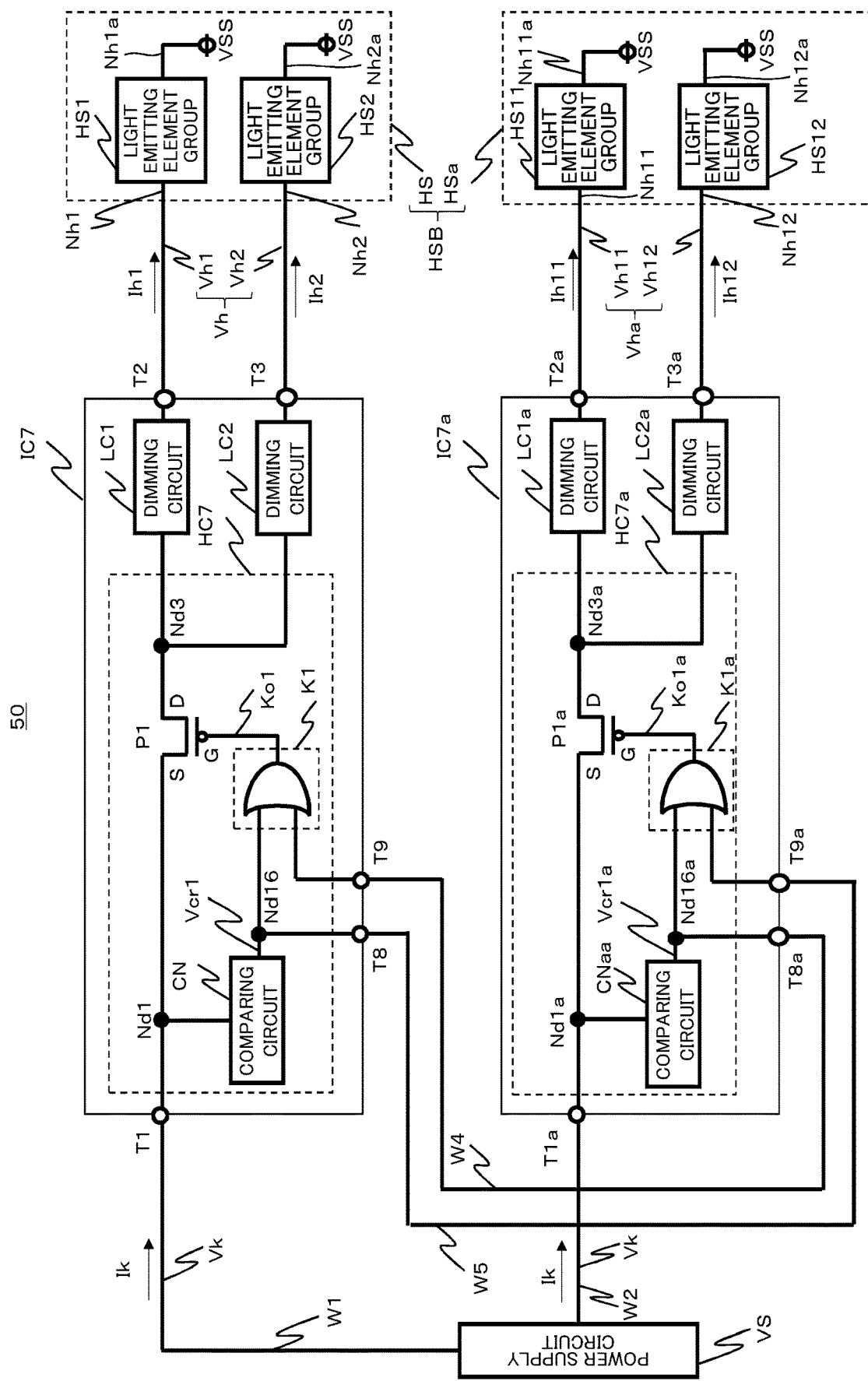
FIG. 25 is a diagram illustrating a lighting device 50 according to a fifth embodiment of the present invention.

FIG. 25 is a diagram illustrating a lighting device 50 according to a fifth embodiment of the present invention. The lighting device 50 includes the power supply circuit VS, the light emitting element groups HSB, a semiconductor chip IC7 as the first semiconductor chip, and a semiconductor chip IC7a as the second semiconductor chip. Note that in the lighting device 50 illustrated in FIG. 25, the same structure as in the lighting device 10 illustrated in FIG. 1, the lighting device 10a illustrated in FIG. 3, or the lighting device 40 illustrated in FIG. 13 is denoted by the same numeral or symbol, and description thereof is appropriately omitted.

The light emitting element groups HSB include the light emitting element groups HS and the light emitting element groups HSa. The light emitting element groups HS include the light emitting element group HS1, and the light emitting element group HS2 as the first light emitting element group. The light emitting element groups HSa include the light emitting element group HS11 and the light emitting element group HS12 as the second light emitting element group.

The semiconductor chip IC7 has electrode pads for external electric connection, which include the electrode pad T1, the electrode pad T2, the electrode pad T3, the electrode pad T8, and the electrode pad T9. In addition, the semiconductor chip IC7 includes a light emission control unit HC7 as the first light emission control unit, the dimming circuit LC1, and the dimming circuit LC2 as the first dimming portion.

The electrode pad T1 is connected to the power supply circuit VS via the wiring W1 as the first power supply wiring. In other words, the wiring W1 is connected to the power supply circuit VS and the semiconductor chip IC7. The electrode pad T2 is connected to the node Nh1 of the light emitting element group HS1. The electrode pad T3 is connected to the node Nh2 of the light emitting element group HS2.

The light emission control unit HC7 includes the comparing circuit CN as the first comparing circuit, the detecting portion K1 as the first detecting portion, and the transistor P1 as the first control switch.

The comparing circuit CN is connected to the electrode pad T1, i.e. is connected to the power supply circuit VS via the electrode pad T1. The comparing circuit CN determines whether the drive voltage Vk is higher or lower than the light emission reference voltage VHa or a voltage based on the light emission reference voltage VHa, and outputs a result of the comparison as the comparison result signal Vcr1. Note that the output terminal of the comparing circuit CN is connected to the electrode pad T8.

The detecting portion K1 is an OR circuit having a first input terminal and a second input terminal, for example. The first input terminal of the detecting portion K1 is connected to the output terminal of the comparing circuit CN and is supplied with the comparison result signal Vcr1. In addition, the first input terminal of the detecting portion K1 is connected to the electrode pad T8, and the second input terminal is connected to the electrode pad T9. The detecting portion K1 outputs an output signal Ko1, which is the logical sum of the signal input to the first input terminal and the signal input to the second input terminal. Here, the connection node between the first input terminal of the detecting portion K1 and the comparing circuit CN is referred to as a node Nd16. Note that the detecting portion K1 is not limited to the OR circuit but may be any other logic circuit, as long as it outputs the output signal Ko1 as a result, which is the logical sum of the signal input to the first input terminal and the signal input to the second input terminal.

The transistor P1 is a PMOS transistor, which has the source terminal S connected to the electrode pad T1, i.e. connected to the power supply circuit VS via the electrode pad T1, and the gate terminal G connected to the output terminal of the detecting portion K1. The transistor P1 is on-off controlled by the output signal Ko1 supplied from the detecting portion K1.

The dimming circuit LC1 has one terminal connected to the drain terminal D of the transistor P1 of the light emission control unit HC7. In addition, the dimming circuit LC1 has the other terminal connected to the electrode pad T2, i.e. connected to the node Nh1 of the light emitting element group HS1 via the electrode pad T2.

The dimming circuit LC2 has one terminal connected to the drain terminal D of the transistor P1 of the light emission control unit HC7. In addition, the dimming circuit LC2 has the other terminal connected to the electrode pad T3, i.e. connected to the node Nh2 of the light emitting element group HS2 via the electrode pad T3.

The semiconductor chip IC7a has the same structure as the semiconductor chip IC7. However, in the semiconductor chip IC7a of FIG. 25, for convenience of description, in order to discriminate from the semiconductor chip IC7, the suffix "a" is added to the numeral or symbol of the structure in the semiconductor chip IC7. In addition, in the semiconductor chip IC7a, description of the structure described in the semiconductor chip IC7 is appropriately omitted. Note that the "comparing circuit CN" is referred to as a "comparing circuit CNaa" here, in order to discriminate from the "comparing circuit CNa" illustrated in FIG. 5 or the like.

The semiconductor chip IC7a has electrode pads for external electric connection, which include the electrode pad T1a, the electrode pad T2a, the electrode pad T3a, the electrode pad T8a, and the electrode pad T9a. In addition, the semiconductor chip IC7a includes a light emission control unit HC7a as the second light emission control unit, the dimming circuit LC1a, and the dimming circuit LC2a as the second dimming portion.

The electrode pad T1a is connected to the power supply circuit VS via the wiring W2 as the second power supply wiring. In other words, the wiring W2 is connected to the power supply circuit VS and the semiconductor chip IC7a. The electrode pad T2a is connected to the node Nh11 of the light emitting element group HS11. The electrode pad T3a is connected to the node Nh12 of the light emitting element group HS12. Note that the wiring resistance of the wiring W2 may be different from the wiring resistance of the wiring W1.

The light emission control unit HC7a includes the comparing circuit CNa as the second comparing circuit, a detecting portion K1a as the second detecting portion, and the transistor P1a as the second control switch.

The dimming circuit LC1a has one terminal connected to the drain terminal D of the transistor P1a of the light emission control unit HC7a. In addition, the dimming circuit LC1a has the other terminal connected to the electrode pad T2a, i.e. connected to the node Nh11 of the light emitting element group HS11 via the electrode pad T2a.

The dimming circuit LC2a has one terminal connected to the drain terminal D of the transistor P1a of the light emission control unit HC7a. In addition, the dimming circuit LC2a has the other terminal connected to the electrode pad T3a, i.e. connected to the node Nh12 of the light emitting element group HS12 via the electrode pad T3a.

The electrode pad T8a is connected to the electrode pad T9 of the semiconductor chip IC7 via the wiring W4 as the second connection wiring. In other words, the wiring W4 electrically connects a node Nd16a and the second input terminal of the detecting portion K1.

The electrode pad T9a is connected to the electrode pad T8 of the semiconductor chip IC7 via the wiring W5 as the third connection wiring. In other words, the wiring W5 electrically connects the node Nd16 and the second input terminal of the detecting portion K1a.

Here, in the detecting portion K1 of the semiconductor chip IC7, the first input terminal is supplied with the comparison result signal Vcr1 output from the comparing circuit CN, the second input terminal is supplied with the comparison result signal Vcr1a output from the comparing circuit CNaa of the semiconductor chip IC7a, and the logical sum of these signals is supplied to the gate terminal G of the transistor P1 as the output signal Ko1 as the first output signal, and thus the transistor P1 is on-off controlled. In other words, the light emission control and the light emission stop control of the light emitting element groups HS are performed by the light emission control unit HC7 and the light emission control unit HC7a of the semiconductor chip IC7a.

In addition, in the detecting portion K1a of the semiconductor chip IC7a, the first input terminal is supplied with the comparison result signal Vcr1 output from the comparing circuit CN of the semiconductor chip IC7, the second input terminal is supplied with the comparison result signal Vcr1a output from the comparing circuit CNaa, and the logical sum of these signals is supplied to the gate terminal G of the transistor P1a as the output signal Ko1a as the second output signal, and thus the transistor P1a is on-off controlled. In other words, the light emission control and the light emission stop control of the light emitting element groups HSa is performed by the light emission control unit HC7a and the light emission control unit HC7 of the semiconductor chip IC7.

Here, the on/off state of the transistor P1 is determined by the signal level of the output signal Ko1 of the detecting portion K1 and the signal level of the output signal Ko1a of the detecting portion K1a. Further, the signal level of the output signal Ko1 of the detecting portion K1 and the signal level of the output signal Ko1a of the detecting portion K1a are determined by the level of the comparison result signal Vcr1 output from the comparing circuit CN and the level of the comparison result signal Vcr1a output from the comparing circuit CNaa.

If each of the comparing circuit CN and the comparing circuit CNaa determines that the drive voltage Vk is lower than the light emission reference voltage VHa or a voltage based on the light emission reference voltage VHa, the comparison result signal Vcr1 and the comparison result signal Vcr1a become high level. Therefore, high level signals are input to the first input terminal and the second input terminal of each of the detecting portion K1 and the detecting portion K1a, and the output signal Ko1 and the output signal Ko1a become high level. In this case, the gate terminals G of the transistor P1 and the transistor P1a are supplied with the high level signal, and hence the transistor P1 and the transistor P1a are both turned off.

If the comparing circuit CN determines that the drive voltage Vk is lower than the light emission reference voltage VHa or a voltage based on the light emission reference voltage VHa, while the comparing circuit CNaa determines that the drive voltage Vk is higher than the light emission reference voltage VHa or a voltage based on the light emission reference voltage VHa, the comparison result signal Vcr1 becomes high level, while the comparison result signal Vcr1a becomes low level. In this case, the second input terminal of the detecting portion K1 and the first input terminal of the detecting portion K1a are supplied with the low level signal, while the first input terminal of the detecting portion K1 and the second input terminal of the detecting portion K1a are supplied with the high level signal. Therefore, the output signal Ko1 and the output signal Ko1a become high level. In this case, the gate terminals G of the transistor P1 and the transistor P1a are supplied with the high level signal, and hence the transistor P1 and the transistor P1a are both turned off.

If each of the comparing circuit CN and the comparing circuit CNaa determines that the drive voltage Vk is higher than the light emission reference voltage VHa or a voltage based on the light emission reference voltage VHa, the comparison result signal Vcr1 and the comparison result signal Vcr1a become low level. Therefore, the first input terminal and the second input terminal of each of the detecting portion K1 and the detecting portion K1a are supplied with the low level signal, and hence the output signal Ko1 and the output signal Ko1a become low level. In this case, the gate terminals G of the transistor P1 and the transistor P1a are supplied with the low level signal, and hence the transistor P1 and the transistor P1a are both turned on.

As described above, in the lighting device 50, the light emission control and the light emission stop control of the light emitting element groups HSB are performed by the light emission control unit HC7 of the semiconductor chip IC7 and the light emission control unit HC7a of the semiconductor chip IC7a. Therefore, even if there is a manufacturing variation between the comparing circuit CN of the semiconductor chip IC7 and the comparing circuit CNaa of the semiconductor chip IC7a, the lighting device 50 can prevent a variation in timing of causing as well as stopping light emission of the light emitting element groups HS and the light emitting element groups HSa.

In addition, in the lighting device 50, the light emission control and the light emission stop control of the light emitting element groups HSB are performed by the light emission control unit HC7 of the semiconductor chip IC7 and the light emission control unit HC7a of the semiconductor chip IC7a. Therefore, even if the wiring resistance of the wiring W2 for the semiconductor chip IC7a to receive power supply of the drive voltage Vk and the drive current Ik from the power supply circuit VS is different from the wiring resistance of the wiring W1 for the semiconductor chip IC7 to receive power supply of the drive voltage Vk and the drive current Ik from the power supply circuit VS, the lighting device 50 can prevent a variation in timing of causing as well as stopping light emission of the light emitting element groups HS and the light emitting element groups HSa.

[First Variation of Fifth Embodiment]

Figure 26:
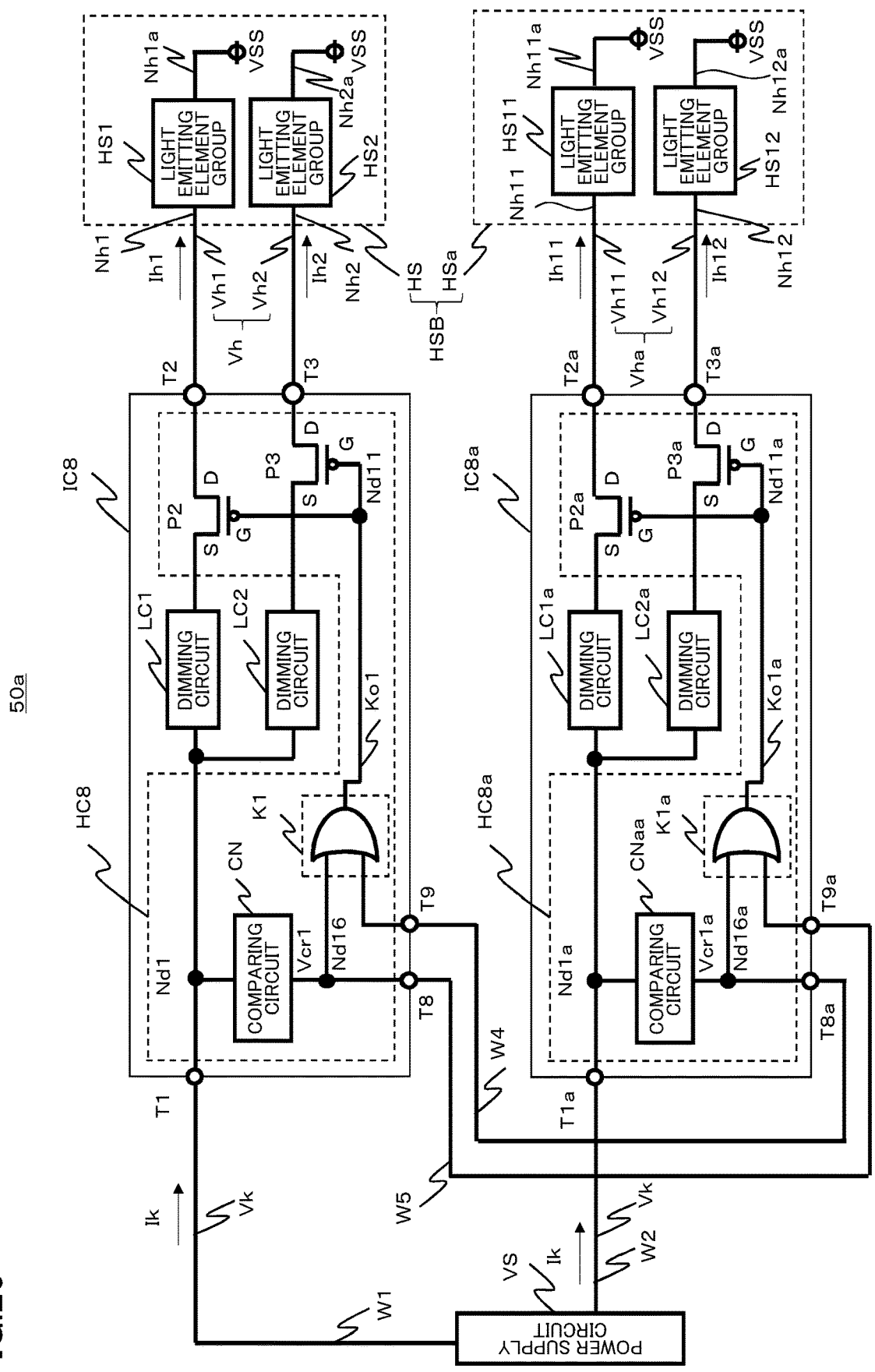
FIG. 26 is a diagram illustrating a lighting device 50a according to a first variation of the fifth embodiment of the present invention.

FIG. 26 is a diagram illustrating a lighting device 50a according to a first variation of the fifth embodiment of the present invention. The lighting device 50a includes the power supply circuit VS, the light emitting element groups HSB, a semiconductor chip IC8 as the first semiconductor chip, and a semiconductor chip IC8a as the second semiconductor chip. Note that in the lighting device 50a illustrated in FIG. 26, the same structure as in the lighting device 10b illustrated in FIG. 4 or the lighting device 40b illustrated in FIG. 15 is denoted by the same numeral or symbol, and description thereof is appropriately omitted.

The light emitting element groups HSB include the light emitting element groups HS and the light emitting element groups HSa. The light emitting element groups HS include the light emitting element group HS1, and the light emitting element group HS2 as the first light emitting element group. The light emitting element groups HSa include the light emitting element group HS11, and the light emitting element group HS12 as the second light emitting element group.

The semiconductor chip IC8 has electrode pads for external electric connection, which include the electrode pad T1, the electrode pad T2, the electrode pad T3, the electrode pad T8, and the electrode pad T9. In addition, the semiconductor chip IC8 includes the light emission control unit HC7 as the first light emission control unit, the dimming circuit LC1, and the dimming circuit LC2 as the first dimming portion.

The electrode pad T1 is connected to the power supply circuit VS via the wiring W1 as the first power supply wiring. In other words, the wiring W1 is connected to the power supply circuit VS and the semiconductor chip IC8. The electrode pad T2 is connected to the node Nh1 of the light emitting element group HS1. The electrode pad T3 is connected to the node Nh2 of the light emitting element group HS2.

A light emission control unit HC8 includes the comparing circuit CN as the first comparing circuit, the detecting portion K1 as the first detecting portion, the transistor P2, and the transistor P3 as the first control switch.

The dimming circuit LC1 has one terminal connected to the electrode pad T1, i.e. connected to the power supply circuit VS via the electrode pad T1.

The dimming circuit LC2 has one terminal connected to the electrode pad T1, i.e. connected to the power supply circuit VS via the electrode pad T1.

The transistor P2 is a PMOS transistor, which has the source terminal S connected to the other terminal of the dimming circuit LC1 and the drain terminal D connected to the electrode pad T2, i.e. connected to the node Nh1 of the light emitting element group HS1 via the electrode pad T2. In addition, the transistor P2 has the gate terminal G connected to the output terminal of the detecting portion K1. The transistor P2 is on-off controlled by the output signal Ko1 supplied from the detecting portion K1.

The transistor P3 is a PMOS transistor, which has the source terminal S connected to the other terminal of the dimming circuit LC2 and the drain terminal D connected to the electrode pad T3, i.e. connected to the node Nh2 of the light emitting element group HS2 via the electrode pad T3. In addition, the transistor P3 has the gate terminal G connected to the output terminal of the detecting portion K1. The transistor P3 is on-off controlled by the output signal Ko1 supplied from the detecting portion K1.

The semiconductor chip IC8a has the same structure as the semiconductor chip IC8. However, in the semiconductor chip IC8a of FIG. 26, for convenience of description, in order to discriminate from the semiconductor chip IC8, the suffix "a" is added to the numeral or symbol of the structure in the semiconductor chip IC8. In addition, in the semiconductor chip IC8a, description of the structure described in the semiconductor chip IC8 is appropriately omitted. Note that the "comparing circuit CN" is referred to as a "comparing circuit CNaa" here, in order to discriminate from the "comparing circuit CNa" illustrated in FIG. 5 or the like.

The semiconductor chip IC8a has electrode pads for external electric connection, which include the electrode pad T1a, the electrode pad T2a, the electrode pad T3a, the electrode pad T8a, and the electrode pad T9a. In addition, the semiconductor chip IC8a includes a light emission control unit HC8a as the second light emission control unit, the dimming circuit LC1a, and the dimming circuit LC2a as the second dimming portion. The light emission control unit HC8a includes the comparing circuit CNaa as the second comparing circuit, the detecting portion K1a as the second detecting portion, the transistor P2a, and the transistor P3a as the second control switch.

The electrode pad T1a is connected to the power supply circuit VS via the wiring W2 as the second power supply wiring. In other words, the wiring W2 is connected to the power supply circuit VS and the semiconductor chip IC8a. The electrode pad T2a is connected to the node Nh11 of the light emitting element group HS11. The electrode pad T3a is connected to the node Nh12 of the light emitting element group HS12. Note that the wiring resistance of the wiring W2 may be different from the wiring resistance of the wiring W1.

The dimming circuit LC1a has one terminal connected to the electrode pad T1a, i.e. connected to the power supply circuit VS via the electrode pad T1a.

The dimming circuit LC2a has one terminal connected to the electrode pad T1a, i.e. connected to the power supply circuit VS via the electrode pad T1a.

The electrode pad T8a is connected to the electrode pad T9 of the semiconductor chip IC8 via the wiring W4 as the second connection wiring. In other words, the wiring W4 electrically connects the node Nd16a and the second input terminal of the detecting portion K1.

The electrode pad T9a is connected to the electrode pad T8 of the semiconductor chip IC8 via the wiring W5 as the third connection wiring. In other words, the wiring W5 electrically connects the node Nd16 and the second input terminal of the detecting portion K1a.

Here, in the detecting portion K1 of the semiconductor chip IC8, the first input terminal is supplied with the comparison result signal Vcr1 output from the comparing circuit CN, the second input terminal is supplied with the comparison result signal Vcr1a output from the comparing circuit CNaa of the semiconductor chip IC8a, and the logical sum of these signals is supplied to the gate terminals G of the transistor P2 and the transistor P3 as the output signal Ko1 as the first output signal so that the transistor P2 and the transistor P3 are on-off controlled. In other words, the light emission control and the light emission stop control of the light emitting element groups HS are performed by the light emission control unit HC8 and the light emission control unit HC8a of the semiconductor chip IC8a.

In addition, in the detecting portion K1a of the semiconductor chip IC8a, the first input terminal is supplied with the comparison result signal Vcr1 output from the comparing circuit CN of the semiconductor chip IC8, the second input terminal is supplied with the comparison result signal Vcr1a output from the comparing circuit CNaa, and the logical sum of these signals is supplied to the gate terminals G of the transistor P2a and the transistor P3a as the output signal Ko1a as the second output signal so that the transistor P2a and the transistor P3a are on-off controlled. In other words, the light emission control and the light emission stop control of the light emitting element groups HSa are performed by the light emission control unit HC8a and the light emission control unit HC8 of the semiconductor chip IC8.

Here, the on/off states of the transistor P2 and the transistor P3 are determined by the signal level of the output signal Ko1 of the detecting portion K1 and the signal level of the output signal Ko1a of the detecting portion K1a. Further, the signal level of the output signal Ko1 of the detecting portion K1 and the signal level of the output signal Ko1a of the detecting portion K1a are determined by the level of the comparison result signal Vcr1 output from the comparing circuit CN and the level of the comparison result signal Vcr1a output from the comparing circuit CNaa.

If each of the comparing circuit CN and the comparing circuit CNaa determines that the drive voltage Vk is lower than the light emission reference voltage VHa or a voltage based on the light emission reference voltage VHa, the comparison result signal Vcr1 and the comparison result signal Vcr1a become high level. Therefore, the first input terminal and the second input terminal of each of the detecting portion K1 and the detecting portion K1a are supplied with the high level signal, and hence the output signal Ko1 and the output signal Ko1a become high level. In this case, the transistor P2, the transistor P3, the gate terminals G of the transistor P2a and the transistor P3a are supplied with the high level signal, and hence the transistor P2, the transistor P3, the transistor P2a, and the transistor P3a are all turned off.

If the comparing circuit CN determines that the drive voltage Vk is lower than the light emission reference voltage VHa or a voltage based on the light emission reference voltage VHa, while the comparing circuit CNaa determines that the drive voltage Vk is higher than the light emission reference voltage VHa or a voltage based on the light emission reference voltage VHa, the comparison result signal Vcr1 becomes high level, while the comparison result signal Vcr1a becomes low level. In this case, the second input terminal of the detecting portion K1 and the first input terminal of the detecting portion K1a are supplied with the low level signal, and the first input terminal of the detecting portion K1 and the second input terminal of the detecting portion K1a are supplied with the high level signal. Therefore, the output signal Ko1 and the output signal Ko1a become high level. In this case, the transistor P2, the transistor P3, the gate terminals G of the transistor P2a and the transistor P3a are supplied with the high level signal, and hence the transistor P2, the transistor P3, the transistor P2a and the transistor P3a are all turned off.

If each of the comparing circuit CN and the comparing circuit CNaa determines that the drive voltage Vk is higher than the light emission reference voltage VHa or a voltage based on the light emission reference voltage VHa, the comparison result signal Vcr1 and the comparison result signal Vcr1a become low level. Therefore, the first input terminal and the second input terminal of each of the detecting portion K1 and the detecting portion K1a are supplied with the low level signal, and hence the output signal Ko1 and the output signal Ko1a become low level. In this case, the transistor P2, the transistor P3, the gate terminals G of the transistor P2a and the transistor P3a are supplied with the low level signal, and hence the transistor P2, the transistor P3, the transistor P2a, and the transistor P3a are all turned on.

As described above, in the lighting device 50a, the light emission control and the light emission stop control of the light emitting element groups HSB are performed by the light emission control unit HC8 of the semiconductor chip IC8 and the light emission control unit HC8a of the semiconductor chip IC8a. Therefore, even if there is a manufacturing variation between the comparing circuit CN of the semiconductor chip IC8 and the comparing circuit CNaa of the semiconductor chip IC8a, the lighting device 50a can prevent a variation in timing of causing as well as stopping light emission of the light emitting element groups HS and the light emitting element groups HSa.

In addition, in the lighting device 50a, the light emission control and the light emission stop control of the light emitting element groups HSB are performed by the light emission control unit HC8 of the semiconductor chip IC8 and the light emission control unit HC8a of the semiconductor chip IC8a. Therefore, even if the wiring resistance of the wiring W2 for the semiconductor chip IC8a to receive power supply of the drive voltage Vk and the drive current Ik from the power supply circuit VS is different from the wiring resistance of the wiring W1 for the semiconductor chip IC8 to receive power supply of the drive voltage Vk and the drive current Ik from the power supply circuit VS, the lighting device 50a can prevent a variation in timing of causing as well as stopping light emission of the light emitting element groups HS and the light emitting element groups HSa.

[Second Variation of Fifth Embodiment]

Figure 27:
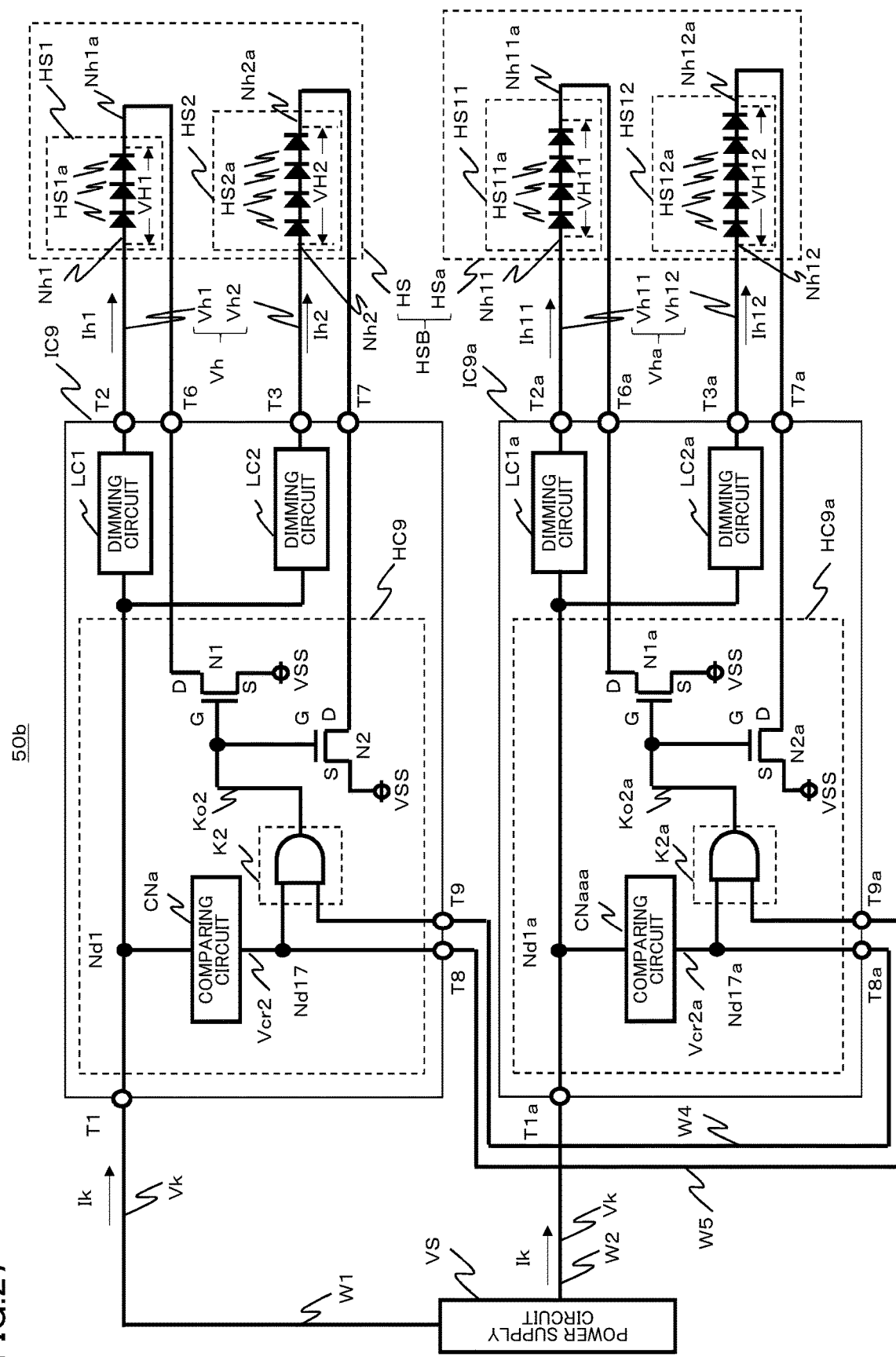
FIG. 27 is a diagram illustrating a lighting device 50b according to a second variation of the fifth embodiment of the present invention.

FIG. 27 is a diagram illustrating a lighting device 50b according to a second variation of the fifth embodiment of the present invention. The lighting device 50b includes the power supply circuit VS, the light emitting element groups HSB, a semiconductor chip IC9 as the first semiconductor chip, and a semiconductor chip IC9a as the second semiconductor chip. Note that in the lighting device 50b illustrated in FIG. 27, the same structure as in the lighting device 20a illustrated in FIG. 7, or the lighting device 50 illustrated in FIG. 25 is denoted by the same numeral or symbol, and description thereof is appropriately omitted.

The light emitting element groups HSB include the light emitting element groups HS and the light emitting element groups HSa. The light emitting element groups HS include the light emitting element group HS1, and the light emitting element group HS2 as the first light emitting element group. The light emitting element groups HSa include the light emitting element group HS11, and the light emitting element group HS12 as the second light emitting element group.

The semiconductor chip IC9 has electrode pads for external electric connection, which include the electrode pad T1, the electrode pad T2, the electrode pad T3, the electrode pad T6, the electrode pad T7, the electrode pad T8, and the electrode pad T9. In addition, the semiconductor chip IC9 includes a light emission control unit HC9 as the first light emission control unit, the dimming circuit LC1, and the dimming circuit LC2 as the first dimming portion.

The electrode pad T1 is connected to the power supply circuit VS via the wiring W1 as the first power supply wiring. In other words, the wiring W1 is connected to the power supply circuit VS and the semiconductor chip IC9. The electrode pad T2 is connected to the node Nh1 of the light emitting element group HS1. The electrode pad T3 is connected to the node Nh2 of the light emitting element group HS2. The electrode pad T6 is connected to one terminal of the node Nh1a of the light emitting element group HS1. The electrode pad T7 is connected to the node Nh2a of the light emitting element group HS2.

The light emission control unit HC9 includes the comparing circuit CNa as the first comparing circuit, a detecting portion K2 as the first detecting portion, the transistor N1, and the transistor N2 as the first control switch.

The comparing circuit CNa is connected to the electrode pad T1, i.e. connected to the power supply circuit VS via the electrode pad T1. The comparing circuit CNa determines whether the drive voltage Vk is higher or lower than the light emission reference voltage VHa or a voltage based on the light emission reference voltage VHa, and outputs a result of the comparison as the comparison result signal Vcr2. Note that the output terminal of the comparing circuit CNa is connected to the electrode pad T8.

The detecting portion K2 is an AND circuit having a first input terminal and a second input terminal, for example. The first input terminal of the detecting portion K2 is connected to the output terminal of the comparing circuit CNa and is supplied with the comparison result signal Vcr2. In addition, the first input terminal of the detecting portion K2 is connected to the electrode pad T8, and the second input terminal is connected to the electrode pad T9. The detecting portion K2 outputs an output signal Ko2, which is the logical product of the signal input to the first input terminal and the signal input to the second input terminal. Here, the connection node between the first input terminal of the detecting portion K2 and the comparing circuit CNa is referred to as a node Nd17. Note that the detecting portion K2 is not limited to the AND circuit but may be any other logic circuit, as long as it outputs the output signal Ko2 as a result, which is the logical product of the signal input to the first input terminal and the signal input to the second input terminal.

The transistor N1 is an NMOS transistor, which has the source terminal S connected to the power supply VSS, the drain terminal D connected to the electrode pad T6, i.e. connected to the one terminal of the light emitting element group HS1 via the electrode pad T6, and the gate terminal G connected to the output terminal of the detecting portion K1. The transistor N1 is on-off controlled by the output signal Ko2 supplied from the detecting portion K2.

The dimming circuit LC1 has one terminal connected to the electrode pad T1, i.e. connected to the power supply circuit VS via the electrode pad T1. In addition, the dimming circuit LC1 has the other terminal connected to the electrode pad T2, i.e. connected to the node Nh1 of the light emitting element group HS1 via the electrode pad T2.

The dimming circuit LC2 has one terminal connected to the electrode pad T1, i.e. connected to the power supply circuit VS via the electrode pad T1. In addition, the dimming circuit LC2 has the other terminal connected to the electrode pad T3, i.e. connected to the node Nh2 of the light emitting element group HS2 via the electrode pad T3.

The semiconductor chip IC9a has the same structure as the semiconductor chip IC9. However, in the semiconductor chip IC9a of FIG. 27, for convenience of description, in order to discriminate from the semiconductor chip IC9, the suffix "a" is added to the numeral or symbol of the structure in the semiconductor chip IC9. In addition, in the semiconductor chip IC9a, description of the structure described in the semiconductor chip IC9 is appropriately omitted. Note that the "comparing circuit CNa" is referred to as the "comparing circuit CNaaa" here, in order to discriminate from the "comparing circuit CNaa" illustrated in FIG. 25 or the like.

The semiconductor chip IC9a has electrode pads for external electric connection, which include the electrode pad T1a, the electrode pad T2a, the electrode pad T3a, the electrode pad T6a, the electrode pad T7a, the electrode pad T8a, and the electrode pad T9a. In addition, the semiconductor chip IC9a includes a light emission control unit HC9a as the second light emission control unit, the dimming circuit LC1a, and the dimming circuit LC2a as the second dimming portion. The light emission control unit HC9a includes the comparing circuit CNaaa as the second comparing circuit, a detecting portion K2a as the second detecting portion, the transistor Nia, and the transistor N2a as the second control switch.

The electrode pad T1a is connected to the power supply circuit VS via the wiring W2 as the second power supply wiring. In other words, the wiring W2 is connected to the power supply circuit VS and the semiconductor chip IC9a. The electrode pad T2a is connected to the node Nh11 of the light emitting element group HS11. The electrode pad T3a is connected to the node Nh12 of the light emitting element group HS12. The electrode pad T6a is connected to the one terminal of the light emitting element group HS11. The electrode pad T7a is connected to the one terminal of the light emitting element group HS12. Note that the wiring resistance of the wiring W2 may be different from the wiring resistance of the wiring W1.

The light emission control unit HC9a includes the comparing circuit CNaaa as the second comparing circuit, the detecting portion K2a as the second detecting portion, the transistor N1a, and the transistor N2a as the second control switch.

The dimming circuit LC11 has one terminal connected to the electrode pad T1a, i.e. connected to the power supply circuit VS via the electrode pad T1a. In addition, the dimming circuit LC11 has the other terminal connected to the electrode pad T2a, i.e. connected to the node Nh11 of the light emitting element group HS11 via the electrode pad T2a.

The dimming circuit LC12 has one terminal connected to the electrode pad T1a, i.e. connected to the power supply circuit VS via the electrode pad T1a. In addition, the dimming circuit LC12 has the other terminal connected to the electrode pad T3a, i.e. connected to the node Nh12 of the light emitting element group HS12 via the electrode pad T3a.

The electrode pad T8a is connected to the electrode pad T9 of the semiconductor chip IC9 via the wiring W4 as the second connection wiring. In other words, the wiring W4 electrically connects the node Nd17a and the second input terminal of the detecting portion K2.

The electrode pad T9a is connected to the electrode pad T8 of the semiconductor chip IC9 via the wiring W5 as the third connection wiring. In other words, the wiring W5 electrically connects the node Nd17 and the second input terminal of the detecting portion K2a.

Here, in the detecting portion K2 of the semiconductor chip IC9, the first input terminal is supplied with the comparison result signal Vcr2 output from the comparing circuit CNa, the second input terminal is supplied with comparison result signal Vcr2a output from the comparing circuit CNaaa of the semiconductor chip IC9a, and the logical sum of these signals is supplied to the gate terminals G of the transistor N1 and the transistor N2 as the output signal Ko2 as the first output signal so that the transistor N1 and the transistor N2 are on-off controlled. In other words, the light emission control and the light emission stop control of the light emitting element groups HS are performed by the light emission control unit HC9 and the light emission control unit HC9a of the semiconductor chip IC9a.

In addition, in the detecting portion K2a of the semiconductor chip IC9a, the first input terminal is supplied with the comparison result signal Vcr2 output from the comparing circuit CNa of the semiconductor chip IC9, the second input terminal is supplied with the comparison result signal Vcr2a output from the comparing circuit CNaaa, and the logical sum of these signals is supplied to the gate terminals G of the transistor N1a and the transistor N2a as an output signal Ko2a as the second output signal so that the transistor N1a and the transistor N2a are on-off controlled. In other words, the light emission control and the light emission stop control of the light emitting element groups HSa are performed by the light emission control unit HC9a and the light emission control unit HC9 of the semiconductor chip IC9.

Here, the on/off states of the transistor N1 and the transistor N2 are determined by the signal level of the output signal Ko2 of the detecting portion K2 and the signal level of the output signal Ko2a of the detecting portion K2a. Further, the signal level of the output signal Ko2 of the detecting portion K2 and the signal level of the output signal Ko2a of the detecting portion K2a are determined by the level of the comparison result signal Vcr2 output from the comparing circuit CNa and the level of the comparison result signal Vcr2a output from the comparing circuit CNaaa.

If each of the comparing circuit CNa and the comparing circuit CNaaa determines that the drive voltage Vk is lower than the light emission reference voltage VHa or a voltage based on the light emission reference voltage VHa, the comparison result signal Vcr2 and the comparison result signal Vcr2a become low level. Therefore, the first input terminal and the second input terminal of each of the detecting portion K2 and the detecting portion K2a are supplied with the low level signal, and hence the output signal Ko2 and the output signal Ko2a become low level. In this case, the gate terminals G of the transistor N1, the transistor N2, the transistor N1a, and the transistor N2a are supplied with the low level signal, the transistor N1, the transistor N2, the transistor N1a, and the transistor N2a are all turned off.

If the comparing circuit CNa determines that the drive voltage Vk is lower than the light emission reference voltage VHa or a voltage based on the light emission reference voltage VHa, while the comparing circuit CNaaa determines that the drive voltage Vk is higher than the light emission reference voltage VHa or a voltage based on the light emission reference voltage VHa, the comparison result signal Vcr2 becomes low level, while the comparison result signal Vcr2a becomes high level. In this case, the second input terminal of the detecting portion K2 and the first input terminal of the detecting portion K2a are both supplied with the high level signal, while the first input terminal of the detecting portion K2 and the second input terminal of the detecting portion K2a are both supplied with the low level signal. Therefore, the output signal Ko2 and the output signal Ko2a become low level. In this case, the gate terminals G of the transistor N1, the transistor N2, the transistor N1a, and the transistor N2a are supplied with the high level signal, and hence the transistor N1, the transistor N2, the transistor N1a, and the transistor N2a are all turned off.

If each of the comparing circuit CNa and the comparing circuit CNaaa determines that the drive voltage Vk is higher than the light emission reference voltage VHa or a voltage based on the light emission reference voltage VHa, the comparison result signal Vcr2 and the comparison result signal Vcr2a become high level. Therefore, the first input terminal and the second input terminal of each of the detecting portion K2 and the detecting portion K2a are supplied with the high level signal, and hence the output signal Ko2 and the output signal Ko2a become high level. In this case, the gate terminals G of the transistor N1, the transistor N2, the transistor N1a, and the transistor N2a are supplied with the low level signal, and hence the transistor N1, the transistor N2, the transistor N1a, and the transistor N2a are all turned on.

As described above, in the lighting device 50b, the light emission control and the light emission stop control of the light emitting element groups HSB are performed by the light emission control unit HC9 of the semiconductor chip IC9 and the light emission control unit HC9a of the semiconductor chip IC9a. Therefore, even if there is a manufacturing variation between the comparing circuit CNa of the semiconductor chip IC9 and the comparing circuit CNaaa of the semiconductor chip IC9a, the lighting device 50b can prevent a variation in timing of causing as well as stopping light emission of the light emitting element groups HS and the light emitting element groups HSa.

In addition, in the lighting device 50b, the light emission control and the light emission stop control of the light emitting element groups HSB are performed by the light emission control unit HC9 of the semiconductor chip IC9 and the light emission control unit HC9a of the semiconductor chip IC9a. Therefore, even if the wiring resistance of the wiring W2 for the semiconductor chip IC9a to receive power supply of the drive voltage Vk and the drive current Ik from the power supply circuit VS is different from the wiring resistance of the wiring W1 for the semiconductor chip IC9 to receive power supply of the drive voltage Vk and the drive current Ik from the power supply circuit VS, the lighting device 50b can prevent a variation in timing of causing as well as stopping light emission of the light emitting element groups HS and the light emitting element groups HSa.

[Third Variation of Fifth Embodiment]

Figure 28:
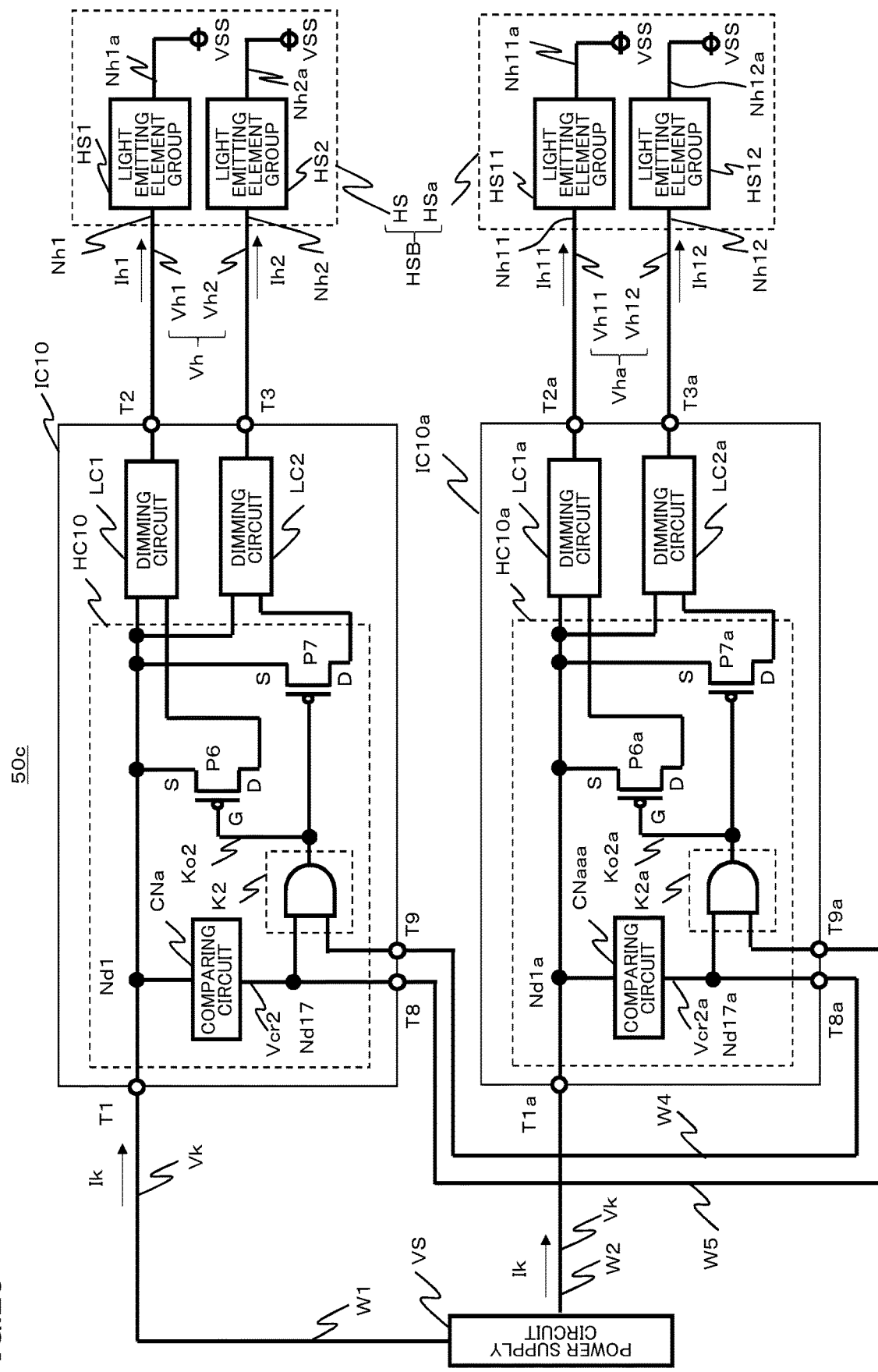
FIG. 28 is a diagram illustrating a lighting device 50c according to a third variation of the fifth embodiment of the present invention.

FIG. 28 is a diagram illustrating a lighting device 50c according to a third variation of the fifth embodiment of the present invention. The lighting device 50c includes the power supply circuit VS, the light emitting element groups HSB, a semiconductor chip IC10 as the first semiconductor chip, and a semiconductor chip IC10a as the second semiconductor chip. Note that in the lighting device 50c illustrated in FIG. 28, the same structure as in the lighting device 30 illustrated in FIG. 8, the lighting device 30a illustrated in FIG. 10, the lighting device 50a illustrated in FIG. 25, or the lighting device 50c illustrated in FIG. 27 is denoted by the same numeral or symbol, and description thereof is appropriately omitted.

The light emitting element groups HSB include the light emitting element groups HS and the light emitting element groups HSa. The light emitting element groups HS include the light emitting element group HS1, and the light emitting element group HS2 as the first light emitting element group. The light emitting element groups HSa include the light emitting element group HS11 and the light emitting element group HS12 as the second light emitting element group.

The semiconductor chip IC10 has electrode pads for external electric connection, which include the electrode pad T1, the electrode pad T2, the electrode pad T3, the electrode pad T8, and the electrode pad T9. In addition, the semiconductor chip IC10 includes a light emission control unit HC10 as the first light emission control unit, the dimming circuit LC1, and the dimming circuit LC2 as the first dimming portion. The light emission control unit HC10 includes the comparing circuit CNa as the first comparing circuit, the detecting portion K2 as the first detecting portion, the transistor P6, and the transistor P7 as the first control switch.

The electrode pad T1 is connected to the power supply circuit VS via the wiring W1 as the first power supply wiring. In other words, the wiring W1 is connected to the power supply circuit VS and the semiconductor chip IC10. The electrode pad T2 is connected to the node Nh1 of the light emitting element group HS1. The electrode pad T3 is connected to the node Nh2 of the light emitting element group HS2.

The transistor P6 is a PMOS transistor, which has the source terminal S connected to the electrode pad T1, i.e. connected to the power supply circuit VS via the electrode pad T1, the drain terminal D connected to one terminal of the dimming circuit LC1, and the gate terminal G connected to the output terminal of the detecting portion K2. The transistor P6 is on-off controlled by the output signal Ko2 supplied from the detecting portion K2.

The transistor P7 is a PMOS transistor, which has the source terminal S connected to the electrode pad T1, i.e. connected to the power supply circuit VS via the electrode pad T1, the drain terminal D connected to one terminal of the dimming circuit LC2, and the gate terminal G connected to the output terminal of the detecting portion K2. The transistor P7 is on-off controlled by the output signal Ko2 supplied from the detecting portion K2.

The dimming circuit LC1 has the other terminal connected to the electrode pad T2, i.e. connected to the node Nh1 of the light emitting element group HS1 via the electrode pad T2.

The dimming circuit LC2 has the other terminal connected to the electrode pad T3, i.e. connected to the node Nh2 of the light emitting element group HS2 via the electrode pad T3.

The semiconductor chip IC10a has the same structure as the semiconductor chip IC10. However, in the semiconductor chip IC10a of FIG. 28, for convenience of description, in order to discriminate from the semiconductor chip IC10, the suffix "a" is added to the numeral or symbol of the structure in the semiconductor chip IC10. In addition, in the semiconductor chip IC10a, the structure described in the semiconductor chip IC10 is appropriately omitted. Note that the "comparing circuit CNa" is referred to as the "comparing circuit CNaaa" here, in order to discriminate from the "comparing circuit CNaa" illustrated in FIG. 25 or the like.

The semiconductor chip IC10a has electrode pads for external electric connection, which include the electrode pad T1a, the electrode pad T2a, the electrode pad T3a, the electrode pad T8a, and the electrode pad T9a. In addition, the semiconductor chip IC10a includes a light emission control unit HC10a as the second light emission control unit, the dimming circuit LC1a, and the dimming circuit LC2a as the second dimming portion. The light emission control unit HC10a includes the comparing circuit CNaaa as the second comparing circuit, the detecting portion K2a as the second detecting portion, the transistor Nia, and the transistor N2a as the second control switch.

The electrode pad T1a is connected to the power supply circuit VS via the wiring W2 as the second power supply wiring. In other words, the wiring W2 is connected to the power supply circuit VS and the semiconductor chip IC10a. The electrode pad T2a is connected to the node Nh11 of the light emitting element group HS11. The electrode pad T3a is connected to the node Nh12 of the light emitting element group HS12. Note that the wiring resistance of the wiring W2 may be different from the wiring resistance of the wiring W1.

The light emission control unit HC10a includes the comparing circuit CNaaa as the second comparing circuit, the detecting portion K2a as the second detecting portion, the transistor P6a, and the transistor P7a as the second control switch.

The dimming circuit LC11 has the other terminal connected to the electrode pad T2a, i.e. connected to the node Nh11 of the light emitting element group HS11 via the electrode pad T2a.

The dimming circuit LC12 has the other terminal connected to the electrode pad T3a, i.e. connected to the node Nh12 of the light emitting element group HS12 via the electrode pad T3a.

The electrode pad T8a is connected to the electrode pad T9 of the semiconductor chip IC10 via the wiring W4 as the second connection wiring. In other words, the wiring W4 electrically connects the node Nd17a and the second input terminal of the detecting portion K2.

The electrode pad T9a is connected to the electrode pad T8 of the semiconductor chip IC10 via the wiring W5 as the third connection wiring. In other words, the wiring W5 electrically connects the node Nd17 and the second input terminal of the detecting portion K2a.

Here, in the detecting portion K2 of the semiconductor chip IC10, the first input terminal is supplied with the comparison result signal Vcr2 output from the comparing circuit CNa, the second input terminal is supplied with the comparison result signal Vcr2a output from the comparing circuit CNaaa of the semiconductor chip IC10a, and the logical sum of these signals is supplied to the gate terminals G of the transistor P6 and the transistor P7 as the output signal Ko2 as the first output signal so that the transistor P6 and the transistor P7 are on-off controlled. In other words, the light emission control and the light emission stop control of the light emitting element groups HS are performed by the light emission control unit HC10 and the light emission control unit HC10a of the semiconductor chip IC10a.

In addition, in the detecting portion K2a of the semiconductor chip IC10a, the first input terminal is supplied with the comparison result signal Vcr2 output from the comparing circuit CNa of the semiconductor chip IC10, the second input terminal is supplied with the comparison result signal Vcr2a output from the comparing circuit CNaaa, and the logical sum of these signals is supplied to the gate terminals G of the transistor N1a and the transistor N2a as the output signal Ko2a as the second output signal, so that the transistor P6a and the transistor P7a are on-off controlled. In other words, the light emission control and the light emission stop control of the light emitting element groups HSa are performed by the light emission control unit HC10a and the light emission control unit HC10 of the semiconductor chip IC10.

Here, the on/off states of the transistor P6 and the transistor P7 are determined by the signal level of the output signal Ko2 of the detecting portion K2 and the signal level of the output signal Ko2a of the detecting portion K2a. Further, the signal level of the output signal Ko2 of the detecting portion K2 and the signal level of the output signal Ko2a of the detecting portion K2a are determined by the level of the comparison result signal Vcr2 output from the comparing circuit CNa and the level of the comparison result signal Vcr2a output from the comparing circuit CNaaa.

If each of the comparing circuit CNa and the comparing circuit CNaaa determines that the drive voltage Vk is lower than the light emission reference voltage VHa or a voltage based on the light emission reference voltage VHa, the comparison result signal Vcr2 and the comparison result signal Vcr2a become low level. Therefore, the first input terminal and the second input terminal of each of the detecting portion K2 and the detecting portion K2a are supplied with the low level signal, and hence the output signal Ko2 and the output signal Ko2a become low level. In this case, the gate terminals G of the transistor P6, the transistor P7, the transistor P6a, and the transistor P7a are supplied with the low level signal, and hence the transistor P6, the transistor P7, the transistor P6a, and the transistor P7a are all turned on.

If the comparing circuit CNa determines that the drive voltage Vk is lower than the light emission reference voltage VHa or a voltage based on the light emission reference voltage VHa, while the comparing circuit CNaaa determines that the drive voltage Vk is higher than the light emission reference voltage VHa or a voltage based on the light emission reference voltage VHa, the comparison result signal Vcr2 becomes low level, while the comparison result signal Vcr2a becomes high level. In this case, the second input terminal of the detecting portion K2 and the first input terminal of the detecting portion K2a are both supplied with the high level signal, while the first input terminal of the detecting portion K2 and the second input terminal of the detecting portion K2a are both supplied with the low level signal. Therefore, the output signal Ko2 and the output signal Ko2a become low level. In this case, the gate terminals G of the transistor P6, the transistor P7, the transistor P6a, and the transistor P7a are supplied with the high level signal, and hence the transistor P6, the transistor P7, the transistor P6a, and the transistor P7a are all turned on.

If each of the comparing circuit CNa and the comparing circuit CNaaa determines that the drive voltage Vk is higher than the light emission reference voltage VHa or a voltage based on the light emission reference voltage VHa, the comparison result signal Vcr2 and the comparison result signal Vcr2a become high level. Therefore, the first input terminal and the second input terminal of each of the detecting portion K2 and the detecting portion K2a are supplied with the high level signal so that the output signal Ko2 and the output signal Ko2a become high level. In this case, the gate terminals G of the transistor P6, the transistor P7, the transistor P6a, and the transistor P7a are supplied with the low level signal, and hence the transistor P6, the transistor P7, the transistor P6a, and the transistor P7a are all turned off.

As described above, in the lighting device 50c, the light emission control and the light emission stop control of the light emitting element groups HSB are performed by the light emission control unit HC10 of the semiconductor chip IC10 and the light emission control unit HC10a of the semiconductor chip IC10a. Therefore, even if there is a manufacturing variation between the comparing circuit CNa of the semiconductor chip IC10 and the comparing circuit CNaaa of semiconductor chip IC10a, the lighting device 50c can prevent a variation in timing of causing as well as stopping light emission of the light emitting element groups HS and the light emitting element groups HSa.

In addition, in the lighting device 50c, the light emission control and the light emission stop control of the light emitting element groups HSB are performed by the light emission control unit HC10 of the semiconductor chip IC10 and the light emission control unit HC10a of the semiconductor chip IC10a. Therefore, even if the wiring resistance of the wiring W2 for the semiconductor chip IC10a to receive power supply of the drive voltage Vk and the drive current Ik from the power supply circuit VS is different from the wiring resistance of the wiring W1 for the semiconductor chip IC10 to receive power supply of the drive voltage Vk and the drive current Ik from the power supply circuit VS, the lighting device 50c can prevent a variation in timing of causing as well as stopping light emission of the light emitting element groups HS and the light emitting element groups HSa.

[Fourth Variation of Fifth Embodiment]

Figure 29:
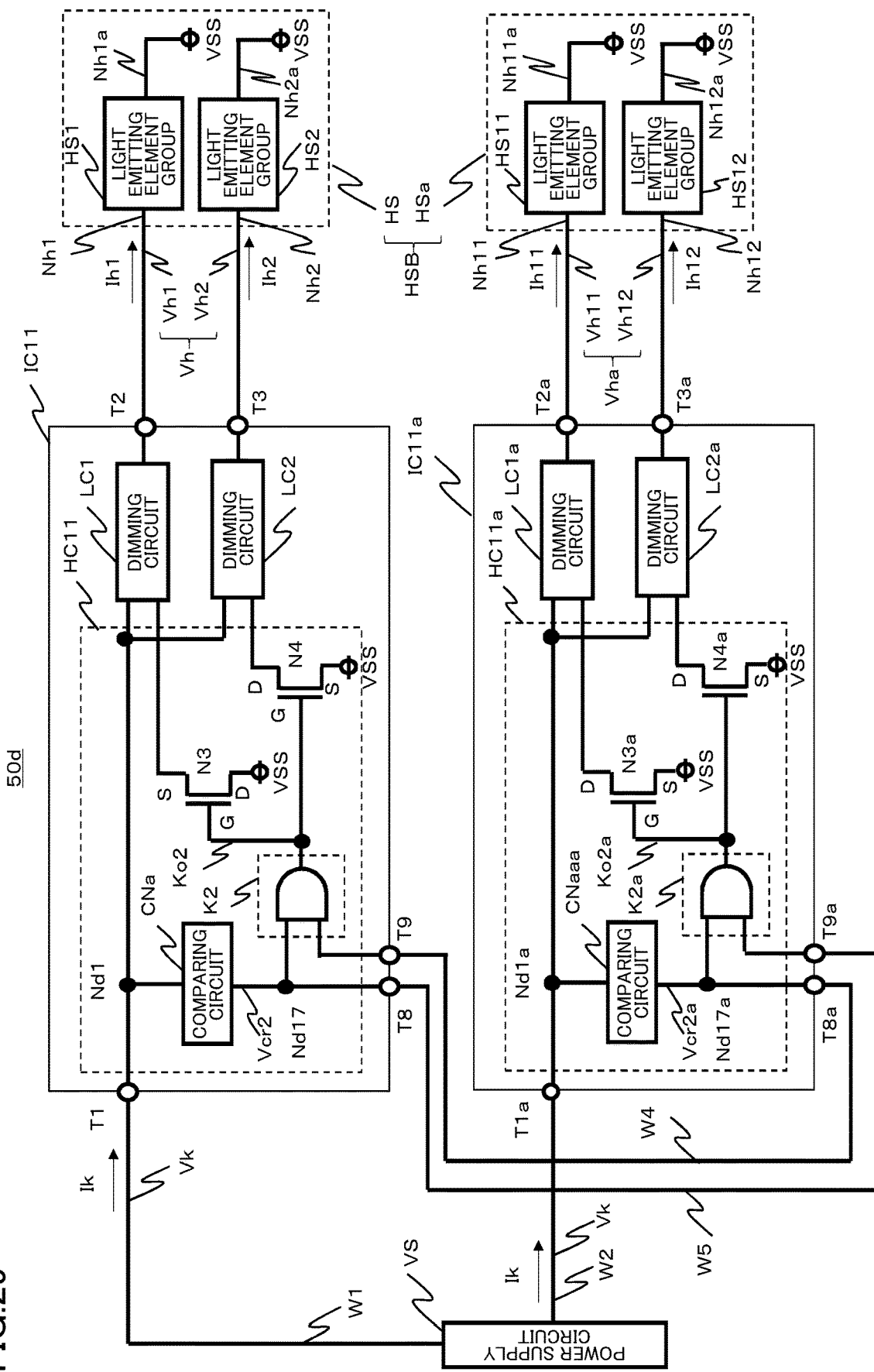
FIG. 29 is a diagram illustrating a lighting device 50d according to a fourth variation of the fifth embodiment of the present invention.

FIG. 29 is a diagram illustrating a lighting device 50d according to a fourth variation of the fifth embodiment of the present invention. The lighting device 50d includes the power supply circuit VS, the light emitting element groups HSB, a semiconductor chip IC11 as the first semiconductor chip, and a semiconductor chip IC1a as the second semiconductor chip. Note that in the lighting device 50d illustrated in FIG. 29, the same structure as in the lighting device 30b illustrated in FIG. 11 or the lighting device 50d illustrated in FIG. 28 is denoted by the same numeral or symbol, and description thereof is appropriately omitted.

The light emitting element groups HSB include the light emitting element groups HS and the light emitting element groups HSa. The light emitting element groups HS include the light emitting element group HS1, and the light emitting element group HS2 as the first light emitting element group. The light emitting element groups HSa include the light emitting element group HS11 and the light emitting element group HS12 as the second light emitting element group.

The semiconductor chip IC11 has electrode pads for external electric connection, which include the electrode pad T1, the electrode pad T2, the electrode pad T3, the electrode pad T8, and the electrode pad T9. In addition, the semiconductor chip IC11 includes the light emission control unit HC11 as the first light emission control unit, the dimming circuit LC1, and the dimming circuit LC2 as the first dimming portion. The light emission control unit HC11 includes the comparing circuit CNa as the first comparing circuit, the detecting portion K2 as the first detecting portion, the transistor N3, and the transistor N4 as the first control switch.

The electrode pad T1 is connected to the power supply circuit VS via the wiring W1 as the first power supply wiring. In other words, the wiring W1 is connected to the power supply circuit VS and the semiconductor chip IC11. The electrode pad T2 is connected to the node Nh1 of the light emitting element group HS1. The electrode pad T3 is connected to the node Nh2 of the light emitting element group HS2.

The transistor N3 is an NMOS transistor, which has the source terminal S connected to the dimming circuit LC1, the drain terminal D connected to the power supply VSS, and the gate terminal G connected to the output terminal of the detecting portion K2. The transistor N3 is on-off controlled by the output signal Ko2 supplied from the detecting portion K2.

The transistor N4 is an NMOS transistor, which has the source terminal S connected to the dimming circuit LC2, the drain terminal D connected to the power supply VSS, and the gate terminal G connected to the output terminal of the detecting portion K2. The transistor N4 is on-off controlled by the output signal Ko2 supplied from the detecting portion K2.

The dimming circuit LC1 has one terminal connected to the electrode pad T1, i.e. connected to the power supply circuit VS via the electrode pad T1, and the other terminal connected to the electrode pad T2, i.e. connected to the node Nh1 of the light emitting element group HS1 via the electrode pad T2.

The dimming circuit LC2 has one terminal connected to the electrode pad T1, i.e. connected to the power supply circuit VS via the electrode pad T1, the other terminal connected to the electrode pad T3, i.e. connected to the node Nh2 of the light emitting element group HS2 via the electrode pad T3.

The semiconductor chip IC11a has the same structure as the semiconductor chip IC11. However, in the semiconductor chip IC11a of FIG. 29, for convenience of description, in order to discriminate from the semiconductor chip IC11, the suffix "a" is added to the numeral or symbol of the structure in the semiconductor chip IC11. In addition, in the semiconductor chip IC11a, the structure described in the semiconductor chip IC11 is appropriately omitted. Note that the "comparing circuit CNa" is referred to as a "comparing circuit CNaaa" here, in order to discriminate from the "comparing circuit CNaa" illustrated in FIG. 25 or the like.

The semiconductor chip IC11a has electrode pads for external electric connection, which include the electrode pad T1a, the electrode pad T2a, the electrode pad T3a, the electrode pad T8a, and the electrode pad T9a. In addition, the semiconductor chip IC11a includes a light emission control unit HC11a as the second light emission control unit, the dimming circuit LC1a, and the dimming circuit LC2a as the second dimming portion. The light emission control unit HC11a includes the comparing circuit CNaaa as the second comparing circuit, the detecting portion K2a as the second detecting portion, the transistor N3a, and the transistor N4a as the second control switch.

The electrode pad T1a is connected to the power supply circuit VS via the wiring W2 as the second power supply wiring. In other words, the wiring W2 is connected to the power supply circuit VS and the semiconductor chip IC11a. The electrode pad T2a is connected to the node Nh11 of the light emitting element group HS11. The electrode pad T3a is connected to the node Nh12 of the light emitting element group HS12. Note that the wiring resistance of the wiring W2 may be different from the wiring resistance of the wiring W1.

The dimming circuit LC11 has one terminal connected to the electrode pad T1a, i.e. connected to the power supply circuit VS via the electrode pad T1a, and the other terminal connected to the electrode pad T2a, i.e. connected to the node Nh11 of the light emitting element group HS11 via the electrode pad T2a.

The dimming circuit LC12 has one terminal connected to the electrode pad T1a, i.e. connected to the power supply circuit VS via the electrode pad T1a, and the other terminal connected to the electrode pad T3a, i.e. connected to the node Nh12 of the light emitting element group HS12 via the electrode pad T3a.

The electrode pad T8a is connected to the electrode pad T9 of the semiconductor chip IC11 via the wiring W4 as the second connection wiring. In other words, the wiring W4 electrically connects the node Nd17a and the second input terminal of the detecting portion K2.

The electrode pad T9a is connected to the electrode pad T8 of the semiconductor chip IC11 via the wiring W5 as the third connection wiring. In other words, the wiring W5 electrically connects the node Nd17 and the second input terminal of the detecting portion K2a.

Here, in the detecting portion K2 of the semiconductor chip IC11, the first input terminal is supplied with the comparison result signal Vcr2 output from the comparing circuit CNa, the second input terminal is supplied with the comparison result signal Vcr2a output from the comparing circuit CNaaa of the semiconductor chip IC11a, and the logical sum of these signals is supplied to the gate terminals G of the transistor N3 and the transistor N4 as the output signal Ko2 as the first output signal so that the transistor N3 and the transistor N4 are on-off controlled. In other words, the light emission control and the light emission stop control of the light emitting element groups HS are performed by the light emission control unit HC11 and the light emission control unit HC11a of the semiconductor chip IC11a.

In addition, in the detecting portion K2a of the semiconductor chip IC11a, the first input terminal is supplied with the comparison result signal Vcr2 output from the comparing circuit CNa of the semiconductor chip IC11, the second input terminal is supplied with the comparison result signal Vcr2a output from the comparing circuit CNaaa, and the logical sum of these signals is supplied to the gate terminals G of the transistor N1a and the transistor N2a as the output signal Ko2a as the second output signal so that the transistor N3a and the transistor N4a are on-off controlled. In other words, the light emission control and the light emission stop control of the light emitting element groups HSa are performed by the light emission control unit HC11a and the light emission control unit HC11 of the semiconductor chip IC11.

Here, the on/off states of the transistor N3 and the transistor N4 are determined by the signal level of the output signal Ko2 of the detecting portion K2 and the signal level of the output signal Ko2a of the detecting portion K2a. Further, the signal level of the output signal Ko2 of the detecting portion K2 and the signal level of the output signal Ko2a of the detecting portion K2a are determined by the level of the comparison result signal Vcr2 output from the comparing circuit CNa and the level of the comparison result signal Vcr2a output from the comparing circuit CNaaa.

If each of the comparing circuit CNa and the comparing circuit CNaaa determines that the drive voltage Vk is lower than the light emission reference voltage VHa or a voltage based on the light emission reference voltage VHa, the comparison result signal Vcr2 and the comparison result signal Vcr2a become low level. Therefore, the first input terminal and the second input terminal of each of the detecting portion K2 and the detecting portion K2a are supplied with the low level signal, and hence the output signal Ko2 and the output signal Ko2a become low level. In this case, the gate terminals G of the transistor N3, the transistor N4, the transistor N3a, and the transistor N4a are supplied with the low level signal, and hence the transistor N3, the transistor N4, the transistor N3a, and the transistor N4a are all turned off.

If the comparing circuit CNa determines that the drive voltage Vk is lower than the light emission reference voltage VHa or a voltage based on the light emission reference voltage VHa, while the comparing circuit CNaaa determines that the drive voltage Vk is higher than the light emission reference voltage VHa or a voltage based on the light emission reference voltage VHa, the comparison result signal Vcr2 becomes low level, while the comparison result signal Vcr2a becomes high level. In this case, the second input terminal of the detecting portion K2 and the first input terminal of the detecting portion K2a are both supplied with the high level signal, while the first input terminal of the detecting portion K2 and the second input terminal of the detecting portion K2a are both supplied with the low level signal. Therefore, the output signal Ko2 and the output signal Ko2a become low level. In this case, the gate terminals G of the transistor N3, the transistor N4, the transistor N3a, and the transistor N4a are supplied with the high level signal, and hence the transistor N3, the transistor N4, the transistor N3a, and the transistor N4a are all turned off.

If each of the comparing circuit CNa and the comparing circuit CNaaa determines that the drive voltage Vk is higher than the light emission reference voltage VHa or a voltage based on the light emission reference voltage VHa, the comparison result signal Vcr2 and the comparison result signal Vcr2a become high level. Therefore, the first input terminal and the second input terminal of each of the detecting portion K2 and the detecting portion K2a are supplied with the high level signal so that the output signal Ko2 and the output signal Ko2a become high level. In this case, the gate terminals G of the transistor N3, the transistor N4, the transistor N3a, and the transistor N4a are supplied with the low level signal, and hence the transistor N3, the transistor N4, the transistor N3a, and the transistor N4a are all turned on.

As described above, in the lighting device 50d, the light emission control and the light emission stop control of the light emitting element groups HSB are performed by the light emission control unit HC11 of the semiconductor chip IC11 and the light emission control unit HC11a of the semiconductor chip IC11a. Therefore, even if there is a manufacturing variation between the comparing circuit CNa of the semiconductor chip IC11 and the comparing circuit CNaaa of the semiconductor chip IC11a, the lighting device 50d can prevent a variation in timing of causing as well as stopping light emission of the light emitting element groups HS and the light emitting element groups HSa.

In addition, in the lighting device 50d, the light emission control and the light emission stop control of the light emitting element groups HSB are performed by the light emission control unit HC11 of the semiconductor chip IC11 and the light emission control unit HC11a of the semiconductor chip IC11a. Therefore, even if the wiring resistance of the wiring W2 for the semiconductor chip IC11a to receive power supply of the drive voltage Vk and the drive current Ik from the power supply circuit VS is different from the wiring resistance of the wiring W1 for the semiconductor chip IC10 to receive power supply of the drive voltage Vk and the drive current Ik from the power supply circuit VS, the lighting device 50d can prevent a variation in timing of causing as well as stopping light emission of the light emitting element groups HS and the light emitting element groups HSa.

[Fifth Variation of Fifth Embodiment]

Figure 30:
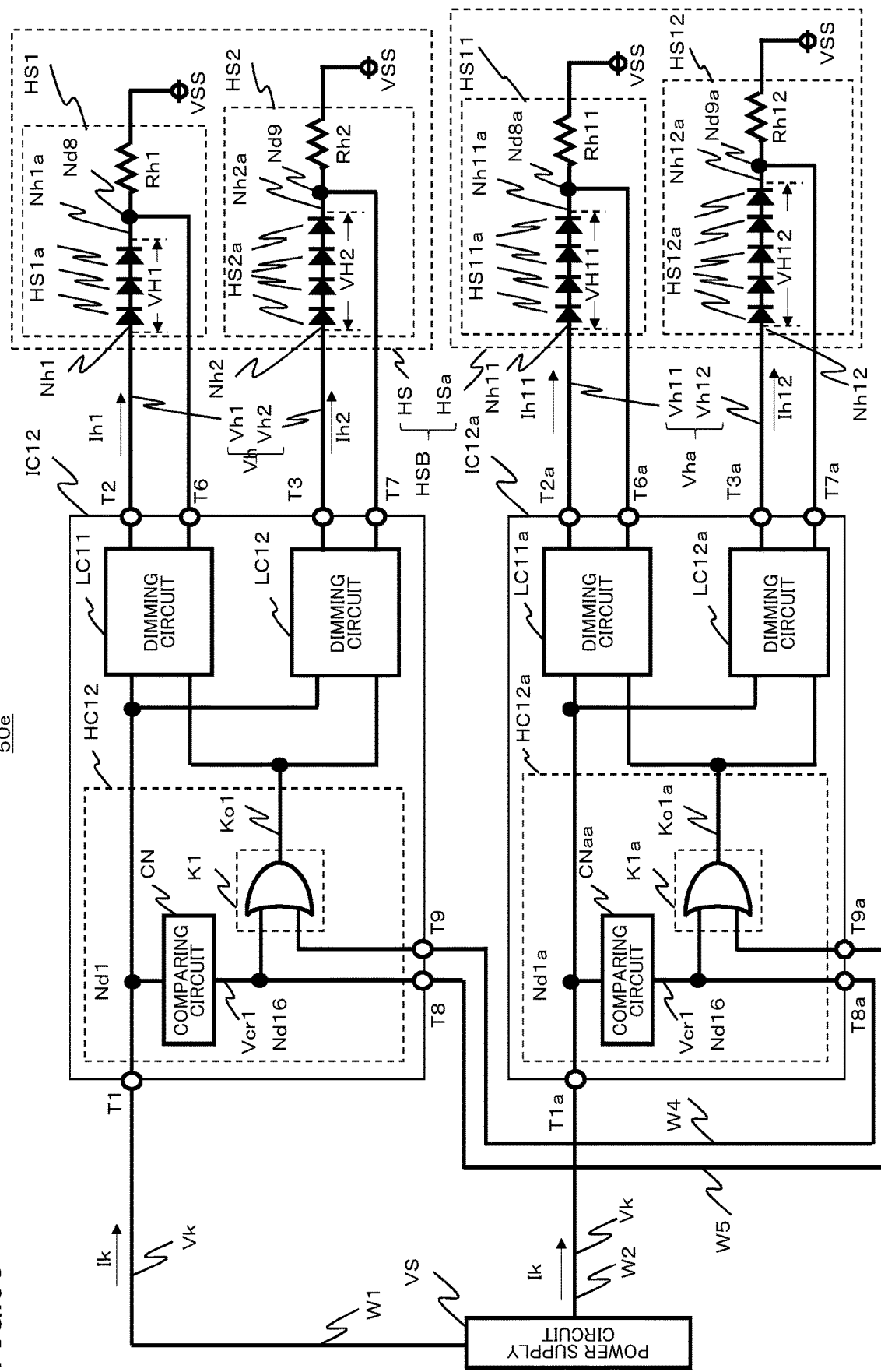
FIG. 30 is a diagram illustrating a lighting device 50e according to a fifth variation of the fifth embodiment of the present invention.

FIG. 30 is a diagram illustrating a lighting device 50e according to a fifth variation of the fifth embodiment of the present invention. The lighting device 50e includes the power supply circuit VS, the light emitting element groups HSB, a semiconductor chip IC12 as the first semiconductor chip, and a semiconductor chip IC12a as the second semiconductor chip. Note that in the lighting device 50e illustrated in FIG. 30, the same structure as in the lighting device 30c illustrated in FIG. 12 or the lighting device 50 illustrated in FIG. 25 is denoted by the same numeral or symbol, and description thereof is appropriately omitted.

The light emitting element groups HSB include the light emitting element groups HS and the light emitting element groups HSa. The light emitting element groups HS include the light emitting element group HS1, and the light emitting element group HS2 as the first light emitting element group. The light emitting element groups HSa include the light emitting element group HS11, and the light emitting element group HS12 as the second light emitting element group.

The semiconductor chip IC12 has electrode pads for external electric connection, which include the electrode pad T1, the electrode pad T2, the electrode pad T3, the electrode pad T6, the electrode pad T7, the electrode pad T8, and the electrode pad T9. In addition, the semiconductor chip IC12 includes the light emission control unit HC12 as the first light emission control unit, the dimming circuit LC11, and the dimming circuit LC12 as the first dimming portion.

The electrode pad T1 is connected to the power supply circuit VS via the wiring W1 as the first power supply wiring. In other words, the wiring W1 is connected to the power supply circuit VS and the semiconductor chip IC12. The electrode pad T2 is connected to the node Nh1 of the light emitting element group HS1. The electrode pad T3 is connected to the node Nh2 of the light emitting element group HS2. The electrode pad T6 is connected to the one terminal of the light emitting element group HS1. The electrode pad T7 is connected to the one terminal of the light emitting element group HS2.

The dimming circuit LC11 has one terminal connected to the electrode pad T1, i.e. connected to the power supply circuit VS via the electrode pad T1. In addition, the dimming circuit LC11 has the other terminal connected to the electrode pad T2, i.e. connected to the node Nh1 of the light emitting element group HS1 via the electrode pad T2, and the other terminal connected to the electrode pad T6, i.e. connected to the node Nd8 of the light emitting element group HS1 via the electrode pad T6. Note that the dimming circuit LC11 includes a transistor N5 and the driving circuit KD1 illustrated in FIG. 12.

The dimming circuit LC12 has one terminal connected to the electrode pad T1, i.e. connected to the power supply circuit VS via the electrode pad T1. In addition, the dimming circuit LC12 has the other terminal connected to the electrode pad T3, i.e. connected to the node Nh2 of the light emitting element group HS2 via the electrode pad T3, and the other terminal connected to the electrode pad T7, i.e. connected to the node Nd9 of the light emitting element group HS2 via the electrode pad T7. Note that the dimming circuit LC12 includes a transistor N6 and the driving circuit KD2 illustrated in FIG. 12.

The light emission control unit HC12 includes the comparing circuit CN as the first comparing circuit, and the detecting portion K1. The output terminal of the detecting portion K1 is connected to the driving circuit KD1 of the dimming circuit LC11 and the driving circuit KD2 of the dimming circuit 12. In other words, the output terminal of the comparing circuit CN is connected to the driving circuit KD1 of the dimming circuit LC11 and the driving circuit KD2 of the dimming circuit 12 via the output terminal of the detecting portion K1. The output signal Ko1 of the detecting portion K1 is supplied to the driving circuit KD1 and the driving circuit KD2.

The semiconductor chip IC12a has the same structure as the semiconductor chip IC12. However, in the semiconductor chip IC12a of FIG. 30, for convenience of description, in order to discriminate from the semiconductor chip IC12, the suffix "a" is added to the numeral or symbol of the structure in the semiconductor chip IC12. In addition, in the semiconductor chip IC12a, the structure described in the semiconductor chip IC12 is appropriately omitted. Note that the "comparing circuit CN" is referred to as a "comparing circuit CNaa" here, in order to discriminate from the "comparing circuit CNa" illustrated in FIG. 5 or the like.

The semiconductor chip IC12a has electrode pads for external electric connection, which include the electrode pad T1a, the electrode pad T2a, the electrode pad T3a, the electrode pad T6a, the electrode pad T7a, the electrode pad T8a, and the electrode pad T9a. In addition, the semiconductor chip IC12a includes a light emission control unit HC12a as the second light emission control unit, the dimming circuit LC11a, and the dimming circuit LC12a as the second dimming portion.

The electrode pad T1a is connected to the power supply circuit VS via the wiring W2 as the second power supply wiring. In other words, the wiring W2 is connected to the power supply circuit VS and the semiconductor chip IC12a. The electrode pad T2a is connected to the node Nh11 of the light emitting element group HS11. The electrode pad T3a is connected to the node Nh12 of the light emitting element group HS12. Note that the wiring resistance of the wiring W2 may be different from the wiring resistance of the wiring W1.

The dimming circuit LC11a has one terminal connected to the electrode pad T1a, i.e. connected to the power supply circuit VS via the electrode pad T1a. In addition, the dimming circuit LC11a has the other terminal connected to the electrode pad T2a, i.e. connected to the node Nh11 of the light emitting element group HS11 via the electrode pad T2a, and the other terminal connected to the electrode pad T6a, i.e. connected to the node Nd8a of the light emitting element group HS11 via the electrode pad T6a. Note that the dimming circuit LC11a includes the driving circuit KD1a and the transistor N5a.

The dimming circuit LC12a has one terminal connected to the electrode pad T1a, i.e. connected to the power supply circuit VS via the electrode pad T1a. In addition, the dimming circuit LC12a has the other terminal connected to the electrode pad T3a, i.e. connected to the node Nh12 of the light emitting element group HS12 via the electrode pad T3a, and the other terminal connected to the electrode pad T7a, i.e. connected to the node Nd9a of the light emitting element group HS12 via the electrode pad T7a. Note that the dimming circuit LC12a includes the driving circuit KD2a and a transistor N6a.

The light emission control unit HC12a includes the comparing circuit CNaa as the second comparing circuit, and the detecting portion K1a as the second detecting portion. The output terminal of the detecting portion K1a is connected to the driving circuit KD1a of the dimming circuit LC11a and the driving circuit KD2a of the dimming circuit 12a. In other words, the output terminal of the comparing circuit CNaa is connected to the driving circuit KD1a of the dimming circuit LC11a and the driving circuit KD2a of the dimming circuit 12a via the output terminal of the detecting portion K1a. The output signal Ko1a of the detecting portion K1a is supplied to the driving circuit KD1a and the driving circuit KD2a.

The electrode pad T8a is connected to the electrode pad T9 of the semiconductor chip IC12 via the wiring W4 as the second connection wiring. In other words, the wiring W4 electrically connects the node Nd16a and the second input terminal of the detecting portion K1.

The electrode pad T9a is connected to the electrode pad T8 of the semiconductor chip IC12 via the wiring W5 as the third connection wiring. In other words, the wiring W5 electrically connects the node Nd16 and the second input terminal of the detecting portion K1a.

Here, in the detecting portion K1 of the semiconductor chip IC12, the first input terminal is supplied with the comparison result signal Vcr1 output from the comparing circuit CN, the second input terminal is supplied with the comparison result signal Vcr1a output from the comparing circuit CNaa of the semiconductor chip IC12a, and the logical sum of these signals is supplied to the driving circuit KD1 and the driving circuit KD2 as the output signal Ko1 as the first output signal, so that outputs of the driving circuit KD1 and the driving circuit KD2 are controlled. In other words, the light emission control and the light emission stop control of the light emitting element groups HS are performed by the light emission control unit HC12 and the light emission control unit HC12a of the semiconductor chip IC12a.

In addition, in the detecting portion K1a of the semiconductor chip IC12a, the first input terminal is supplied with the comparison result signal Vcr1 output from the comparing circuit CN of the semiconductor chip IC12, the second input terminal is supplied with the comparison result signal Vcr1a output from the comparing circuit CNaa, and the logical sum of these signals is supplied to the driving circuit KD1a and the driving circuit KD2a as the output signal Ko1a as the second output signal, so that outputs of the driving circuit KD1a and the driving circuit KD2a are controlled. In other words, the light emission control and the light emission stop control of the light emitting element groups HSa are performed by the light emission control unit HC12a and the light emission control unit HC12 of the semiconductor chip IC12.

Here, the outputs of the driving circuit KD1 and the driving circuit KD2 are determined by the signal level of the output signal Ko1 of the detecting portion K1 and the signal level of the output signal Ko1a of the detecting portion K1a. Further, the signal level of the output signal Ko1 of the detecting portion K1 and the signal level of the output signal Ko1a of the detecting portion K1a are determined by the level of the comparison result signal Vcr1 output from the comparing circuit CN and the level of the comparison result signal Vcr1a output from the comparing circuit CNaa.

If each of the comparing circuit CN and the comparing circuit CNaa determines that the drive voltage Vk is lower than the light emission reference voltage VHa or a voltage based on the light emission reference voltage VHa, the comparison result signal Vcr1 and the comparison result signal Vcr1a become high level. Therefore, the first input terminal and the second input terminal of each of the detecting portion K1 and the detecting portion K1a are both supplied with the high level signal, and the output signal Ko1 and the output signal Ko1a become high level. In this case, the driving circuit KD1, the driving circuit KD2, the driving circuit KD1a, and the driving circuit KD2a are supplied with the high level signal, and hence the transistor N5, the transistor N6, the transistor N5a, and the transistor N6a are all turned off.

If the comparing circuit CN determines that the drive voltage Vk is lower than the light emission reference voltage VHa or a voltage based on the light emission reference voltage VHa, while the comparing circuit CNaa determines that the drive voltage Vk is higher than the light emission reference voltage VHa or a voltage based on the light emission reference voltage VHa, the comparison result signal Vcr1 becomes high level, while the comparison result signal Vcr1a becomes low level. In this case, the second input terminal of the detecting portion K1 and the first input terminal of the detecting portion K1a are both supplied with the low level signal, while the first input terminal of the detecting portion K1 and the second input terminal of the detecting portion K1a are both supplied with the high level signal. Therefore, the output signal Ko1 and the output signal Ko1a become high level. In this case, the driving circuit KD1, the driving circuit KD2, the driving circuit KD1a, and the driving circuit KD2a are supplied with the high level signal, and hence the transistor N5, the transistor N6, the transistor N5a, and the transistor N6a are all turned off.

If each of the comparing circuit CN and the comparing circuit CNaa determines that the drive voltage Vk is higher than the light emission reference voltage VHa or a voltage based on the light emission reference voltage VHa, the comparison result signal Vcr1 and the comparison result signal Vcr1a become low level. Therefore, the first input terminal and the second input terminal of each of the detecting portion K1 and the detecting portion K1a are supplied with the low level signal, and hence the output signal Ko1 and the output signal Ko1a become low level. In this case, the driving circuit KD1, the driving circuit KD2, the driving circuit KD1a, and the driving circuit KD2a are supplied with the low level signal, and hence the transistor N5, the transistor N6, the transistor N5a, and the transistor N6a are all turned on.

As described above, in the lighting device 50e, the light emission control and the light emission stop control of the light emitting element groups HSB are performed by the light emission control unit HC12 of the semiconductor chip IC12 and the light emission control unit HC12a of the semiconductor chip IC12a. Therefore, even if there is a manufacturing variation between the comparing circuit CN of the semiconductor chip IC12 and the comparing circuit CNaa of the semiconductor chip IC12a, the lighting device 50e can prevent a variation in timing of causing as well as stopping light emission of the light emitting element groups HS and the light emitting element groups HSa.

In addition, in the lighting device 50e, the light emission control and the light emission stop control of the light emitting element groups HSB are performed by the light emission control unit HC12 of the semiconductor chip IC12 and the light emission control unit HC12a of the semiconductor chip IC12a. Therefore, even if the wiring resistance of the wiring W2 for the semiconductor chip IC12a to receive power supply of the drive voltage Vk and the drive current Ik from the power supply circuit VS is different from the wiring resistance of the wiring W1 for the semiconductor chip IC7 to receive power supply of the drive voltage Vk and the drive current Ik from the power supply circuit VS, the lighting device 50e can prevent a variation in timing of causing as well as stopping light emission of the light emitting element groups HS and the light emitting element groups HSa.

INDUSTRIAL APPLICABILITY

The lighting device according to the present invention can prevent a light emission timing variation among the light emitting elements of the light emitting element groups, and thus has very high industrial applicability.

LIST OF REFERENCE SIGNS

VS power supply circuit
HC, HCa, HCb, HCc, HCd, HCe, HC1, HC2, HC3, HC4, HC5, HC6, HC7, HC8, HC9, HC10, HC11, HC12, HC1a, HC2a, HC3a, HC4a, HC5a, HC6a, HC7a, HC8a, HC9a, HC10a, HC11a, HC12a light emission control unit
CN, CNa, CNL1, CNL2, CNL1a, CNL2a, CNaa, CNaaa comparing circuit
LC1, LC2, LC1a, LC2a, LC11, LC12, LC11a, LC12a dimming circuit
Vk drive voltage
Ik drive current
Vh1, Vh2 light emission voltage
Ih1, Ih2 light emission current
HS, HS1, HS2, HSa, HS11, HS12, HSB light emitting element group
HS1a, HS2a light emitting element
Vc comparison voltage
Vref1, Vref2, Vref3 reference voltage
Ref1, Ref2, Ref3, Ref4, Ref5 reference power supply
Vcr1, Vcr2, Vcr3, Vcr4, Vcr5, Vcr6 comparison result voltage
Cp1, Cp2, Cp3, Cp4, Cp5, Cp6 comparator
Rh1, Rh2, Rh3, Rh4, R1, R2, R3, R4, Rh1a, Rh2 resistor element
N1, N2, N3, N4, N5, N6, P1, P2, P3, P4, P5, P6, P7, P8, P9, P10, P11, P12, P13, N1a, N2a, N3a, N4a, N5a, N6a, P1a, P2a, P3a, P4a, P5a, P6a, P7a, P8a, P9a, P10a, P11a, P12a, P13a transistor
IC1, IC2, IC3, IC4, IC5, IC6, IC7, IC8, IC9, IC10, IC11, IC12, IC1a, IC2a, IC3a, IC4a, IC5a, IC6a, IC7a, IC8a, IC9a, IC10a, IC11a, IC12a semiconductor chip
T1, T2, T3, T4, T5, T6, T7, T8, T9, T1a, T2a, T3a, T4a, T5a, T6a, T7a, T8a, T9a electrode pad

What is claimed is:

1. A device comprising:
  a dimmer arranged to be electrically connected to an anode of a light emitting element group and arranged to adjust a light emission current flowing in the light emitting element group; and
  a control unit arranged to control supply of electric power to the dimmer by detecting whether or not the dimmer is supplied with a drive voltage necessary for the light emitting element group to emit light, wherein
  the control unit includes a comparing circuit configured to output a comparison result signal turning on and off a switch by comparing the drive voltage, or a comparison voltage based on the drive voltage, with a predetermined reference voltage, and wherein
  the dimmer is configured to adjust the light emission current and is configured to be enabled to generate and disabled from generating the light emission current as a result of the switch being turned on and off,
  wherein the comparing circuit is supplied with the drive voltage or the comparison voltage from an upstream side of the light emitting element group, and wherein
  the dimmer includes: a first dimmer configured to adjust a first light emission current flowing in a first light emitting element group; and a second dimmer configured to adjust a second light emission current flowing in a second light emitting element group.

2. The device according to claim 1, wherein the dimmer is
  enabled to generate the light emission current when the drive voltage is higher than the reference voltage and disabled from generating the light emission current when the drive voltage is lower than the reference voltage.

3. The device according to claim 1, wherein
  the comparing circuit comprises a plurality of comparing circuits such that the first and second dimmers and the plurality of comparing circuits are provided in a plurality of pairs, and
  the plurality of comparing circuits have a function such that only one of the plurality of comparing circuits is selectively operated as a controller that controls each of the first and second dimmers.

4. The device according to claim 1, wherein the dimmer includes:
   a dimming comparing circuit configured to output a dimming control signal such that a dimming comparison voltage based on a light emission voltage based on the drive voltage is equal to a predetermined dimming reference voltage; and
   a dimming switch connected between a power supply circuit and respective one of the light emitting element groups, an output level of the dimming switch being controlled in accordance with the dimming control signal.

5. The device according to claim 4, wherein the dimmer further includes:
   a current generator circuit configured to generate, and then output to the respective light emitting element group, the light emission voltage and the light emission current by accumulating and smoothing a voltage based on the drive voltage obtained when the dimming switch is on; and
   a driving circuit configured to control the output level of the dimming switch in accordance with the dimming control signal.

6. The device according to claim 5, wherein the driving circuit is enabled to control and disabled from controlling the dimming switch according to the comparison result signal.

7. The device according to claim 4, wherein the dimming switch is a PMOS transistor
   of which a source is connected to the power supply circuit and
   of which a drain is connected to the respective light emitting element group.

8. The device according to claim 7, wherein
   one end of the switch is connected to the source of the dimming switch, and
   another end of the switch is connected to a gate of the dimming switch.

9. The device according to claim 4, wherein
   one end of the switch is connected to the power supply circuit, and
   another end of the switch is connected to a dimming reference voltage input terminal of the dimming comparing circuit.

10. The device according to claim 4, wherein the switch is connected between a lower power terminal of the dimming comparing circuit and a ground terminal.

11. The device according to claim 1, wherein at least one of the first or second light emitting element groups includes a plurality of light emitting elements connected in series with each other which emit light as a result of the light emission current flowing therein when a light emission voltage based on the drive voltage and equal to or higher than the light emission reference voltage is applied to the light emitting element group.

12. The device according to claim 1, further comprising:
   a power supply circuit configured to supply the drive voltage.

13. The device according to claim 1, further comprising:
   a switch configured to be turned on and off in accordance with the comparison result signal.

14. A device comprising:
   a dimmer arranged to be electrically connected to an anode of a light emitting element group; and
   a control unit arranged to control whether or not to operate the dimmer by monitoring a drive voltage supplied to the dimmer, wherein
   the control unit includes a comparing circuit configured to output a comparison result signal turning on and off a switch by comparing the drive voltage, or a comparison voltage based on the drive voltage, with a predetermined reference voltage, and wherein
   the dimmer is configured to adjust a light emission current flowing in the light emitting element group and is configured to be enabled to generate and disabled from generating the light emission current as a result of the switch being turned on and off,
   wherein the comparing circuit is supplied with the drive voltage or the comparison voltage from an upstream side of the light emitting element group, and wherein the dimmer includes: a first dimmer configured to adjust a first light emission current flowing in a first light emitting element group; and a second dimmer configured to adjust a second light emission current flowing in a second light emitting element group.

15. The device according to claim 14, wherein the dimmer is
   enabled to generate the light emission current when the drive voltage is higher than the reference voltage and
   disabled from generating the light emission current when the drive voltage is lower than the reference voltage.

16. The device according to claim 14, wherein
   the comparing circuit comprises a plurality of comparing circuits such that the first and second dimmers and the plurality of comparing circuits are provided in a plurality of pairs, and
   the plurality of comparing circuits have a function such that only one of the plurality of comparing circuits is selectively operated as a controller that controls each of the first and second dimmers.

17. The device according to claim 14, wherein the dimmer includes:
   a dimming comparing circuit configured to output a dimming control signal such that a dimming comparison voltage based on a light emission voltage based on the drive voltage is equal to a predetermined dimming reference voltage; and
   a dimming switch connected between a power supply circuit and a respective one of the light emitting element group, an output level of the dimming switch being controlled in accordance with the dimming control signal.

18. The device according to claim 17, wherein the dimmer further includes:
   a current generator circuit configured to generate, and then output to the respective light emitting element group, the light emission voltage and the light emission current by accumulating and smoothing a voltage based on the drive voltage obtained when the dimming switch is on; and
   a driving circuit configured to control the output level of the dimming switch in accordance with the dimming control signal.

19. The device according to claim 18, wherein the driving circuit is enabled to control and disabled from controlling the dimming switch according to the comparison result signal.

20. The device according to claim 17, wherein the dimming switch is a PMOS transistor of which a source is connected to the power supply circuit and of which a drain is connected to the respective light emitting element group.

21. The device according to claim 20, wherein
one end of the switch is connected to the source of the dimming switch, and
another end of the switch is connected to a gate of the dimming switch.

22. The device according to claim 17, wherein
one end of the switch is connected to the power supply circuit, and
another end of the switch is connected to a dimming reference voltage input terminal of the dimming comparing circuit.

23. The device according to claim 17, wherein the switch is connected between a lower power terminal of the dimming comparing circuit and a ground terminal.

24. The device according to claim 14, wherein at least one of the first or second light emitting groups includes a plurality of light emitting elements connected in series with each other which emit light as a result of the light emission current flowing therein when a light emission voltage based on the drive voltage and equal to or higher than the light emission reference voltage is applied to the light emitting element group.

25. The device according to claim 14, further comprising:
a power supply circuit configured to supply the drive voltage.

26. The device according to claim 14, further comprising:
a switch configured to be turned on and off in accordance with the comparison result signal.

27. A device comprising:
a dimmer electrically connected in a current path to a light emitting element group and to an anode of the light emitting element group; and
a control unit electrically connected to a control terminal of a switch connected to an input terminal of the dimmer, wherein
the control unit includes a comparing circuit configured to output a comparison result signal turning on and off the switch by comparing a drive voltage, or a comparison voltage based on the drive voltage, with a predetermined reference voltage, and wherein
the dimmer is configured to adjust a light emission current flowing in the light emitting element group and is configured to be enabled to generate and disabled from generating the light emission current as a result of the switch being turned on and off,
wherein the comparing circuit is supplied with the drive voltage or the comparison voltage from an upstream side of the light emitting element group, wherein the dimmer includes: a first dimmer configured to adjust a first light emission current flowing in a first light emitting element group; and a second dimmer configured to adjust a second light emission current flowing in a second light emitting element group.

28. The device according to claim 27, wherein
the dimmer is
enabled to generate the light emission current when the drive voltage is higher than the reference voltage and disabled from generating the light emission current when the drive voltage is lower than the reference voltage.

29. The device according to claim 27, wherein
the comparing circuit comprises a plurality of comparing circuits such that the first and second dimmers and the plurality of comparing circuits are provided in a plurality of pairs, and the plurality of comparing circuits have a function such that only one of the plurality of comparing circuits is selectively operated as a controller that controls each of the first and second dimmers.

30. The device according to claim 27, wherein
the dimmer includes:
a dimming comparing circuit configured to output a dimming control signal such that a dimming comparison voltage based on a light emission voltage based on the drive voltage is equal to a predetermined dimming reference voltage; and
a dimming switch connected between a power supply circuit and a respective one of the light emitting element groups, an output level of the dimming switch being controlled in accordance with the dimming control signal.

31. The device according to claim 30, wherein the dimmer further includes:
a current generator circuit configured to generate, and then output to the respective light emitting element group, the light emission voltage and the light emission current by accumulating and smoothing a voltage based on the drive voltage obtained when the dimming switch is on; and
a driving circuit configured to control the output level of the dimming switch in accordance with the dimming control signal.

32. The device according to claim 31, wherein the driving circuit is enabled to control and disabled from controlling the dimming switch according to the comparison result signal.

33. The device according to claim 30, wherein the dimming switch is a PMOS transistor
of which a source is connected to the power supply circuit and
of which a drain is connected to the respective light emitting element group.

34. The device according to claim 33, wherein
one end of the switch is connected to the source of the dimming switch, and
another end of the switch is connected to a gate of the dimming switch.

35. The device according to claim 30, wherein
one end of the switch is connected to the power supply circuit, and
another end of the switch is connected to a dimming reference voltage input terminal of the dimming comparing circuit.

36. The device according to claim 30, wherein the switch is connected between a lower power terminal of the dimming comparing circuit and a ground terminal.

37. The device according to claim 27, wherein at least one of the first or second light emitting element groups includes a plurality of light emitting elements connected in series with each other which emit light as a result of the light emission current flowing therein when a light emission voltage based on the drive voltage and equal to or higher than the light emission reference voltage is applied to the light emitting element group.

38. The device according to claim 27, further comprising:
a power supply circuit configured to supply the drive voltage.

39. The device according to claim 27, further comprising:
a switch configured to be turned on and off in accordance with the comparison result signal.

* * * * *